US011054026B2

(12) United States Patent
Afshari

(10) Patent No.: US 11,054,026 B2
(45) Date of Patent: *Jul. 6, 2021

(54) HYDROSTATIC TRANSMISSION ASSEMBLY AND SYSTEM

(71) Applicant: Project Phoenix, LLC, Mesa, AZ (US)

(72) Inventor: Thomas Afshari, Phoenix, AZ (US)

(73) Assignee: Project Phoenix, LLC, Mesa, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/698,566

(22) Filed: Nov. 27, 2019

(65) Prior Publication Data

US 2020/0173551 A1 Jun. 4, 2020

Related U.S. Application Data

(63) Continuation of application No. 15/520,386, filed as application No. PCT/US2015/054145 on Oct. 6, 2015, now Pat. No. 10,677,352.

(Continued)

(51) Int. Cl.
*F16H 61/4008* (2010.01)
*F04C 14/08* (2006.01)
(Continued)

(52) U.S. Cl.
CPC .......... *F16H 61/4008* (2013.01); *F03C 2/08* (2013.01); *F04C 2/08* (2013.01); *F04C 14/08* (2013.01);
(Continued)

(58) Field of Classification Search
CPC ............. F16H 61/4008; F16H 61/4035; F15B 2211/7058; F15B 2211/20515; F15B 2211/20561; F04C 2240/402
See application file for complete search history.

(56) References Cited

U.S. PATENT DOCUMENTS 337,551 A 3/1886 Berrenberg et al.
688,616 A 12/1901 Ferguson
(Continued)

FOREIGN PATENT DOCUMENTS

CA 2 236 535 A1 11/1999
CA 2 878 316 A1 3/2014
(Continued)

OTHER PUBLICATIONS

Esposito, Fluid Power with Applicators, 7th Ed., Chapter 5, pp. 154-162 (2009).
(Continued)

*Primary Examiner* — Thomas E Lazo
(74) *Attorney, Agent, or Firm* — Perkins Coie LLP

(57) ABSTRACT

A hydrostatic transmission system includes a hydraulic motor and at least one proportional control valve and at least one pump connected to the hydraulic motor to provide fluid to operate the hydraulic motor. The at least one pump includes at least one fluid driver having a prime mover and a fluid displacement assembly to be driven by the prime mover such that fluid is transferred from the pump inlet to the pump outlet. The hydrostatic transmission system also includes a controller that establishes at least one of a speed and a torque of the at least one prime mover and concurrently establishes an opening of the at least one proportional control valve to adjust at least one of a flow and a pressure in the hydrostatic transmission system to an operational set point.

17 Claims, 37 Drawing Sheets

Related U.S. Application Data

(60) Provisional application No. 62/213,261, filed on Sep. 2, 2015, provisional application No. 62/076,401, filed on Nov. 6, 2014, provisional application No. 62/075,689, filed on Nov. 5, 2014, provisional application No. 62/066,255, filed on Oct. 20, 2014, provisional application No. 62/066,238, filed on Oct. 20, 2014.

(51) Int. Cl.
*F04C 14/24* (2006.01)
*F04C 15/00* (2006.01)
*F03C 2/08* (2006.01)
*F04C 2/08* (2006.01)
*F16H 39/36* (2006.01)
*F16H 61/4035* (2010.01)
*F16H 61/44* (2006.01)
*F16H 61/465* (2010.01)

(52) U.S. Cl.
CPC ............ *F04C 14/24* (2013.01); *F04C 15/008* (2013.01); *F16H 39/36* (2013.01); *F16H 61/4035* (2013.01); *F16H 61/44* (2013.01); *F16H 61/465* (2013.01)

(56) References Cited

U.S. PATENT DOCUMENTS

| | | |
|---|---|---|
| 1,341,846 A | 6/1920 | Gollings |
| 1,361,423 A | 12/1920 | Waterous |
| 1,407,496 A | 2/1922 | Storey |
| 1,418,741 A | 6/1922 | Stallman |
| 1,665,120 A | 4/1928 | Wendell |
| 1,681,796 A | 8/1928 | Wendell |
| 1,712,157 A | 5/1929 | Morita |
| 2,439,427 A | 4/1948 | Guibert et al. |
| 2,572,334 A | 10/1951 | Guibert |
| 2,601,397 A | 6/1952 | Hill et al. |
| 2,621,603 A | 12/1952 | Thomas |
| 2,918,209 A | 12/1959 | Schueller |
| 2,927,429 A | 3/1960 | Carlson |
| 2,928,295 A * | 3/1960 | Boulanger .............. F16H 61/46 475/72 |
| 2,937,807 A | 5/1960 | Lorenz |
| 2,940,661 A | 6/1960 | Lorenz |
| 3,136,224 A | 6/1964 | Escobosa |
| 3,264,502 A | 8/1966 | Lytle et al. |
| 3,585,973 A | 6/1971 | Klover |
| 3,694,105 A | 9/1972 | Martin |
| 3,763,746 A | 10/1973 | Walters |
| 3,922,855 A | 12/1975 | Bridwell et al. |
| 3,932,993 A * | 1/1976 | Riedhammer ........ F16H 61/433 60/431 |
| 3,979,910 A | 9/1976 | Leuenberger et al. |
| 4,016,719 A | 4/1977 | Yavnai |
| 4,030,403 A | 6/1977 | Elser |
| 4,345,436 A | 8/1982 | Johnson |
| 4,369,625 A | 1/1983 | Izumi et al. |
| 4,418,610 A | 12/1983 | Holtrop |
| 4,529,362 A | 7/1985 | Ichiryu et al. |
| 4,627,237 A * | 12/1986 | Hutson .................. F16H 39/04 60/487 |
| 4,630,441 A | 12/1986 | Chamberlain |
| 4,682,939 A * | 7/1987 | Petro ....................... F04C 2/084 418/178 |
| 4,696,163 A | 9/1987 | Glomeau |
| 4,850,812 A | 7/1989 | Voight |
| 5,026,248 A | 6/1991 | Hamilton |
| 5,048,294 A * | 9/1991 | Oshina .................. F16H 61/439 60/468 |
| 5,161,957 A | 11/1992 | Ribaudo |
| 5,197,861 A | 3/1993 | Maruyama et al. |
| 5,271,719 A | 12/1993 | Abe et al. |
| 5,295,798 A | 3/1994 | Maruyama et al. |
| 5,329,216 A | 7/1994 | Hasegawa |
| 5,708,311 A | 1/1998 | Claar et al. |
| 5,709,537 A | 1/1998 | Maruyama et al. |
| 5,767,635 A | 6/1998 | Steffens et al. |
| 5,767,638 A | 6/1998 | Wu et al. |
| 5,778,671 A | 7/1998 | Bloomquist et al. |
| 5,836,746 A | 11/1998 | Maruyama et al. |
| 6,002,186 A | 12/1999 | Coutu et al. |
| 6,004,119 A | 12/1999 | Yoshiaki et al. |
| 6,042,095 A | 3/2000 | Kuchta |
| 6,048,235 A | 4/2000 | Kai |
| 6,053,717 A | 4/2000 | Dixon |
| 6,155,790 A | 12/2000 | Pyötsiä et al. |
| 6,247,906 B1 | 6/2001 | Pijanowski |
| 6,447,256 B2 * | 9/2002 | Bussard ................ F04C 15/008 318/34 |
| 6,447,266 B2 | 9/2002 | Antaki et al. |
| 6,543,223 B2 | 4/2003 | Muschong et al. |
| 6,652,249 B2 | 11/2003 | Kenney et al. |
| 6,796,120 B2 | 9/2004 | Franchet et al. |
| 6,971,463 B2 * | 12/2005 | Shore ....................... B60K 6/12 180/165 |
| 6,979,185 B2 * | 12/2005 | Kaempe ................ F04C 14/04 418/131 |
| 7,000,386 B1 * | 2/2006 | Morgan ................ F15B 13/022 60/419 |
| 7,051,526 B2 | 5/2006 | Geiger |
| 7,155,910 B2 | 1/2007 | Last |
| 7,191,593 B1 | 3/2007 | Ho |
| 7,232,292 B2 | 6/2007 | Lopatinsky et al. |
| 7,240,893 B2 | 6/2007 | Komaba et al. |
| 7,281,372 B2 | 10/2007 | Sakai et al. |
| 7,434,395 B2 | 10/2008 | He |
| 7,537,441 B2 | 5/2009 | Iwasaki |
| 7,870,727 B2 * | 1/2011 | Mueller .............. F16H 61/4096 60/414 |
| 7,927,079 B2 | 4/2011 | Suzuki et al. |
| 8,157,539 B2 | 4/2012 | Hidaka et al. |
| 8,167,589 B2 | 5/2012 | Hidaka et al. |
| 8,206,134 B2 | 6/2012 | Moldovan et al. |
| 8,448,432 B2 | 5/2013 | Bresie |
| 8,869,924 B2 * | 10/2014 | Kim ..................... E02F 9/2271 180/65.265 |
| 8,959,905 B2 * | 2/2015 | Baltes ...................... B60K 6/12 60/414 |
| 9,234,532 B2 | 1/2016 | Vanderlaan et al. |
| 9,670,943 B2 | 6/2017 | Gomm et al. |
| 10,544,810 B2 * | 1/2020 | Afshari .................... E02F 3/425 |
| 10,677,352 B2 * | 6/2020 | Afshari .................... F04C 2/08 |
| 2002/0009368 A1 | 1/2002 | Bussard |
| 2003/0077183 A1 | 4/2003 | Franchet et al. |
| 2003/0091448 A1 | 5/2003 | Prampolini |
| 2003/0126981 A1 | 7/2003 | Bridger et al. |
| 2003/0151315 A1 | 8/2003 | Choi et al. |
| 2004/0060430 A1 | 4/2004 | Brinkman |
| 2004/0213680 A1 | 10/2004 | Suzuki et al. |
| 2005/0022523 A1 | 2/2005 | Nagai et al. |
| 2005/0089414 A1 | 4/2005 | Ohman |
| 2005/0112012 A1 | 5/2005 | Marheineie |
| 2005/0144939 A1 | 7/2005 | Mentink et al. |
| 2005/0238505 A1 | 10/2005 | Iwasaki |
| 2005/0254970 A1 | 11/2005 | Mayer et al. |
| 2006/0001202 A1 | 1/2006 | Bauman |
| 2006/0039804 A1 * | 2/2006 | Jordan ..................... F04C 2/082 417/320 |
| 2006/0156713 A1 | 7/2006 | Kadlicko |
| 2007/0074511 A1 | 4/2007 | Verkuilen |
| 2007/0098576 A1 * | 5/2007 | Horng ................ F04C 15/0069 417/420 |
| 2007/0101711 A1 * | 5/2007 | Debus .................... B30B 15/166 60/476 |
| 2007/0157612 A1 | 7/2007 | He |
| 2007/0166168 A1 | 7/2007 | Vigholm |
| 2008/0010984 A1 | 1/2008 | Arbel et al. |
| 2008/0190104 A1 | 8/2008 | Bresie |
| 2009/0210120 A1 | 8/2009 | Stein |
| 2009/0266934 A1 | 10/2009 | Makino |

(56) References Cited

U.S. PATENT DOCUMENTS

| | | |
|---|---|---|
| 2009/0297370 A1 | 12/2009 | Moldovan et al. |
| 2010/0226806 A1 | 9/2010 | Mellet et al. |
| 2010/0247362 A1* | 9/2010 | Koizumi .............. F04C 14/02 418/140 |
| 2010/0264885 A1 | 10/2010 | Olsen et al. |
| 2010/0322805 A1* | 12/2010 | Aregger .............. F04C 2/18 418/2 |
| 2011/0000203 A1 | 1/2011 | Riedel et al. |
| 2011/0017310 A1 | 1/2011 | Eriksson |
| 2011/0030364 A1* | 2/2011 | Persson ............... E02F 9/2242 60/428 |
| 2011/0030505 A1 | 2/2011 | Hoyle et al. |
| 2011/0135516 A1 | 6/2011 | Oishi et al. |
| 2011/0209471 A1 | 9/2011 | Vanderlaan et al. |
| 2011/0250082 A1 | 10/2011 | Han et al. |
| 2012/0141315 A1 | 6/2012 | Seto et al. |
| 2012/0173027 A1 | 7/2012 | Cheng et al. |
| 2012/0233997 A1 | 9/2012 | Andruch, III et al. |
| 2012/0305603 A1* | 12/2012 | Kwok ............... F04C 2/18 222/251 |
| 2013/0074487 A1 | 3/2013 | Herold et al. |
| 2013/0091833 A1 | 4/2013 | Zhan et al. |
| 2013/0098015 A1 | 4/2013 | Opdenbosh |
| 2013/0098017 A1* | 4/2013 | Knussman ............ F15B 7/006 60/327 |
| 2013/0098464 A1 | 4/2013 | Knussman |
| 2013/0239558 A1 | 9/2013 | Shirao |
| 2013/0298542 A1 | 11/2013 | Lowman et al. |
| 2014/0105714 A1 | 4/2014 | Kim |
| 2014/0130487 A1* | 5/2014 | Akiyama ............. E02F 9/2228 60/431 |
| 2014/0174549 A1 | 6/2014 | Dybing |
| 2014/0260233 A1 | 9/2014 | Giovanardi |
| 2014/0308106 A1 | 10/2014 | Beschorner |
| 2014/0366519 A1 | 12/2014 | Sadamori |
| 2015/0121860 A1 | 5/2015 | Hyon |
| 2015/0275927 A1 | 10/2015 | Gomm et al. |
| 2015/0308463 A1 | 10/2015 | Gomm et al. |
| 2015/0361743 A1 | 12/2015 | Mikkulainen |
| 2016/0102685 A1 | 4/2016 | Chester |

FOREIGN PATENT DOCUMENTS

| | | |
|---|---|---|
| CH | 625 600 A5 | 9/1981 |
| CN | 101655087 A | 2/2018 |
| DE | 1 258 617 | 1/1968 |
| DE | 1 528 965 | 10/1969 |
| DE | 3 230 550 A1 | 1/1984 |
| DE | 3 247 004 A1 | 6/1984 |
| DE | 3 821 321 A1 | 12/1989 |
| DE | 10 2008 018407 A1 | 10/2009 |
| DE | 10 2009 027282 A1 | 12/2010 |
| DE | 10 2009 028095 A1 | 2/2011 |
| DE | 10 2009 045028 A1 | 3/2011 |
| DE | 10 2011 005831 A1 | 9/2012 |
| DE | 10 2012 102156 A1 | 10/2012 |
| EP | 0 558 921 A1 | 9/1993 |
| EP | 0 942 173 A1 | 9/1999 |
| EP | 1 249 608 A1 | 10/2002 |
| EP | 1 531 269 | 5/2005 |
| EP | 1 967 745 A1 | 9/2008 |
| EP | 2 113 666 A2 | 11/2009 |
| EP | 2 816 237 A1 | 12/2014 |
| FR | 2 119 294 | 8/1972 |
| FR | 2 428 771 | 1/1980 |
| GB | 270 000 | 5/1927 |
| GB | 1 081 711 A | 8/1967 |
| GB | 1 284 551 | 8/1972 |
| GB | 1 284 552 | 8/1972 |
| GB | 1 284 553 | 8/1972 |
| GB | 1 450 436 | 9/1976 |
| GB | 2 123 089 A | 1/1984 |
| GB | 2 259 333 | 3/1993 |
| JP | S59-20590 A | 2/1984 |
| JP | Hei 11-336671 A | 12/1999 |
| JP | 2001-011899 A | 1/2001 |
| JP | 2001-153066 A | 6/2001 |
| JP | 2002-147370 A | 6/2002 |
| JP | 2003-088084 A | 3/2003 |
| JP | 2006-316662 A | 11/2006 |
| JP | 3 154 210 U | 10/2009 |
| JP | 2014-009655 A | 1/2014 |
| JP | 2014-512495 A | 5/2014 |
| RU | 2284424 C1 | 9/2006 |
| RU | 2009 149 035 A | 8/2011 |
| SU | 857 550 A | 8/1981 |
| SU | 1 087 705 A | 4/1984 |
| WO | WO 1991/13256 A1 | 9/1991 |
| WO | WO 01/073295 A1 | 10/2001 |
| WO | WO 03/069160 A1 | 8/2003 |
| WO | WO 2004/071845 A1 | 8/2004 |
| WO | WO 2008/060681 A2 | 5/2008 |
| WO | WO 2010/083991 A2 | 7/2010 |
| WO | WO 2010/097596 A1 | 9/2010 |
| WO | WO 2011/035971 A2 | 3/2011 |
| WO | WO 2011/048261 A1 | 4/2011 |
| WO | WO 2011/072502 A1 | 6/2011 |
| WO | WO 2012-122159 A2 | 9/2012 |
| WO | WO 2013/06902 A1 | 1/2013 |
| WO | WO 2013/027620 A1 | 2/2013 |
| WO | WO 2014/060760 A2 | 4/2014 |
| WO | WO 2014/135284 A1 | 9/2014 |
| WO | WO 2014/176256 A1 | 10/2014 |

OTHER PUBLICATIONS

International Search Report and Written Opinion, International Application No. PCT/US2015/018342 (published as WO 2015/131196), 19 pages (dated Jul. 20, 2015).

International Search Report and Written Opinion, International Application No. PCT/US2015/022484, (published as WO 2015/148662), 9 pages (dated Jun. 9, 2015).

International Search Report and Written Opinion, International Application No. PCT/US2015/027003 (published as WO 2015/164453), 18 pages (dated Nov. 4, 2015).

International Search Report and Written Opinion, International Application No. PCT/US2015/033752 (published as WO 2015/187673), 15 pages (dated Sep. 29, 2015).

International Search Report and Written Opinion, International Application No. PCT/US2015/033764 (published as WO 2015/187681), 7 pages (dated Aug. 19, 2015).

International Search Report and Written Opinion, International Application No. PCT/US2015/033776 (published as WO 2015/187688), 31 pages (dated Oct. 28, 2015).

International Search Report and Written Opinion, International Application No. PCT/US2015/041612 (published as WO 2016/014715), 8 pages (dated Sep. 28, 2015).

International Search Report and Written Opinion, International Application No. PCT/US2015/053670 (published as WO 2015/057321), 10 pages (dated Dec. 16, 2015).

International Search Report and Written Opinion, International Application No. PCT/US2015/054145 (published as WO 2016/064569), 9 pages (dated Feb. 2, 2016).

International Search Report and Written Opinion, International Application No. PCT/US2015/050589 (published as WO 2016/048773), 10 pages (dated Dec. 7, 2015).

International Search Report and Written Opinion, International Application No. PCT/US2016/049959 (published as WO 2017/040825), 10 pages (dated Dec. 9, 2016).

International Search Report and Written Opinion, International Application No. PCT/US2016/049918 (published as WO 2017/040792), 10 pages (dated Nov. 23, 2016).

Marks' Standard Handbook for Mechanical Engineers, Eighth Ed., Section 14, pp. 14-1-14-31 (1978).

Supplementary European Search Report, EP Application No. 15802457.0, 24 pages (dated Mar. 14, 2018).

Supplementary European Search Report, EP Application No. 15803186.4, 9 pages (dated Dec. 19, 2017).

(56) References Cited

OTHER PUBLICATIONS

Supplementary European Search Report, EP Application No. 15803994.1, 7 pages (dated Jan. 22, 2018).
Supplemental European Search Report, European Application No. EP 18 20 7568.9 (not yet published), 7 pages (dated Feb. 4, 2019).
Yusof et al., "Slip flow coefficient analysis in water hydrauilics gear pump for environmental friendly application," *IOP Conf. Series: Materials Science and Engineering*, 50:012016 (2013).
Extended European Search Report, European Application No. 20197360.9, 8 pages (dated Nov. 10, 2020).
Supplementary European Search Report, EP Application No. 20179980.6, 8 pages (dated Jul. 30, 2020).
Supplementary European Search Report, EP Application No. 20168937.9, 8 pages (dated May 14, 2020).
Supplementary European Search Report, EP Application No. 20166746.6, 7 pages (dated May 6, 2020).

\* cited by examiner

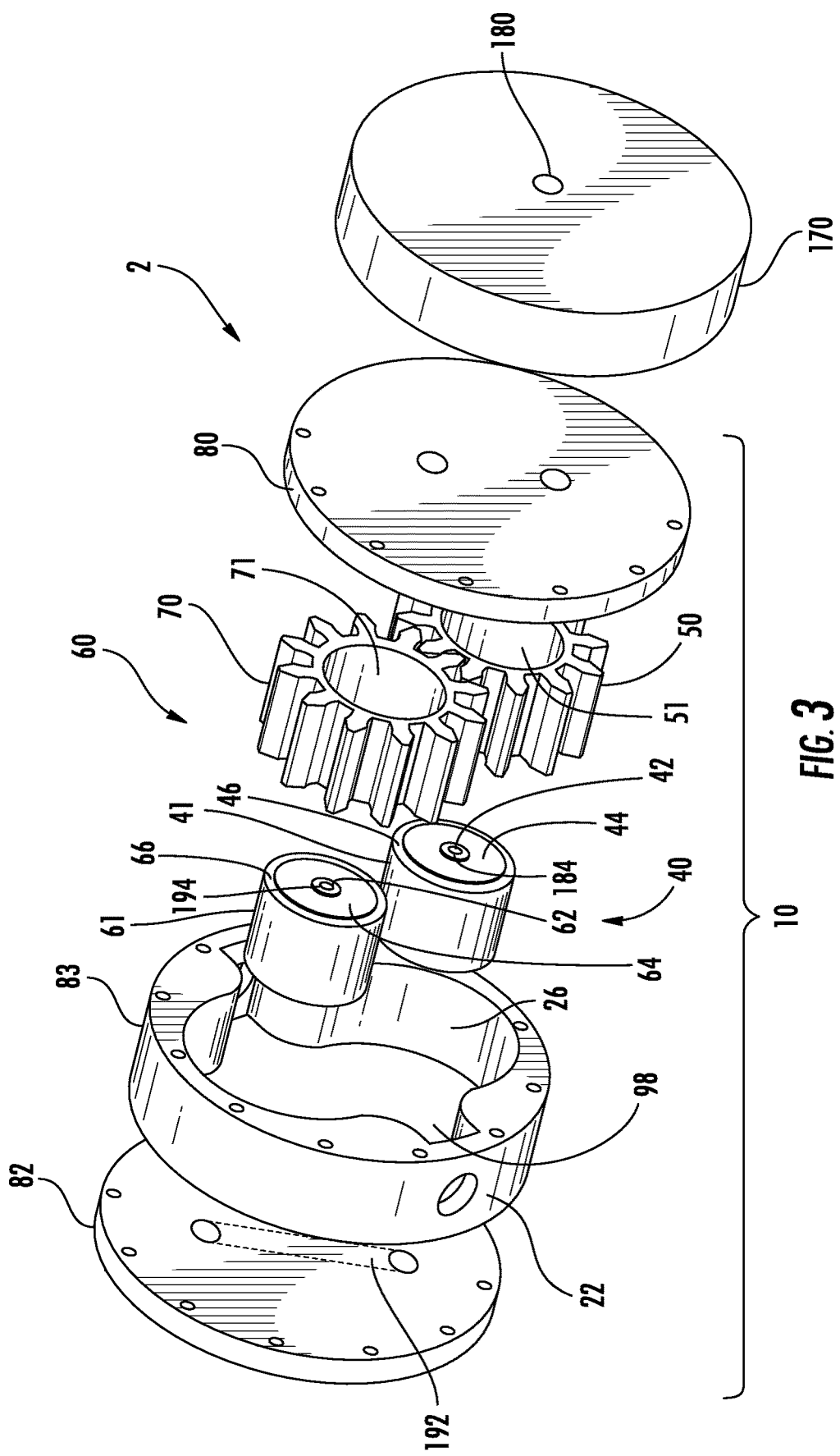

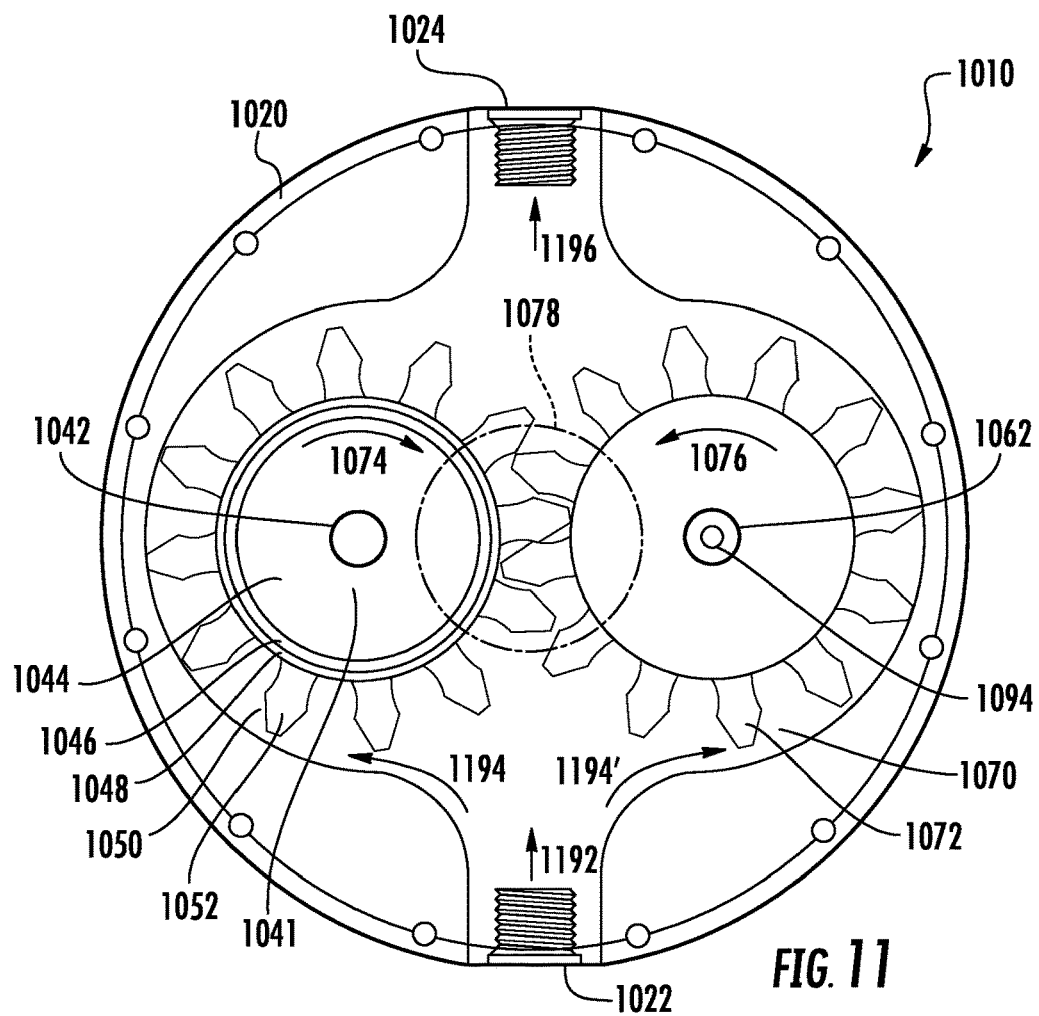
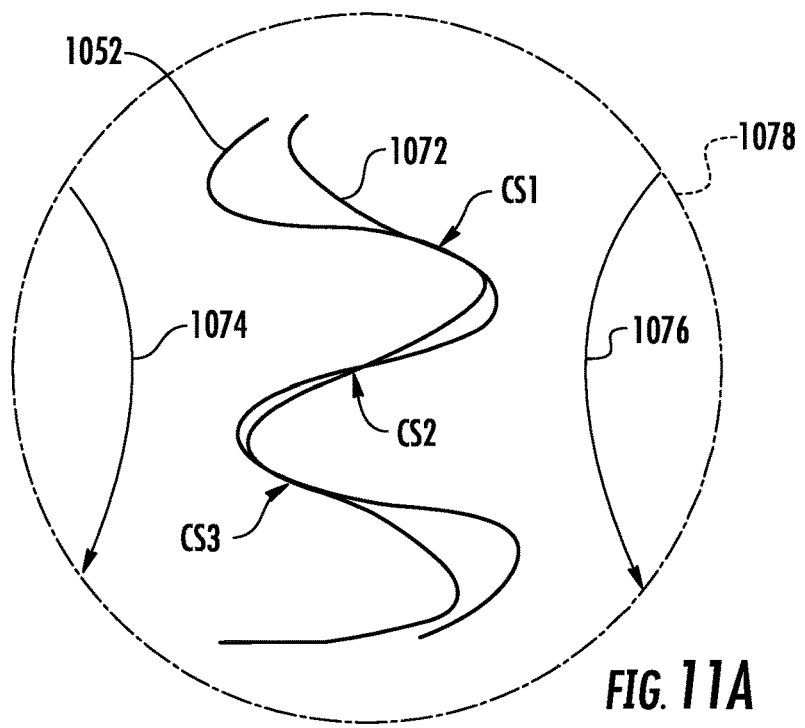
FIG. 11
FIG. 11A

HYDROSTATIC TRANSMISSION ASSEMBLY AND SYSTEM

PRIORITY

The present application is a continuation of U.S. patent application Ser. No. 15/520,386 filed on Apr. 19, 2017, which is a 371 filing of International Application No. PCT/US2015/054145, which was filed Oct. 6, 2015, and which claims priority to U.S. Provisional Patent Application Nos. 62/066,238 and 62/066,255 filed on Oct. 20, 2014; 62/075,689 filed on Nov. 5, 2014; 62/076,401 filed on Nov. 6, 2014; and 62/213,261 filed on Sep. 2, 2015, which applications are incorporated herein by reference in their entirety.

TECHNICAL FIELD

The present invention relates generally to fluid pumping systems with hydrostatic transmission assemblies and control methodologies thereof, and more particularly to a hydrostatic transmission assembly having at least one pump assembly, at least one proportional control valve assembly and a hydraulic motor; and control methodologies thereof in a fluid pumping system, including adjusting at least one of a flow and a pressure in the system by establishing a speed and/or torque of each prime mover in the at least one pump assembly and concurrently establishing an opening of at least one control valve in the at least one proportional control valve assembly.

BACKGROUND OF THE INVENTION

Hydrostatic transmission assemblies are widely used in a variety of applications ranging from small to heavy load applications. The hydraulic motors in hydrostatic transmission assemblies are used to cause rotational movement in systems such as, e.g., hydraulic systems. Often, one or more hydrostatic transmission assemblies are included in the system which can be subject to frequent loads in a harsh working environment, e.g., in the hydraulic systems of industrial machines such as excavators, front-end loaders, and cranes. Typically, in such conventional machines, the actuator components include numerous parts such as a hydraulic motor, a central hydraulic pump, a motor to drive the pump, a fluid reservoir and appropriate valves that are all operatively connected to perform work on a load, e.g., rotating an excavator blade or a grader blade on an excavator.

The motor drives the hydraulic pump to provide pressurized fluid from the fluid reservoir to the hydraulic motor, which in turn causes the shaft of the hydraulic motor to move the load that is attached to the hydraulic motor. When the fluid exits the outlet of the hydraulic motor, the fluid is sent back to the fluid reservoir. To control the flow, the hydraulic system can include a variable-displacement hydraulic pump and/or include a hydraulic pump in combination with a directional flow control valve (or another type of flow control device). In these types of systems, the motor that drives the hydraulic pump is often run at constant speed and the directional flow control valve (or other flow device) controls the flow rate of the hydraulic fluid. The directional flow control valve can also provide the appropriate porting to the hydraulic motor to rotate the motor. The pump is kept at a constant speed because the inertia of the hydraulic pump in the above-described industrial applications makes it impractical to vary the speed of the hydraulic pump to precisely control the flow or pressure in the system. That is, the prior art pumps in such industrial machines are not very responsive to changes in flow and pressure demand. Thus, the hydraulic pump is run at a constant speed, e.g., full speed, to ensure that there is always adequate fluid pressure at the flow control devices. However, running the hydraulic pump at full speed or at some other constant speed is inefficient as it does not take into account the true energy input requirements of the system. For example, the pump will run at full speed even when the system load is only at 50%. In addition, along with being inefficient, operating the pump at full speed will increase the temperature of the hydraulic fluid. Further, the flow control devices in these systems typically use hydraulic controls to operate, which are complex and can require additional hydraulic fluid in the system.

Because of the complexity of the hydraulic circuits and controls, the hydraulic systems described above are typically open-loop in that the pump draws the hydraulic fluid from a large fluid reservoir and the hydraulic fluid is sent back to the reservoir after performing work on the hydraulic actuator and controls. That is, the output hydraulic fluid from the hydraulic actuator and the hydraulic controls is not sent directly to the inlet of the pump as in closed-loop systems, which tend to be for simple systems where the risk of pump cavitation is minimal. The open-loop system helps to prevent cavitation by ensuring that there always an adequate supply of fluid for the pump and the relatively large fluid reservoir in these systems helps maintain the temperature of the hydraulic fluid at a reasonable level. However, the open-loop system further adds to the inefficiency of the system because the fluid resistance of the system is increased with the fluid reservoir. In addition, the various components in an open-loop system are often located spaced apart from one another. To interconnect these parts, various additional components like connecting shafts, hoses, pipes, and/or fittings are used, which further adds to the complexity and resistance of the system. Accordingly, the above-described hydraulic systems can be relatively large, heavy and complex, and the components are susceptible to damage or degradation in the harsh working environments, thereby causing increased machine downtime and reduced reliability. Thus, known systems have undesirable drawbacks with respect to complexity and reliability of the systems.

Further limitation and disadvantages of conventional, traditional, and proposed approaches will become apparent to one skilled in the art, through comparison of such approaches with embodiments of the present invention as set forth in the remainder of the present disclosure with reference to the drawings.

SUMMARY OF THE INVENTION

Preferred embodiments of the present invention are directed to a fluid system that includes a hydrostatic transmission assembly and a control system to operate a load. The hydrostatic transmission assembly includes a fluid-operated motor that controls the load. The hydrostatic transmission assembly also includes at least one pump assembly having a variable-speed and/or a variable-torque pump and at least one proportional control valve assembly having a proportional control valve. The control system further includes a controller that concurrently operates the at least one pump assembly and the at least one proportional control valve assembly in order to control a flow and/or a pressure of the fluid in the fluid system. As used herein, "fluid" means a liquid or a mixture of liquid and gas containing mostly liquid with respect to volume. The at least one pump assembly and the at least one proportional control valve assembly provide fluid to the motor, which can be, e.g., a fluid-actuated motor that controls a load such as, e.g., an excavator or grader blade of an excavator or some other equipment or device that can be operated by a hydraulic motor. In some embodiments, the at least one pump assembly can include at least one storage device for storing the fluid used by the system. In some embodiments, the hydrostatic transmission assembly is an integrated hydrostatic transmission assembly in which the hydraulic motor is conjoined with the at least one pump assembly. "Conjoined with" means that the devices are fixedly connected or attached so as to form one integrated unit or module.

Each pump includes at least one fluid driver having a prime mover and a fluid displacement assembly. The prime mover drives the respective fluid displacement assembly to transfer the fluid from the inlet port to the outlet port of the pump. In some embodiments, the pump includes at least two fluid drivers and each fluid displacement assembly includes a fluid displacement member. The prime movers, e.g., electric motors, independently drive the respective fluid displacement members, e.g., gears, such that the fluid displacement members transfer the fluid (drive-drive configuration). In some embodiments, the pump includes one fluid driver and the fluid displacement assembly has at least two fluid displacement members. The prime mover drives a first displacement member, which then drives the other fluid displacement member(s) in the pump to transfer the fluid (a driver-driven configuration). In some exemplary embodiments, at least one shaft of a fluid driver, e.g., a shaft of the prime mover and/or a shaft of the fluid displacement member and/or a common shaft of the prime mover/fluid displacement member (depending on the configuration of the pump), is of a flow-through configuration and has a through-passage that permits fluid communication between at least one of the input port and the output port of the pump and the at least one fluid storage device. In some exemplary embodiments, the casing of the pump includes at least one balancing plate with a protruding portion to align the fluid drivers with respect to each other. In some embodiments the protruding portion or another portion of the pump casing has cooling grooves to direct a portion of the fluid being pumped to bearings disposed between the fluid driver and the protruding portion or to another portion of the fluid driver.

Each proportional control valve assembly includes a control valve actuator and a proportional control valve that is driven by the control valve actuator. In some embodiments, the control valve can be a ball-type control valve. In some embodiments, the hydrostatic transmission assembly can include a sensor array that measures various system parameters such as, for example, flow, pressure, temperature or some other system parameter. The sensor array can be disposed in the proportional control valve assembly in some exemplary embodiments.

The controller concurrently establishes a speed and/or a torque of the prime mover of each fluid driver and an opening of each proportional control valve so as to control a flow and/or a pressure in the fluid system to an operational setpoint. Thus, unlike a conventional fluid system, the pump is not run at a constant speed while a separate flow control device (e.g., directional flow control valve) independently controls the flow and/or pressure in the system. Instead, in exemplary embodiments of the present disclosure, the pump speed and/or torque is controlled concurrently with the opening of each proportional control valve. The hydrostatic transmission system and method of control thereof of the present disclosure are particularly advantageous in a closed-loop type system since the system and method of control provides for a more compact configuration without increasing the risk of pump cavitation or high fluid temperatures as in conventional systems. Thus, in some embodiments of the hydrostatic transmission assembly, the hydraulic motor and the at least one pump assembly form a closed-loop system.

An exemplary embodiment of the present disclosure includes a method that provides for precise control of the fluid flow and/or pressure in a hydrostatic transmission system by concurrently controlling at least one variable-speed and/or a variable-torque pump and at least one proportional control valve to control a load. The fluid system includes a hydrostatic transmission assembly having at least one fluid pump assembly and a hydraulic motor. In some embodiments, the hydraulic motor is conjoined with the at least one pump assembly. The method includes controlling a load using a hydraulic motor which is controlled by at least one pump assembly that includes a fluid pump and at least one proportional control valve assembly. In some embodiments, the method includes providing excess fluid from the hydrostatic transmission system to at least one storage device for storing fluid, and transferring fluid from the storage device to the hydrostatic transmission system when needed by the hydrostatic transmission system. The method further includes establishing at least one of a flow and a pressure in the system to maintain an operational set point for controlling the load. The at least one of a flow and a pressure is established by controlling a speed and/or torque of the pump and concurrently controlling an opening of the at least one proportional control valve to adjust the flow and/or the pressure in the system to the operational set point. In some embodiments of the hydrostatic transmission assembly and the at least one pump assembly form a closed-loop fluid system. In some embodiments, the system is a hydraulic system and the preferred hydraulic motor is a hydraulic motor. In addition, in some exemplary embodiments, the pump is a hydraulic pump and the proportional control valves are ball valves.

The summary of the invention is provided as a general introduction to some embodiments of the invention, and is not intended to be limiting to any particular hydrostatic transmission assembly or controller system configuration. It is to be understood that various features and configurations of features described in the Summary can be combined in any suitable way to form any number of embodiments of the invention. Some additional example embodiments including variations and alternative configurations are provided herein.

BRIEF DESCRIPTION OF THE DRAWINGS

The accompanying drawings, which are incorporated herein and constitute part of this specification, illustrate exemplary embodiments of the invention, and, together with the general description given above and the detailed description given below, serve to explain the features of the exemplary embodiments of the invention.

FIG. 3 shows an exploded view of an exemplary embodiment of a pump assembly having an external gear pump and a storage device.

FIG. 11 illustrates an exemplary flow path of the external gear pump of FIG. 10.

FIG. 11A shows a cross-sectional view illustrating gear meshing between two gears in an overlapping area of FIG. 11.

DETAILED DESCRIPTION OF THE PREFERRED EMBODIMENTS

Figure 1:
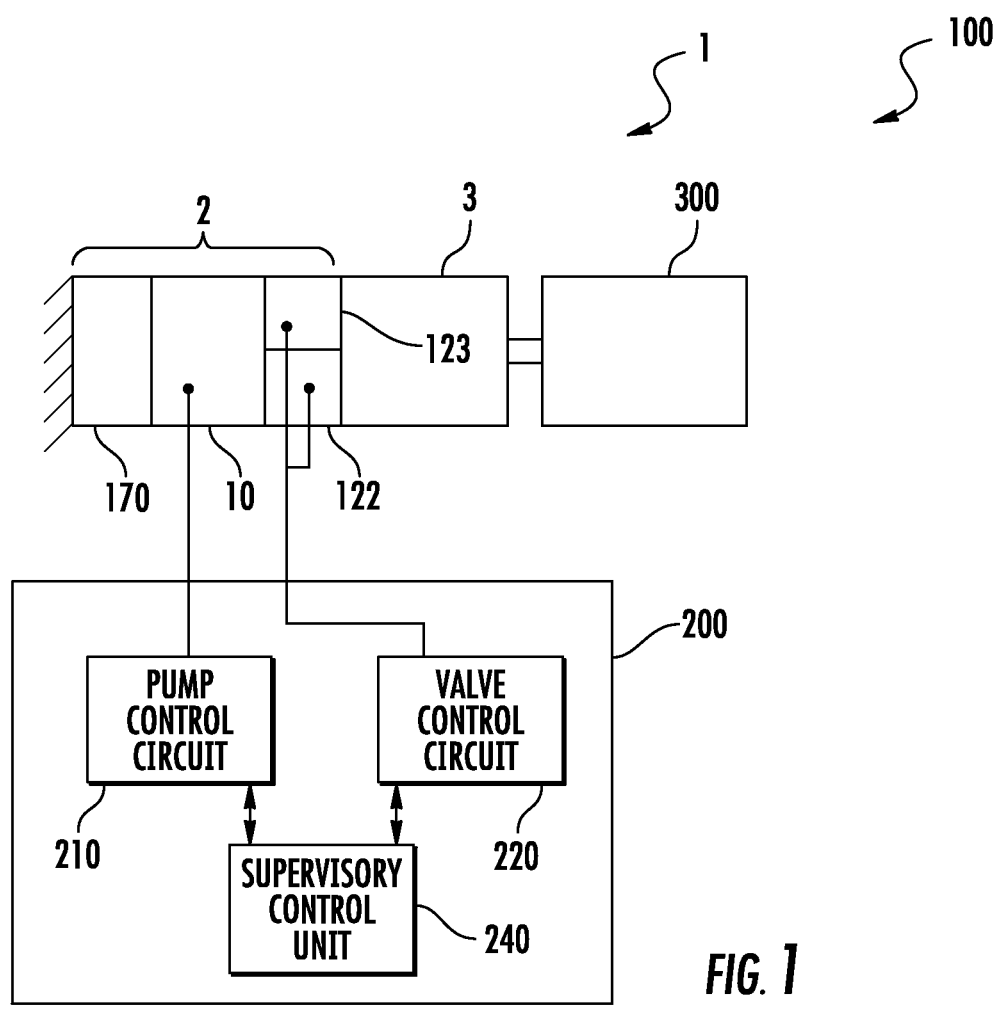
FIG. 1 is a block diagram of hydrostatic transmission system with a preferred embodiment of a hydrostatic transmission assembly and control system.

Exemplary embodiments are directed to a fluid system that includes a hydrostatic transmission assembly and a control system to operate a load such as, e.g., a rotatable blade of an excavator. In some embodiments, the hydrostatic transmission assembly includes a hydraulic motor and at least one pump assembly conjoined with the hydraulic motor to provide fluid to operate the hydraulic motor. The integrated pump assembly includes a pump with at least one fluid driver having a prime mover and a fluid displacement assembly to be driven by the prime mover such that fluid is transferred from a first port of the pump to a second port of the pump. The pump assembly also includes at least one proportional control valve assembly with a proportional control valve. In addition, in some embodiments, at least one of the pump assembly and the hydraulic motor can include lock valves to isolate the respective devices from the system. The fluid system also includes a controller that establishes at least one of a speed and a torque of the at least one prime mover and concurrently establishes an opening of at least one proportional control valve to adjust at least one of a flow and a pressure in the hydrostatic transmission system to an operational set point. The hydrostatic transmission system can include sensor assemblies to measure system parameters such as pressure, temperature and/or flow. In some embodiments, the hydrostatic transmission assembly contains more than one pump assembly, which can be connected in a parallel or serial configuration depending on, e.g., the requirements of the system. In some embodiments, the at least one proportional control valve assembly can be disposed separately from the at least one pump assembly, i.e., the control valve assemblies are not integrated into the pump assembly.

In some embodiments, the pump includes at least one prime mover that is disposed internal to the fluid displacement member. In other exemplary embodiments, at least one prime mover is disposed external to the fluid displacement member but still inside the pump casing, and in still further exemplary embodiments, at least one prime mover is disposed outside the pump casing. In some exemplary embodiments, the pump includes at least two fluid drivers with each fluid driver including a prime mover and a fluid displacement member. In other exemplary embodiments of the hydrostatic transmission system, the pump includes one fluid driver with the fluid driver including a prime mover and at least two fluid displacement members. In some exemplary embodiments, at least one shaft of a fluid driver, e.g., a shaft of the prime mover and/or a shaft of the fluid displacement member and/or a common shaft of the prime mover/fluid displacement member (depending on the configuration of the pump), is a flow-through shaft that includes a through-passage configuration which allows fluid communication between at least one port of the pump and at least one fluid storage device. In some exemplary embodiments, the at least one fluid storage device is conjoined with the pump assembly to provide for a more compact hydrostatic transmission assembly.

The exemplary embodiments of the fluid system, including the hydrostatic transmission assembly and control system, will be described using embodiments in which the pump is an external gear pump with either one or two fluid drivers, the prime mover is an electric motor, and the fluid displacement member is an external spur gear with gear teeth. However, those skilled in the art will readily recognize that the concepts, functions, and features described below with respect to the electric-motor driven external gear pump can be readily adapted to external gear pumps with other gear configurations (helical gears, herringbone gears, or other gear teeth configurations that can be adapted to drive fluid), internal gear pumps with various gear configurations, to pumps with more than two fluid drivers, to prime movers other than electric motors, e.g., hydraulic motors or other fluid-driven motors, internal-combustion, gas or other type of engines or other similar devices that can drive a fluid displacement member, to pumps with more than two fluid displacement members, and to fluid displacement members other than an external gear with gear teeth, e.g., internal gear with gear teeth, a hub (e.g. a disk, cylinder, or other similar component) with projections (e.g. bumps, extensions, bulges, protrusions, other similar structures, or combinations thereof), a hub (e.g. a disk, cylinder, or other similar component) with indents (e.g., cavities, depressions, voids or similar structures), a gear body with lobes, or other similar structures that can displace fluid when driven.

FIG. 1 shows an exemplary block diagram of a fluid system 100. The fluid system 100 includes a hydrostatic transmission assembly 1 that operates a load 300, i.e., rotates the load 300. As discussed in more detail below, the hydrostatic transmission assembly 1 includes an actuator, which can be, e.g., a hydraulic motor 3, and a pump assembly 2. The pump assembly 2 includes pump 10, proportional control valve assemblies 122 and 123 and storage device 170. The hydraulic motor 3 is operated by fluid from pump 10, which is controlled by a controller 200. The controller 200 includes a pump control circuit 210 that controls pump 10 and a valve control circuit 220 that concurrently controls proportional control valve assemblies 122 and 123 to establish at least one of a flow and a pressure to the hydraulic motor 3. As discussed below in more detail, the pump control circuit 210 and the valve control circuit 220 include hardware and/or software that interpret process feedback signals and/or command signals, e.g., flow and/or pressure setpoints, from a supervisory control unit 240 and/or a user and send the appropriate demand signals to the pump 10 and the control valve assemblies 122, 123 to position the load 300. For brevity, description of the exemplary embodiments are given with respect to a hydraulic fluid system with a hydraulic pump and a hydraulic motor. However, the inventive features of the present disclosure are applicable to fluid systems other than hydraulic systems. In addition, the hydrostatic transmission assembly 1 of the present disclosure is applicable to various types of hydraulic actuators. A detailed description of the components in the hydrostatic transmission assembly 1 and the control of hydrostatic transmission assembly 1 is given below.

Figure 2:
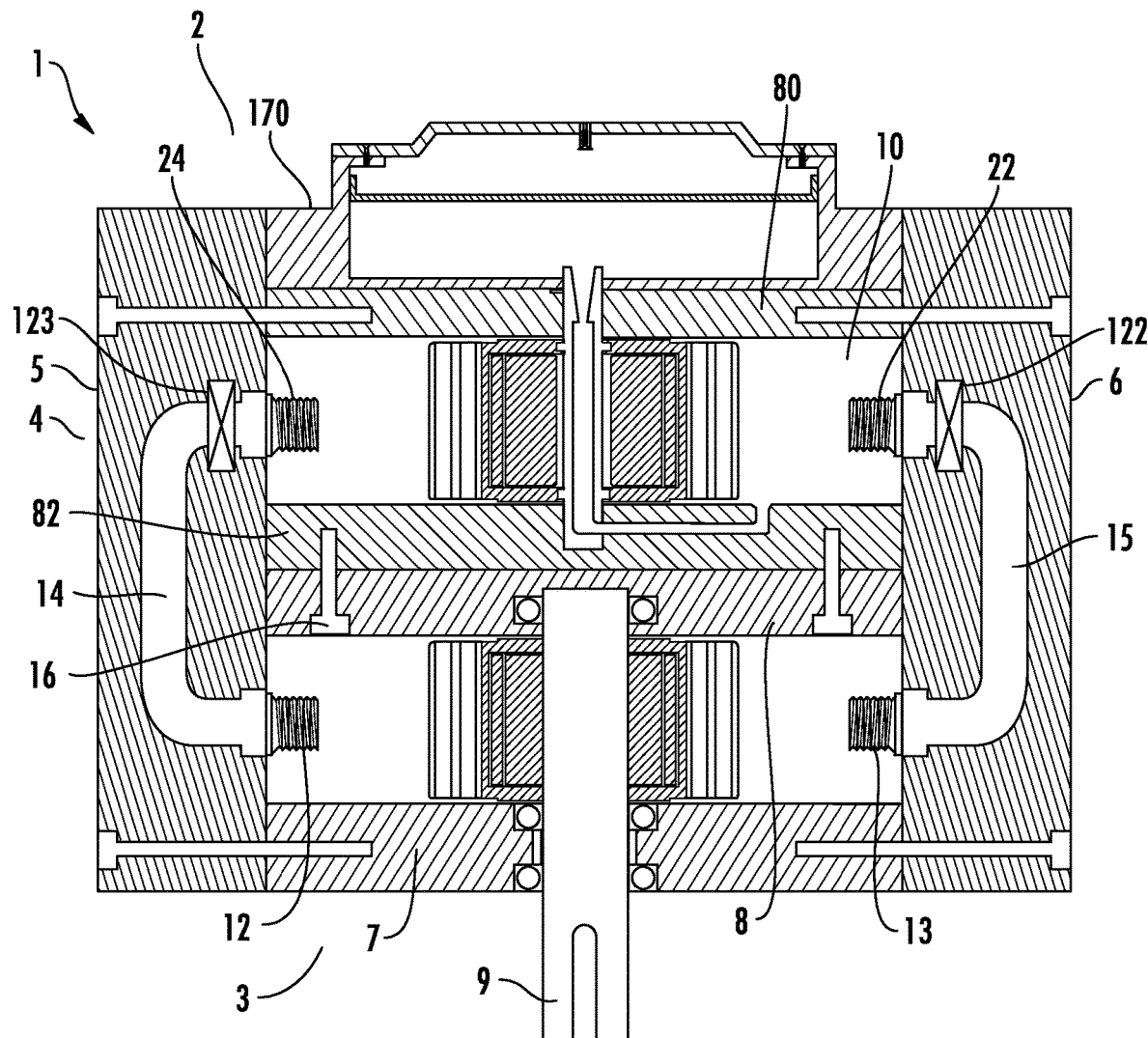
FIG. 2 is a side cross-sectional view of a preferred embodiment of a hydrostatic transmission assembly.

FIG. 2 shows a side cross-sectional view of a preferred embodiment of a hydrostatic transmission assembly 1. The hydrostatic transmission assembly 1 includes a hydraulic pump assembly 2 conjoined with a hydraulic motor 3. The pump assembly 2 can include valve assemblies 122 and 123 and storage device 170. The pump assembly 2 and the hydraulic motor 3 can be attach to a transmission casing 4. The transmission casing 4 has an upper casing 5 and a lower casing 6. The pump assembly 2 and the hydraulic motor 3 are disposed in the transmission casing 4. The hydraulic motor 3 is driven by a hydraulic pump 10, which will be described in detail later. The hydraulic motor 3 has a motor casing 11 (shown in FIG. 2B) that includes a top plate 7 and a bottom plate 8. The motor casing 11 has a port 12 and a port 13. Internal surfaces of the top and bottom plates 7, 8 define an interior volume of the hydraulic motor 3. The top plate 7 is conjoined with the transmission casing 4. Specifically, in the embodiment shown in FIG. 2A, the top plate 7 is conjoined with the upper and lower casings 5, 6 through a plurality of bolts. The hydraulic motor 3 includes an output shaft 9 extending through the top plate 7. The output shaft 9 may be coupled to an external load, e.g. an excavator, to which power generated by the hydrostatic transmission assembly 1 is to be transmitted.

Figure 2A:
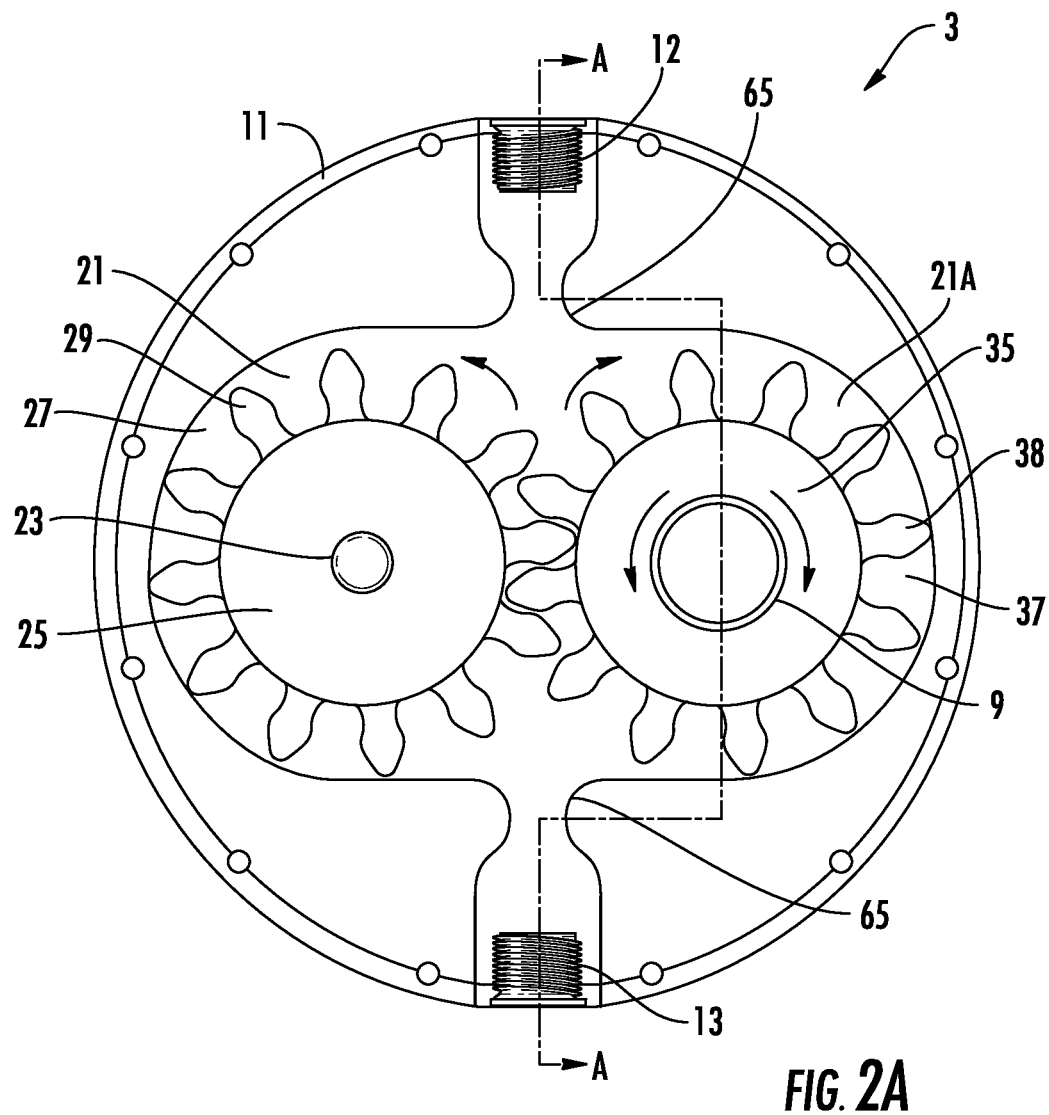
FIG. 2A shows a top cross-sectional view of the hydraulic motor of the hydrostatic transmission assembly of FIG. 2.

On the opposite side, i.e. on the right side in FIG. 2A, of the hydraulic motor 3 is disposed the pump assembly 2. The pump assembly 2 includes an external gear pump 10, valve assemblies 122 and 123 and a storage device 170. In some embodiments, the valve assemblies may be disposed separately from the pump assembly, e.g., as part of hydraulic motor 3 or hydraulic motor 3 can have an additional set of valve assemblies. The pump assembly 2, along with valve assemblies 122 and 123, is conjoined with the transmission casing 4. Specifically, in the embodiment shown in FIG. 2A, the end plate 80 is conjoined with the upper and lower casings 5, 6 through a plurality of bolts. The lower plate 82 is conjoined with the bottom plate 8 of the motor casing 11 through a plurality of bolts 16. The pump casing 20 has a port 22 and a port 24. The transmission casing 4 includes conduits therein, through which fluid can be communicated between the hydraulic pump 10 and the hydraulic motor 3. The pump outlet 24 is in fluid communication with the port 12 of the hydraulic motor 3 via the valve assembly 123 through a first u-shaped conduit 14 in the upper casing 5. The port 22 is in fluid communication with the port 13 of the hydraulic motor 3 via the valve assembly 122 through a second u-shaped conduit 15 in the lower casing 6. In the illustrated embodiment, the pump 10 is an external gear pump. However, as discussed below the present disclosure is not limited to an external gear pump. The fluid passages between hydraulic motor 3, pump assembly 2, and valve assemblies 122 and 123 can be either internal or external depending on the configuration of the hydrostatic transmission assembly 1.

Figure 2B:
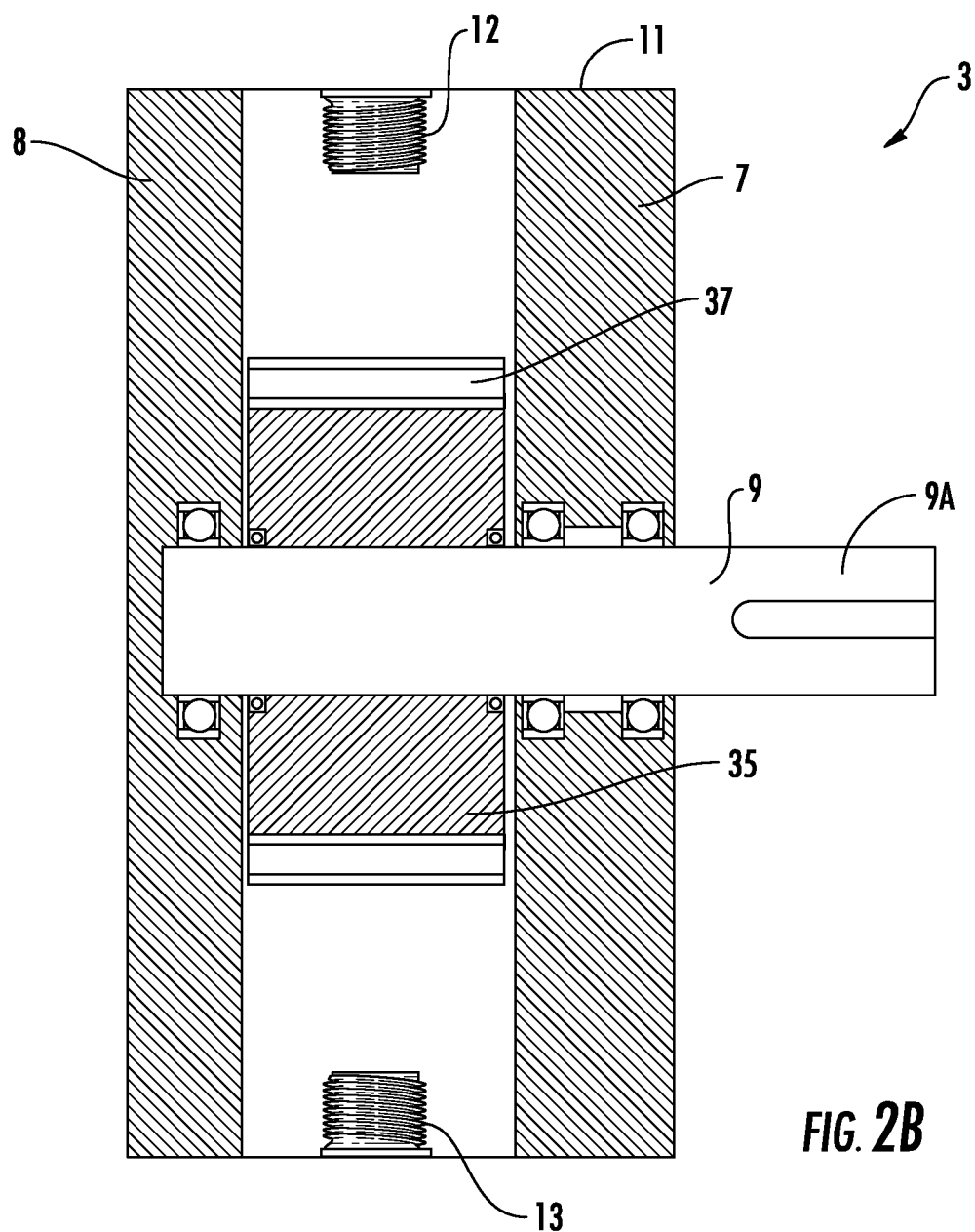
FIG. 2B shows a side cross-sectional view of the hydraulic motor of the hydrostatic transmission assembly of FIG. 2.

FIGS. 2A and 2B respectively show top and side cross-sectional views of the hydraulic motor 3. In the exemplary embodiment of FIG. 2B, the hydraulic motor 3 is an external gear hydraulic motor. However, the type of hydraulic motor is not limiting and other types of fluid-driven motor configurations can be used. The hydraulic motor 3 includes gear assembly 21 and gear assembly 21A. The gear assembly 21 includes a shaft 23, a gear body 25, and a gear 27 having a plurality of gear teeth 29. The shaft 23 is fixedly connected to the gear body 25 such that the gear body 25 is rotatably movable with shaft 23. The gear assembly 21A includes a shaft (or output shaft) 9, a gear body 35, and a gear 37 having a plurality of gear teeth 38. The shaft 9 is fixedly connected to the gear body 25 such that the gear body 35 is rotatably movable with shaft 9. The shaft 9 extends through the plate 7 such that the other end 9A of the shaft 9 is disposed outside the motor casing 11. The end 9A may be coupled to an external device (or an external load), e.g., an excavator, to which power generated by the hydrostatic transmission assembly 1 is to be transmitted. The motor casing 11 may include a neck portion 65 near the ports 12, 13. The neck portion 65 reduces turbulence in the fluid entering and exiting the central area where the gear assemblies 21, 21A are located. Thus, more stabilized fluid enters and exits the central area of the hydraulic motor 3, thereby improving efficiency of the hydraulic system. Depending on desired direction of rotation, high pressure fluid is delivered to the hydraulic motor 3 through either port 12 or 13 by operation of the pump assembly 2, which will be described in detail later. Operation of the hydraulic motor 3 is known to those skilled in the art and thus, for brevity, will not be further discussed.

FIG. 3 shows an exploded view of an exemplary embodiment of a pump assembly, e.g., pump assembly 2 having the pump 10 and the storage device 170. For clarity, the proportional control valve assemblies 122 and 123 are not shown. The configuration and operation of pump 10 and storage device 170 can be found in Applicant's co-pending U.S. application Ser. No. 14/637,064 filed Mar. 3, 2015 and International Application No. PCT/US15/018342 filed Mar. 2, 2015, which are incorporated herein by reference in their entirety. Thus, for brevity, detailed descriptions of the configuration and operation of pump 10 and storage device 170 are omitted except as necessary to describe the present exemplary embodiments. The pump 10 includes two fluid drivers 40, 60 that each include prime mover and fluid displacement member. In the illustrated exemplary embodiment of FIG. 3, the prime movers are electric motors 41, 61 and the fluid displacement members are spur gears 50, 70. In this embodiment, both pump motors 41, 61 are disposed inside the cylindrical openings 51, 71 of gears 50, 70 when assembled. However, as discussed below, exemplary embodiments of the present disclosure cover other motor/gear configurations.

As seen in FIG. 3, the pump 10 represents a positive-displacement (or fixed displacement) gear pump. The pair of gears 50, 70 are disposed in the internal volume 98. Each of the gears 50, 70 has a plurality of gear teeth 52, 72 extending radially outward from the respective gear bodies. The gear teeth 52, 72, when rotated by, e.g., electric motors 41, 61, transfer fluid from the inlet to the outlet. The pump 10 can be a variable speed and/or a variable torque pump, i.e., motors 41, 61 are variable speed and/or variable torque and thus rotation of the attached gear 50, 70 can be varied to create various volume flows and pump pressures. In some embodiments, the pump 10 is bi-directional, i.e., motors 41, 61 are bi-directional. Thus, either port 22, 24 can be the inlet port, depending on the direction of rotation of gears 50, 70, and the other port will be the outlet port.

Figure 4:
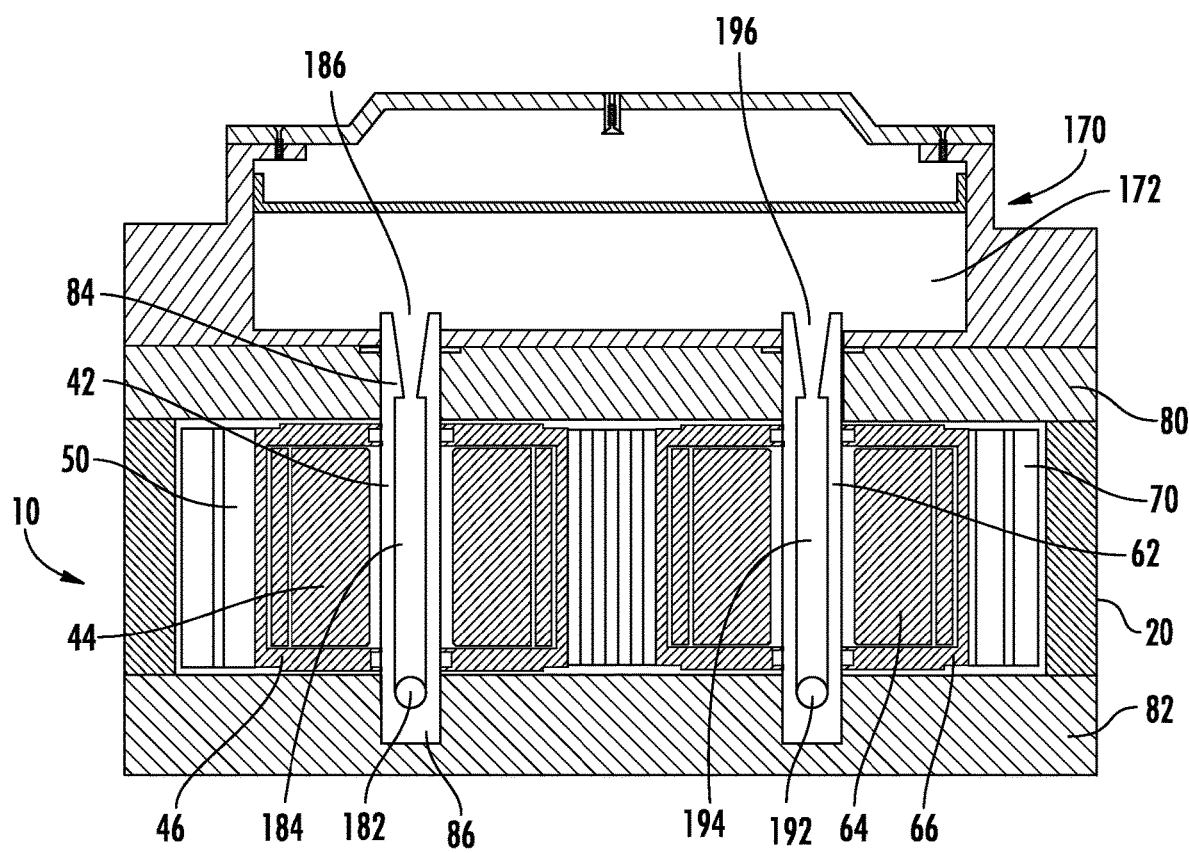
FIG. 4 shows an assembled side cross-sectional view of the exemplary embodiment of the pump assembly of FIG. 3.
Figure 4A:
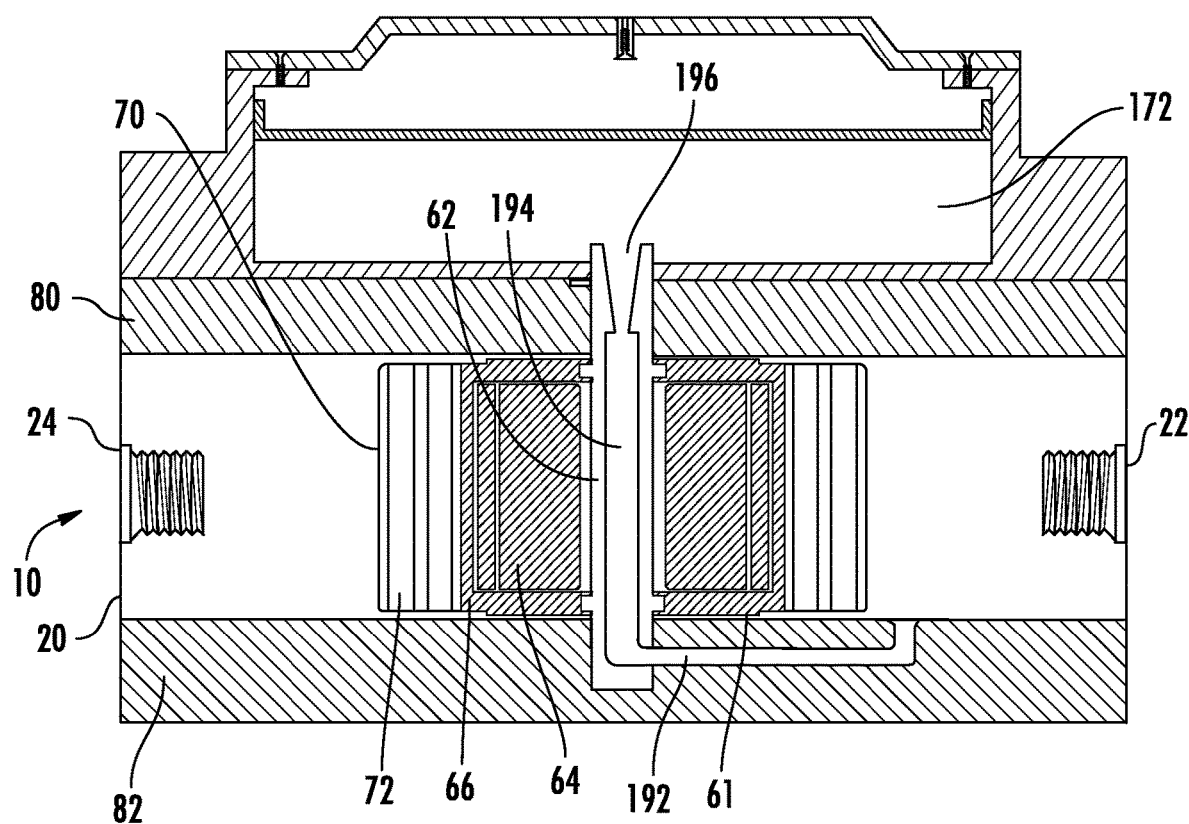
FIG. 4A shows another assembled side cross-sectional view of the exemplary embodiment of FIG. 3.

FIGS. 4 and 4A show different assembled side cross-sectional views of the external gear pump 10 of FIG. 3 but also include the corresponding cross-sectional view of the storage device 170. As seen in FIGS. 4 and 4A, fluid drivers 40, 60 are disposed in the casing 20. The shafts 42, 62 of the fluid drivers 40, 60 are disposed between the port 22 and the port 24 of the casing 20 and are supported by the plate 80 at one end 84 and the plate 82 at the other end 86. In the embodiment of FIGS. 3, 4 and 4A, each of the shafts are flow-through type shafts with each shaft having a through-passage that runs axially through the body of the shafts 42, 62. One end of each shaft connects with an opening of a channel in the end plate 82, and the channel connects to one of the ports 22, 24. For example, FIG. 3 illustrates a channel 192 (dotted line) that extends through the end plate 82. One opening of channel 192 accepts one end of the flow-through shaft 62 while the other end of channel 192 opens to port 22 of the pump 10. The other end of each flow-through shaft 42, 62 extends into the fluid chamber 172 (see FIG. 4) via openings in end plate 80. The stators 44, 64 of motors 41, 61 are disposed radially between the respective flow-through shafts 42, 62 and the rotors 46, 66. The stators 44, 64 are fixedly connected to the respective flow-through shafts 42, 62, which are fixedly connected to the openings in the casing 20. The rotors 46, 66 are disposed radially outward of the stators 44, 64 and surround the respective stators 44, 64. Thus, the motors 41, 61 in this embodiment are of an outer-rotor motor arrangement (or an external-rotor motor arrangement), which means that that the outside of the motor rotates and the center of the motor is stationary. In contrast, in an internal-rotor motor arrangement, the rotor is attached to a central shaft that rotates.

As shown in FIG. 3, the storage device 170 can be mounted to the pump 10, e.g., on the end plate 80 to form one integrated unit. The storage device 170 can store fluid to be pumped by the pump 10 and supply fluid needed to perform a commanded operation. In some embodiments, the storage device 170 in the pump 10 is a pressurized vessel that stores the fluid for the system. In such embodiments, the storage device 170 is pressurized to a specified pressure that is appropriate for the system. In an exemplary embodiment, as shown in FIGS. 4 and 4A, the flow-through shafts 42, 62 of fluid drivers 40, 60, respectively, penetrate through openings in the end plate 80 and into the fluid chamber 172 of the pressurized vessel. The flow-through shafts 42, 62 include through-passages 184, 194 that extend through the interior of respective shaft 42, 62. The through-passages 184, 194 have ports 186, 196 such that the through-passages 184, 194 are each in fluid communication with the fluid chamber 172. At the other end of flow-through shafts 42, 62, the through-passages 184, 194 connect to fluid passages (see, e.g., fluid passage 192 for shaft 62 in FIG. 3) that extend through the end plate 82 and connect to either port 22 or 24 such that the through-passages 184, 194 are in fluid communication with either the port 22 or the port 24. In this way, the fluid chamber 172 is in fluid communication with a port of pump 10. Thus, during operation, if the pressure at the relevant port drops below the pressure in the fluid chamber 172, the pressurized fluid from the storage device 170 is pushed to the appropriate port via passages 184, 194 until the pressures equalize. Conversely, if the pressure at the relevant port goes higher than the pressure of fluid chamber 172, the fluid from the port is pushed to the fluid chamber 172 via through-passages 184, 194.

Figure 4B:
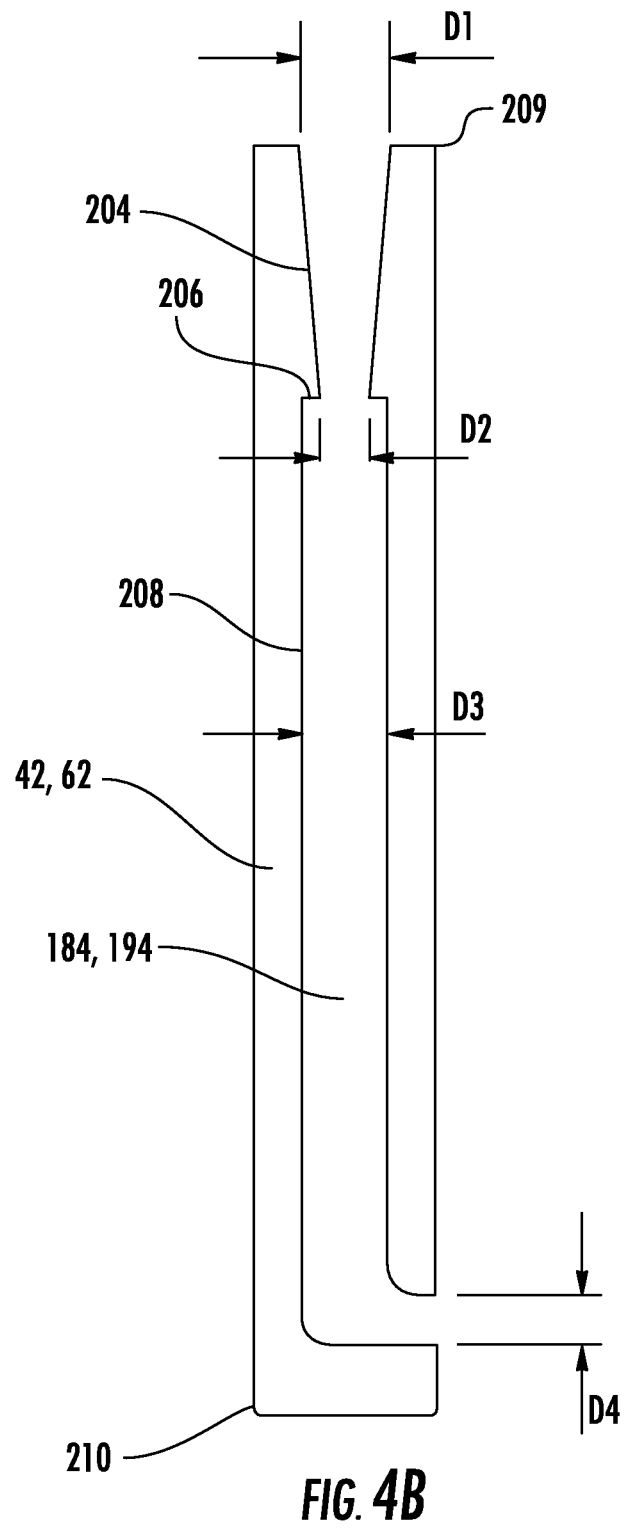
FIG. 4B shows an enlarged view of a preferred embodiment of a flow-through shaft with a through-passage.

FIG. 4B shows an enlarged view of an exemplary embodiment of the flow-through shaft 42, 62. The through-passage 184, 194 extend through the flow-through shaft 42, 62 from end 209 to end 210 and includes a tapered portion (or converging portion) 204 at the end 209 (or near the end 209) of the shaft 42, 62. The end 209 is in fluid communication with the storage device 170. The tapered portion 204 starts at the end 209 (or near the end 209) of the flow-through shaft 42, 62, and extends part-way into the through-passage 184, 194 of the flow-through shaft 42, 62 to point 206. In some embodiments, the tapered portion can extend 5% to 50% the length of the through-passage 184, 194. Within the tapered portion 204, the diameter of the through-passage 184, 194, as measured on the inside of the shaft 42, 62, is reduced as the tapered portion extends to end 206 of the flow-through shaft 42, 62. As shown in FIG. 4B, the tapered portion 204 has, at end 209, a diameter D1 that is reduced to a smaller diameter D2 at point 206 and the reduction in diameter is such that flow characteristics of the fluid are measurably affected. In some embodiments, the reduction in the diameter is linear. However, the reduction in the diameter of the through-passage 184, 194 need not be a linear profile and can follow a curved profile, a stepped profile, or some other desired profile. Thus, in the case where the pressurized fluid flows from the storage device 170 and to the port of the pump via the through-passage 184, 194, the fluid encounters a reduction in diameter (D1→D2), which provides a resistance to the fluid flow and slows down discharge of the pressurized fluid from the storage device 170 to the pump port. By slowing the discharge of the fluid from the storage device 170, the storage device 170 behaves isothermally or substantially isothermally. It is known in the art that near-isothermal expansion/compression of a pressurized vessel, i.e. limited variation in temperature of the fluid in the pressurized vessel, tends to improve the thermal stability and efficiency of the pressurized vessel in a fluid system. Thus, in this exemplary embodiment, as compared to some other exemplary embodiments, the tapered portion 204 facilitates a reduction in discharge speed of the pressurized fluid from the storage device 170, which provides for thermal stability and efficiency of the storage device 170.

As the pressurized fluid flows from the storage device 170 to a port of the pump 10, the fluid exits the tapered portion 204 at point 206 and enters an expansion portion (or throat portion) 208 where the diameter of the through-passage 184, 194 expands from the diameter D2 to a diameter D3, which is larger than D2, as measured to manufacturing tolerances. In the embodiment of FIG. 4B, there is step-wise expansion from D2 to D3. However, the expansion profile does not have to be performed as a step and other profiles are possible so long as the expansion is done relatively quickly. However, in some embodiments, depending on factors such the fluid being pumped and the length of the through-passage 184, 194, the diameter of the expansion portion 208 at point 206 can initially be equal to diameter D2, as measured to manufacturing tolerances, and then gradually expand to diameter D3. The expansion portion 208 of the through-passage 184, 194 serves to stabilize the flow of the fluid from the storage device 170. Flow stabilization may be needed because the reduction in diameter in the tapered portion 204 can induce an increase in speed of the fluid due to nozzle effect (or Venturi effect), which can generate a disturbance in the fluid. However, in the exemplary embodiments of the present disclosure, as soon as the fluid leaves the tapered portion 204, the turbulence in the fluid due to the nozzle effect is mitigated by the expansion portion 208. In some embodiments, the third diameter D3 is equal to the first diameter D1, as measured to manufacturing tolerances. In the exemplary embodiments of the present disclosure, the entire length of the flow-through shafts 42, 62 can be used to incorporate the configuration of through-passages 184, 194 to stabilize the fluid flow.

The stabilized flow exits the through passage 184, 194 at end 210. The through-passage 184, 194 at end 210 can be fluidly connected to either the port 22 or port 24 of the pump 10 via, e.g., channels in the end plate 82 (e.g., channel 192 for through-passage 194—see FIGS. 3, 4, and 4A). Of course, the flow path is not limited to channels within the pump casing and other means can be used. For example, the port 210 can be connected to external pipes and/or hoses that connect to port 22 or port 24 of pump 10. In some embodiments, the through-passage 184, 194 at end 210 has a diameter D4 that is smaller than the third diameter D3 of the expansion portion 208. For example, the diameter D4 can be equal to the diameter D2, as measured to manufacturing tolerances. In some embodiments, the diameter D1 is larger than the diameter D2 by 50 to 75% and larger than diameter D4 by 50 to 75%. In some embodiments, the diameter D3 is larger than the diameter D2 by 50 to 75% and larger than diameter D4 by 50 to 75%.

The cross-sectional shape of the fluid passage is not limiting. For example, a circular-shaped passage, a rectangular-shaped passage, or some other desired shaped passage may be used. Of course, the through-passage in not limited to a configuration having a tapered portion and an expansion portion and other configurations, including through-passages having a uniform cross-sectional area along the length of the through-passage, can be used. Thus, configuration of the through-passage of the flow-through shaft can vary without departing from the scope of the present disclosure.

In the above embodiments, the flow-through shafts 42, 62 penetrate a short distance into the fluid chamber 172. However, in other embodiments, either or both of the flow-through shafts 42, 62 can be disposed such that the ends are flush with a wall of the fluid chamber 172. In some embodiments, the end of the flow-through shaft can terminate at another location such as, e.g., in the end plate 80, and suitable means such, e.g., channels, hoses, or pipes can be used so that the shaft is in fluid communication with the fluid chamber 172. In this case, the flow-through shafts 42, 62 may be disposed completely between the upper and lower plates 80, 82 without penetrating into the fluid chamber 172.

As the pump 10 operates, there can be pressure spikes at the inlet and outlet ports (e.g., ports 22 and 24) of the pump 10 due to, e.g., operation of hydraulic motor 3, the load that is being operated by the hydraulic motor 3, valves that are being operated in the system or for some other reason. These pressure spikes can cause damage to components in the fluid system. In some embodiments, the storage device 170 can be used to smooth out or dampen the pressure spikes. In addition, the fluid system in which the pump 10 operates may need to either add or remove fluid from the main fluid flow path of the fluid system due to, e.g., operation of the actuator. Further, changes in fluid temperature can also necessitate the addition or removal of fluid in a closed-loop system. In such cases, any extra fluid in the system will need to be stored and any fluid deficiency will need to be replenished. The storage device 170 can store and release the required amount of fluid for stable operation.

Figure 5:
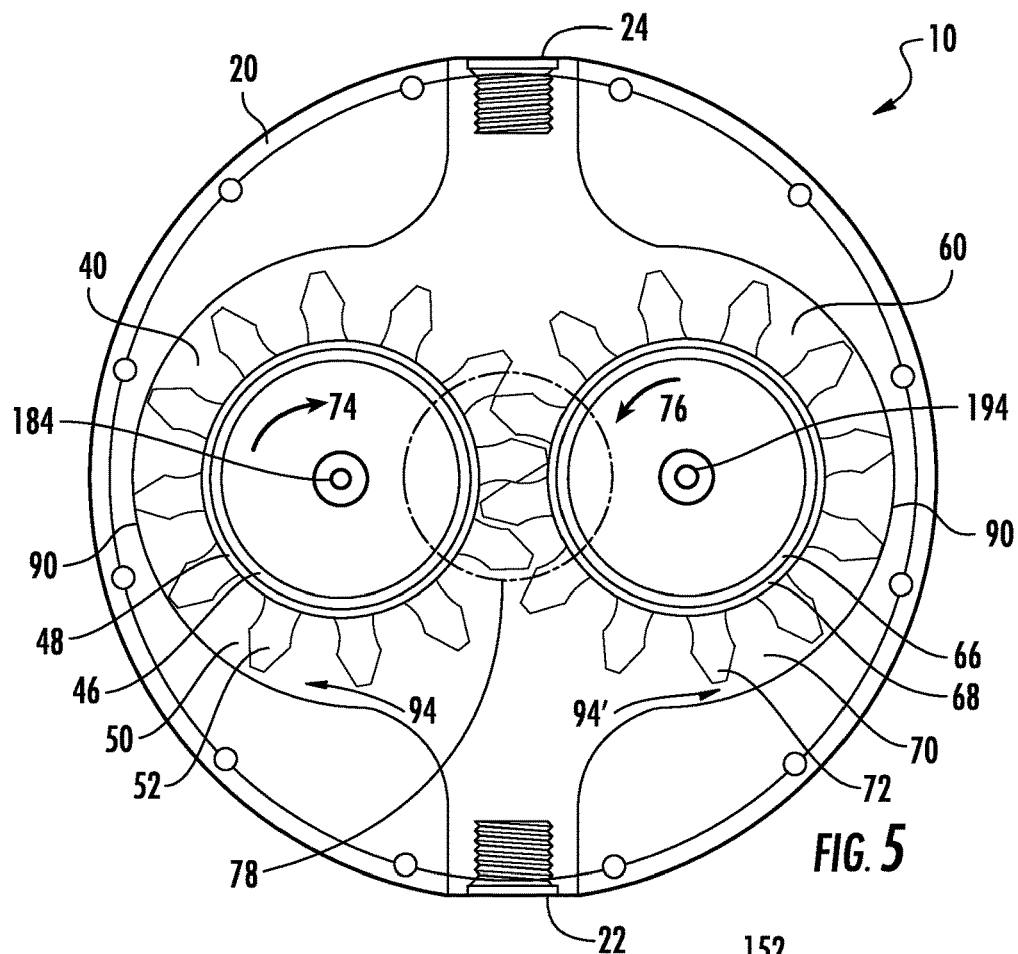
FIG. 5 illustrates an exemplary flow path of the external gear pump of FIG. 3.

FIG. 5 illustrates an exemplary fluid flow path of an exemplary embodiment of the external gear pump 10. A detailed operation of pump 10 is provided in Applicant's co-pending U.S. application Ser. No. 14/637,064 and International Application No. PCT/US15/018342, and thus, for brevity, is omitted except as necessary to describe the present exemplary embodiments. In exemplary embodiments of the present disclosure, both gears 50, 70 are respectively independently driven by the separately provided motors 41, 61. For explanatory purposes, the gear 50 is rotatably driven clockwise 74 by motor 41 and the gear 70 is rotatably driven counter-clockwise 76 by the motor 61. With this rotational configuration, port 22 is the inlet side of the gear pump 10 and port 24 is the outlet side of the gear pump 10.

To prevent backflow, i.e., fluid leakage from the outlet side to the inlet side through the contact area 78, contact between a tooth of the first gear 50 and a tooth of the second gear 70 in the contact area 78 provides sealing against the backflow. The contact force is sufficiently large enough to provide substantial sealing but, unlike driver-driven systems, the contact force is not so large as to significantly drive the other gear. In driver-driven systems, the force applied by the driver gear turns the driven gear. That is, the driver gear meshes with (or interlocks with) the driven gear to mechanically drive the driven gear. While the force from the driver gear provides sealing at the interface point between the two teeth, this force is much higher than that necessary for sealing because this force must be sufficient enough to mechanically drive the driven gear to transfer the fluid at the desired flow and pressure.

In some exemplary embodiments, however, the gears 50, 70 of the pump 10 do not mechanically drive the other gear to any significant degree when the teeth 52, 72 form a seal in the contact area 78. Instead, the gears 50, 70 are rotatably driven independently such that the gear teeth 52, 72 do not grind against each other. That is, the gears 50, 70 are synchronously driven to provide contact but not to grind against each other. Specifically, rotation of the gears 50, 70 are synchronized at suitable rotation rates so that a tooth of the gear 50 contacts a tooth of the second gear 70 in the contact area 78 with sufficient enough force to provide substantial sealing, i.e., fluid leakage from the outlet port side to the inlet port side through the contact area 78 is substantially eliminated. However, unlike a driver-driven configuration, the contact force between the two gears is insufficient to have one gear mechanically drive the other to any significant degree. Precision control of the motors 41, 61, will ensure that the gear positions remain synchronized with respect to each other during operation.

In some embodiments, rotation of the gears 50, 70 is at least 99% synchronized, where 100% synchronized means that both gears 50, 70 are rotated at the same rpm. However, the synchronization percentage can be varied as long as substantial sealing is provided via the contact between the gear teeth of the two gears 50, 70. In exemplary embodiments, the synchronization rate can be in a range of 95.0% to 100% based on a clearance relationship between the gear teeth 52 and the gear teeth 72. In other exemplary embodiments, the synchronization rate is in a range of 99.0% to 100% based on a clearance relationship between the gear teeth 52 and the gear teeth 72, and in still other exemplary embodiments, the synchronization rate is in a range of 99.5% to 100% based on a clearance relationship between the gear teeth 52 and the gear teeth 72. Again, precision control of the motors 41, 61, will ensure that the gear positions remain synchronized with respect to each other during operation. By appropriately synchronizing the gears 50, 70, the gear teeth 52, 72 can provide substantial sealing, e.g., a backflow or leakage rate with a slip coefficient in a range of 5% or less. For example, for typical hydraulic fluid at about 120 deg. F., the slip coefficient can be can be 5% or less for pump pressures in a range of 3000 psi to 5000 psi, 3% or less for pump pressures in a range of 2000 psi to 3000 psi, 2% or less for pump pressures in a range of 1000 psi to 2000 psi, and 1% or less for pump pressures in a range up to 1000 psi. Of course, depending on the pump type, the synchronized contact can aid in pumping the fluid. For example, in certain internal-gear georotor configurations, the synchronized contact between the two fluid drivers also aids in pumping the fluid, which is trapped between teeth of opposing gears. In some exemplary embodiments, the gears 50, 70 are synchronized by appropriately synchronizing the motors 41, 61. Synchronization of multiple motors is known in the relevant art, thus detailed explanation is omitted here.

Figure 5A:
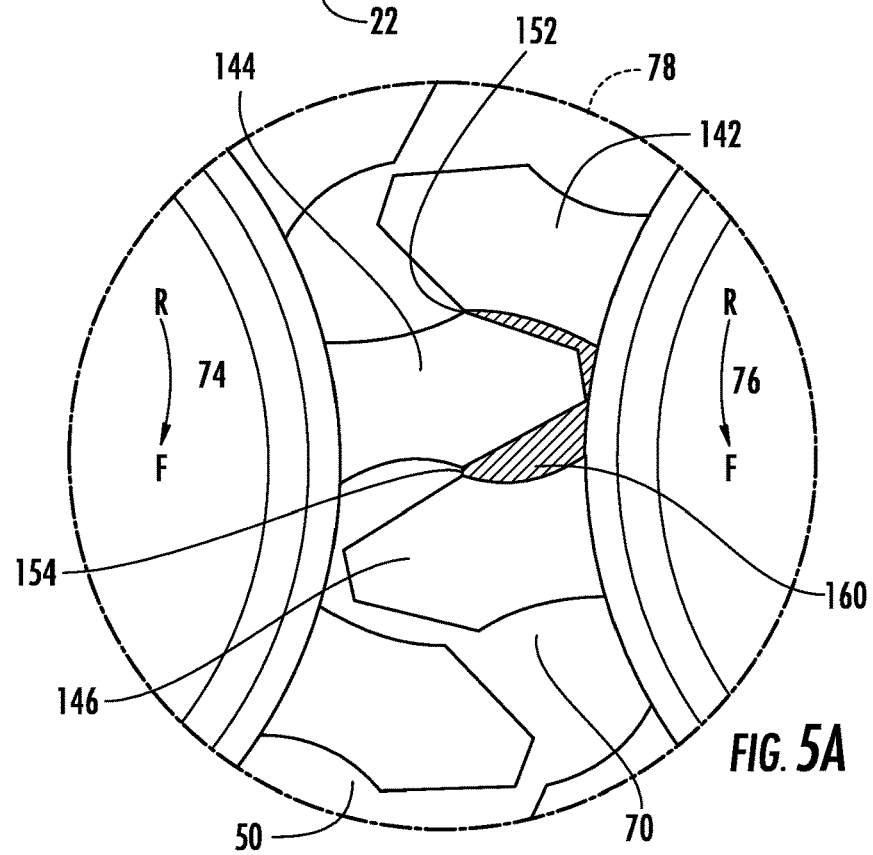
FIG. 5A shows a cross-sectional view illustrating one-sided contact between two gears in an overlapping area of FIG. 5.

In an exemplary embodiment, the synchronizing of the gears 50, 70 provides one-sided contact between a tooth of the gear 50 and a tooth of the gear 70. FIG. 5A shows a cross-sectional view illustrating this one-sided contact between the two gears 50, 70 in the contact area 78. For illustrative purposes, gear 50 is rotatably driven clockwise 74 and the gear 70 is rotatably driven counter-clockwise 76 independently of the gear 50. Further, the gear 70 is rotatably driven faster than the gear 50 by a fraction of a second, 0.01 sec/revolution, for example. This rotational speed difference in demand between the gear 50 and gear 70 enables one-sided contact between the two gears 50, 70, which provides substantial sealing between gear teeth of the two gears 50, 70 to seal between the inlet port and the outlet port, as described above. Thus, as shown in FIG. 5A, a tooth 142 on the gear 70 contacts a tooth 144 on the gear 50 at a point of contact 152. If a face of a gear tooth that is facing forward in the rotational direction 74, 76 is defined as a front side (F), the front side (F) of the tooth 142 contacts the rear side (R) of the tooth 144 at the point of contact 152. However, the gear tooth dimensions are such that the front side (F) of the tooth 144 is not in contact with (i.e., spaced apart from) the rear side (R) of tooth 146, which is a tooth adjacent to the tooth 142 on the gear 70. Thus, the gear teeth 52, 72 are configured such that there is one-sided contact in the contact area 78 as the gears 50, 70 are driven. As the tooth 142 and the tooth 144 move away from the contact area 78 as the gears 50, 70 rotate, the one-sided contact formed between the teeth 142 and 144 phases out. As long as there is a rotational speed difference in demand between the two gears 50, 70, this one-sided contact is formed intermittently between a tooth on the gear 50 and a tooth on the gear 70. However, because as the gears 50, 70 rotate, the next two following teeth on the respective gears form the next one-sided contact such that there is always contact and the backflow path in the contact area 78 remains substantially sealed. That is, the one-sided contact provides sealing between the ports 22 and 24 such that fluid carried from the pump inlet to the pump outlet is prevented (or substantially prevented) from flowing back to the pump inlet through the contact area 78.

In FIG. 5A, the one-sided contact between the tooth 142 and the tooth 144 is shown as being at a particular point, i.e. point of contact 152. However, a one-sided contact between gear teeth in the exemplary embodiments is not limited to contact at a particular point. For example, the one-sided contact can occur at a plurality of points or along a contact line between the tooth 142 and the tooth 144. For another example, one-sided contact can occur between surface areas of the two gear teeth. Thus, a sealing area can be formed when an area on the surface of the tooth 142 is in contact with an area on the surface of the tooth 144 during the one-sided contact. The gear teeth 52, 72 of each gear 50, 70 can be configured to have a tooth profile (or curvature) to achieve one-sided contact between the two gear teeth. In this way, one-sided contact in the present disclosure can occur at a point or points, along a line, or over surface areas. Accordingly, the point of contact 152 discussed above can be provided as part of a location (or locations) of contact, and not limited to a single point of contact.

In some exemplary embodiments, the teeth of the respective gears 50, 70 are configured so as to not trap excessive fluid pressure between the teeth in the contact area 78. As illustrated in FIG. 5A, fluid 160 can be trapped between the teeth 142, 144, 146. While the trapped fluid 160 provides a sealing effect between the pump inlet and the pump outlet, excessive pressure can accumulate as the gears 50, 70 rotate. In a preferred embodiment, the gear teeth profile is such that a small clearance (or gap) 154 is provided between the gear teeth 144, 146 to release pressurized fluid. Such a configuration retains the sealing effect while ensuring that excessive pressure is not built up. Of course, the point, line or area of contact is not limited to the side of one tooth face contacting the side of another tooth face. Depending on the type of fluid displacement member, the synchronized contact can be between any surface of at least one projection (e.g., bump, extension, bulge, protrusion, other similar structure or combinations thereof) on the first fluid displacement member and any surface of at least one projection (e.g., bump, extension, bulge, protrusion, other similar structure or combinations thereof) or an indent (e.g., cavity, depression, void or similar structure) on the second fluid displacement member. In some embodiments, at least one of the fluid displacement members can be made of or include a resilient material, e.g., rubber, an elastomeric material, or another resilient material, so that the contact force provides a more positive sealing area.

Figure 6:
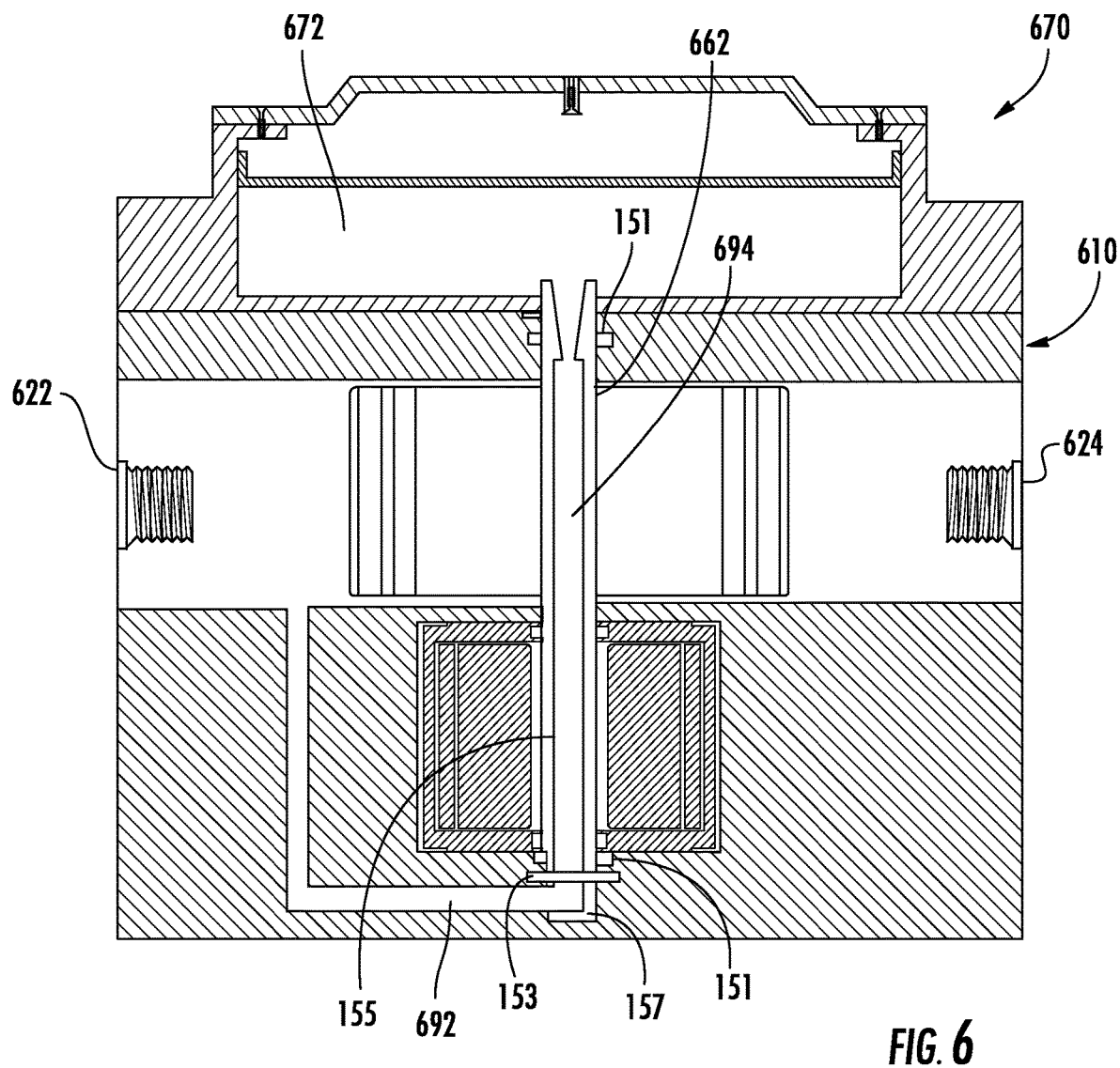
FIG. 6 shows a cross-sectional view of an exemplary embodiment of a pump assembly with two storage devices.

In the above exemplary embodiments, both shafts 42, 62 include a through-passage configuration. However, in some exemplary embodiments, only one of the shafts has a through-passage configuration while the other shaft can be a conventional shaft such as, e.g., a solid shaft. In addition, in some exemplary embodiments the flow-through shaft can be configured to rotate. For example, some exemplary pump configurations use a fluid driver with an inner-rotating motor. The shafts in these fluid drivers can also be configured as flow-through shafts. As seen in FIG. 6, the pump 610 includes a shaft 662 with a through-passage 694 that is in fluid communication with chamber 672 of storage device 670 and a port 622 of the pump 610 via channel 692. Thus, the fluid chamber 672 is in fluid communication with port 622 of pump 610 via through-passage 694 and channel 692.

The configuration of flow-through shaft 662 is different from that of the exemplary shafts described above because, unlike shafts 42, 62, the shaft 662 rotates. The flow-through shaft 662 can be supported by bearings 151 on both ends. In the exemplary embodiment, the flow-through shaft 662 has a rotary portion 155 that rotates with the motor rotor and a stationary portion 157 that is fixed to the motor casing. A coupling 153 can be provided between the rotary and stationary portions 155, 157 to allow fluid to travel between the rotary and stationary portions 155, 157 through the coupling 153 while the pump 610 operates.

Figure 7:
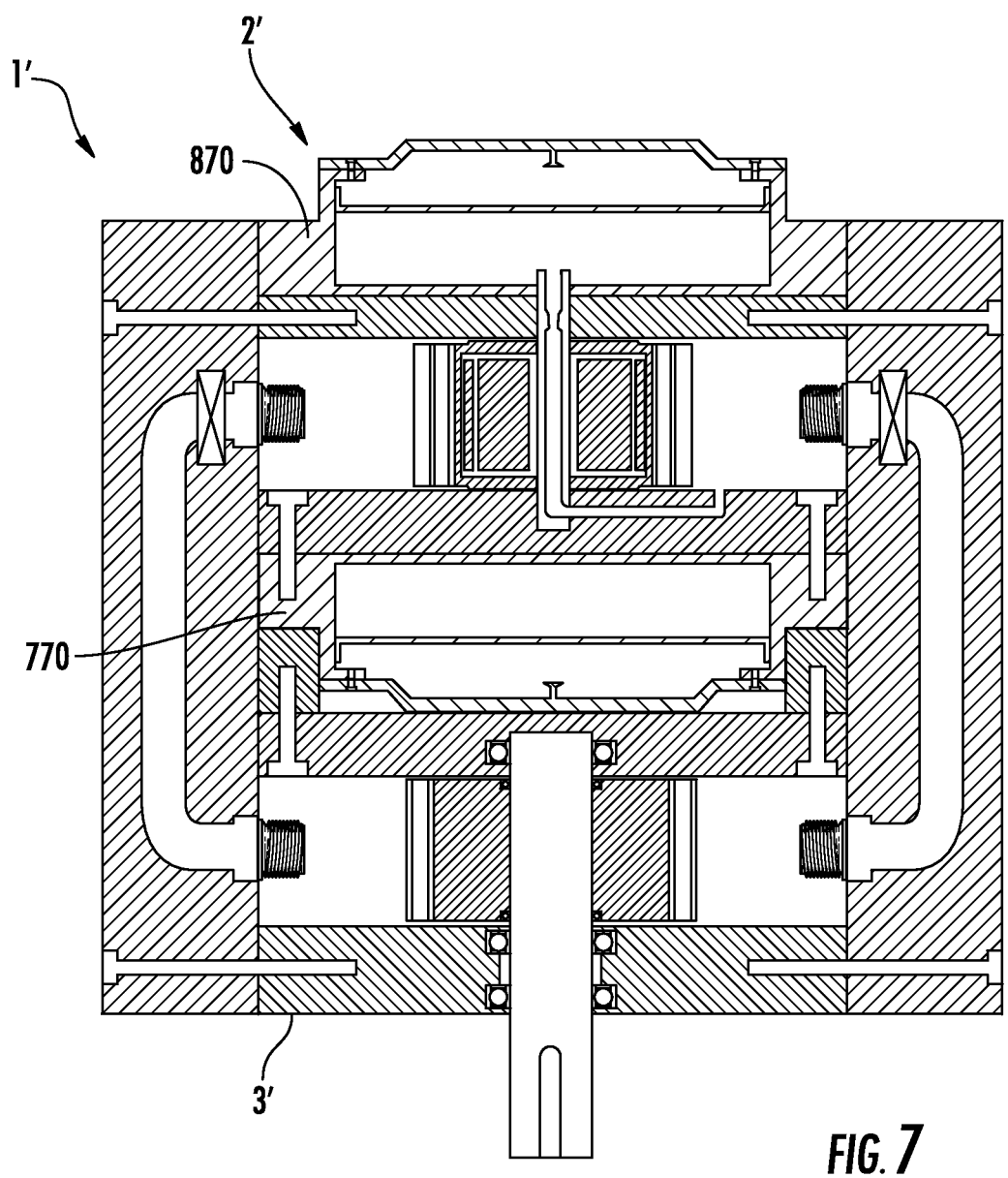
FIG. 7 shows a side cross-sectional view of a preferred embodiment of a hydrostatic transmission.
Figure 7A:
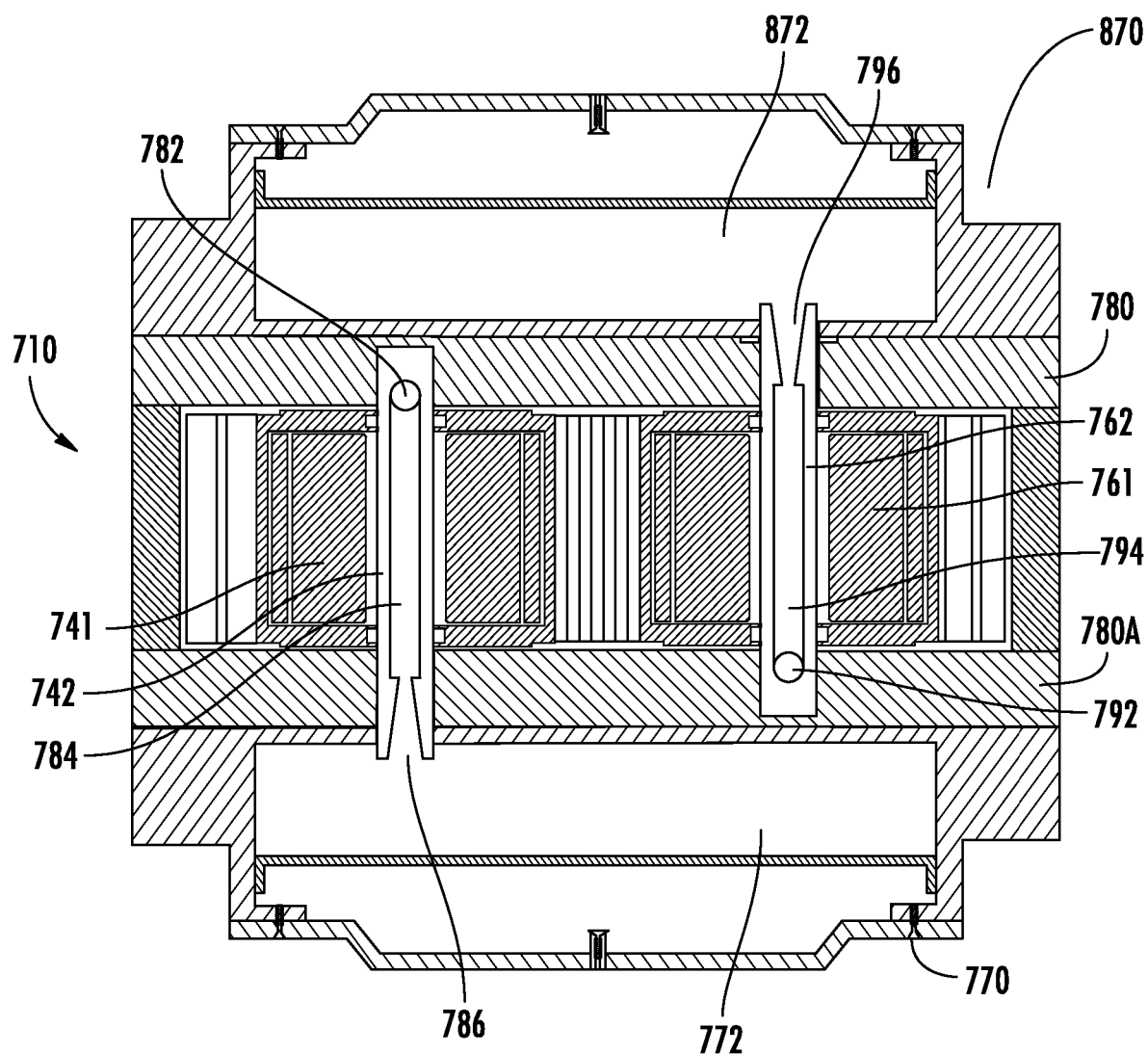
FIG. 7A shows a cross-sectional view of an exemplary embodiment of a pump assembly of the hydrostatic transmission of FIG. 7.

While the above exemplary embodiments illustrate only one storage device, exemplary embodiments of the present disclosure are not limited to one storage device and can have more than one storage device. For example, in an exemplary embodiment shown in FIG. 7, the hydrostatic transmission assembly 1' can have hydraulic motor 3' and a pump assembly 2'. The function and configuration of hydraulic motor 3' is similar to that of hydraulic motor 3 discussed above and thus, brevity, will not be further discussed. The pump assembly 2' includes pump 710 and storage devices 770 and 870. As shown in FIG. 7A, the storage device 770 can be mounted to the pump 710, e.g., on the end plate 780A. For clarity the valve assemblies are not shown. The storage device 770 can store fluid to be pumped by the pump 710 and supply fluid needed to perform a commanded operation. In addition, the storage device 870 can also be mounted on the pump 710, e.g., on the end plate 780. Those skilled in the art would understand that the storage devices 770 and 870 are similar in configuration and function to storage device 170. Thus, for brevity, a detailed description of storage devices 770 and 870 is omitted, except as necessary to explain the present exemplary embodiment.

As seen in FIG. 7A, motor 741 includes shaft 742. The shaft 742 includes a through-passage 784. The through-passage 784 has a port 786 which is disposed in the fluid chamber 772 such that the through-passage 784 is in fluid communication with the fluid chamber 772. The other end of through-passage 784 is in fluid communication with a port of the pump 710 via a channel 782. Those skilled in the art will understand that through-passage 784 and channel 782 are similar in configuration and function to through-passage 184 and channel 192 discussed above. Accordingly, for brevity, detailed description of through-passage 784 and its characteristics and function within pump 710 are omitted.

The pump 710 also includes a motor 761 that includes shaft 762. The shaft 762 includes a through-passage 794. The through-passage 794 has a port 796 which is disposed in the fluid chamber 872 such that the through-passage 794 is in fluid communication with the fluid chamber 872. The other end of through-passage 794 is in fluid communication with a port of the pump 710 via a channel 792. Those skilled in the art will understand that through-passage 794 and channel 792 are similar to through-passage 184 and channel 192 discussed above. Accordingly, for brevity, detailed description of through-passage 794 and its characteristics and function within pump 710 are omitted.

The channels 782 and 792 can each be connected to the same port of the pump or to different ports. Connection to the same port can be beneficial in certain circumstances. For example, if one large storage device is impractical for any reason, it might be possible to split the storage capacity between two smaller storage devices that are mounted on opposite sides of the pump as illustrated in FIG. 7. Alternatively, connecting each storage device 770 and 870 to different ports of the pump 710 can also be beneficial in certain circumstances. For example, a dedicated storage device for each port can be beneficial in circumstances where the pump is bi-directional and in situations where the inlet of the pump and the outlet of the pump experience pressure spikes that need to be smoothened or some other flow or pressure disturbance that can be mitigated or eliminated with a storage device. Of course, each of the channels 782 and 792 can be connected to both ports of the pump 710 such that each of the storage devices 770 and 870 can be configured to communicate with a desired port using appropriate valves (not shown). In this case, the valves would need to be appropriately operated to prevent adverse pump operation.

In the exemplary embodiment shown in FIG. 7, the storage devices 770, 870 are fixedly mounted to the casing of the pump 710. However, in other embodiments, one or both of the storage devices 770, 870 may be disposed space apart from the pump 710. In this case, the storage device or storage devices can be in fluid communication with the pump 710 via a connecting medium, for example hoses, tubes, pipes, or other similar devices.

Figure 8:
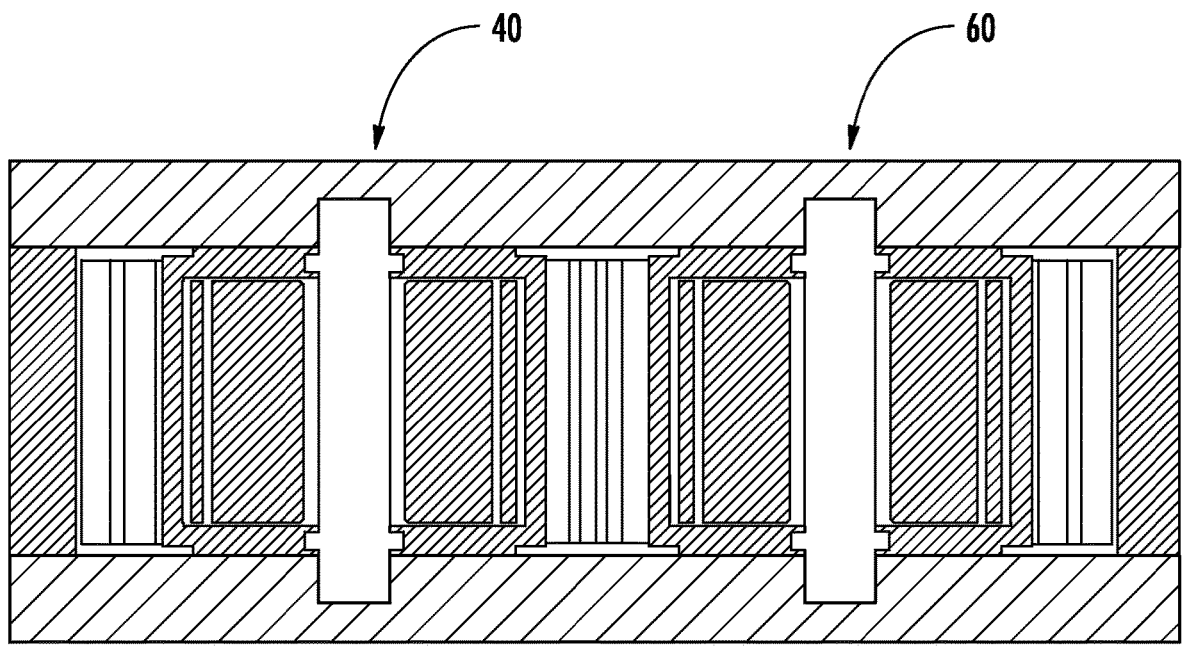
FIGS. 8 to 8E show cross-sectional views of exemplary embodiments of pumps with drive-drive configurations.
Figure 8A:
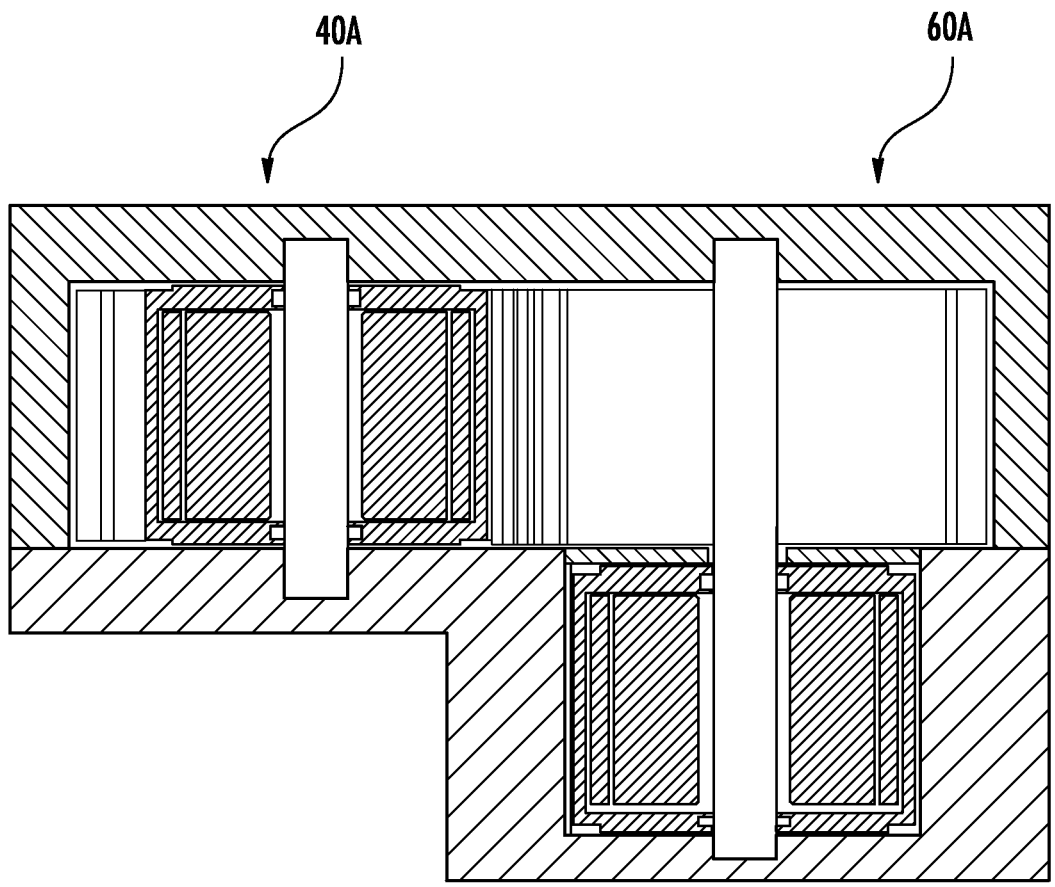
Figure 8B:
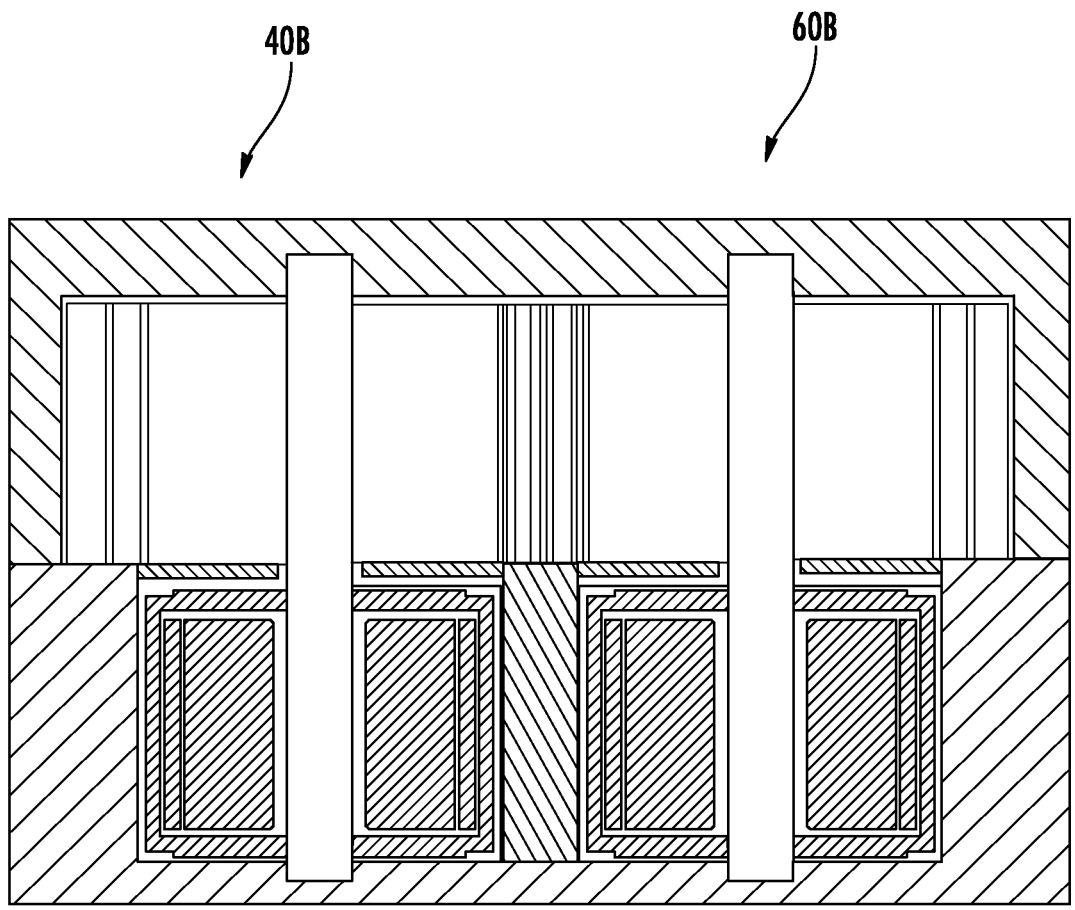
Figure 8C:
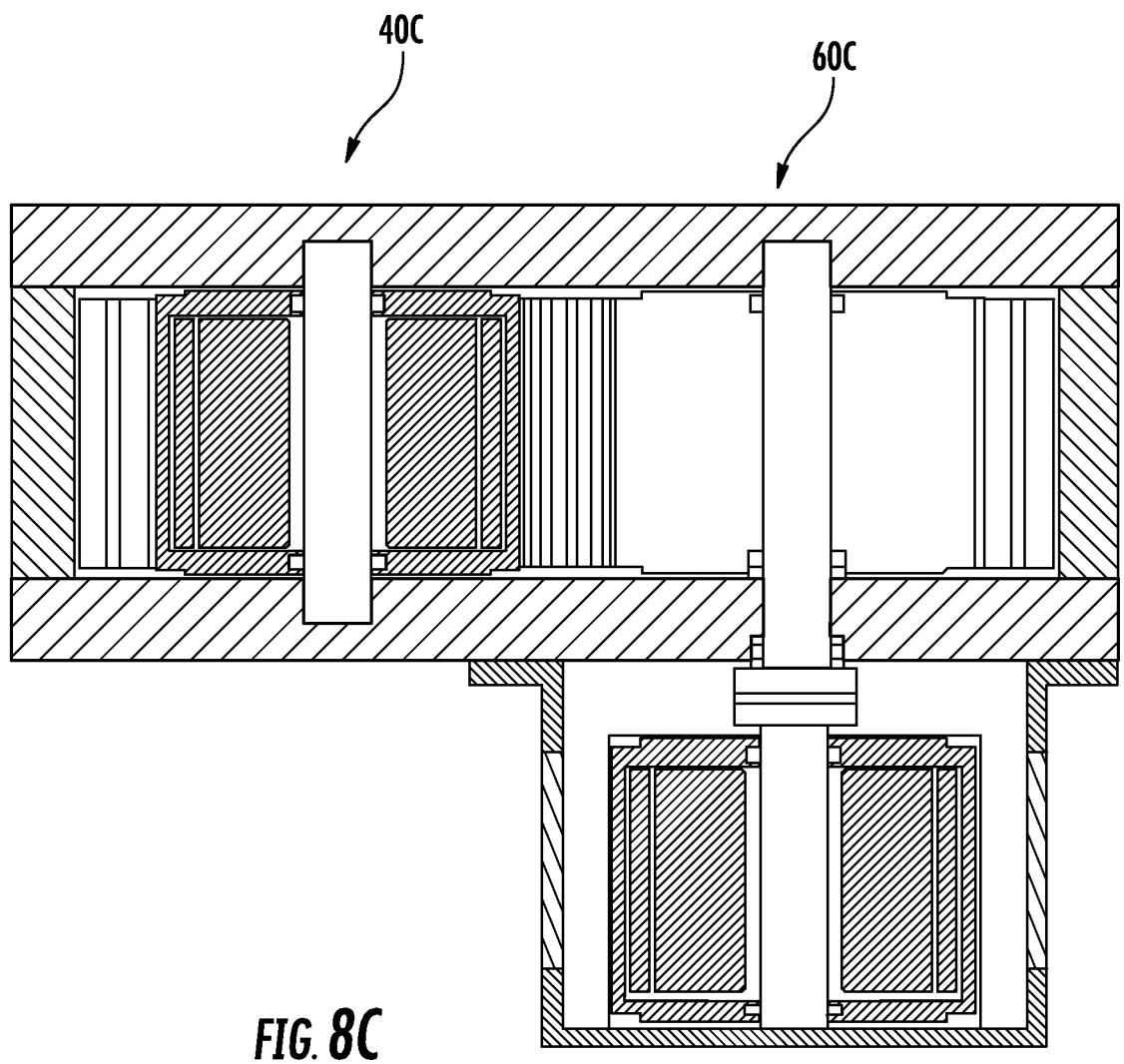
Figure 8D:
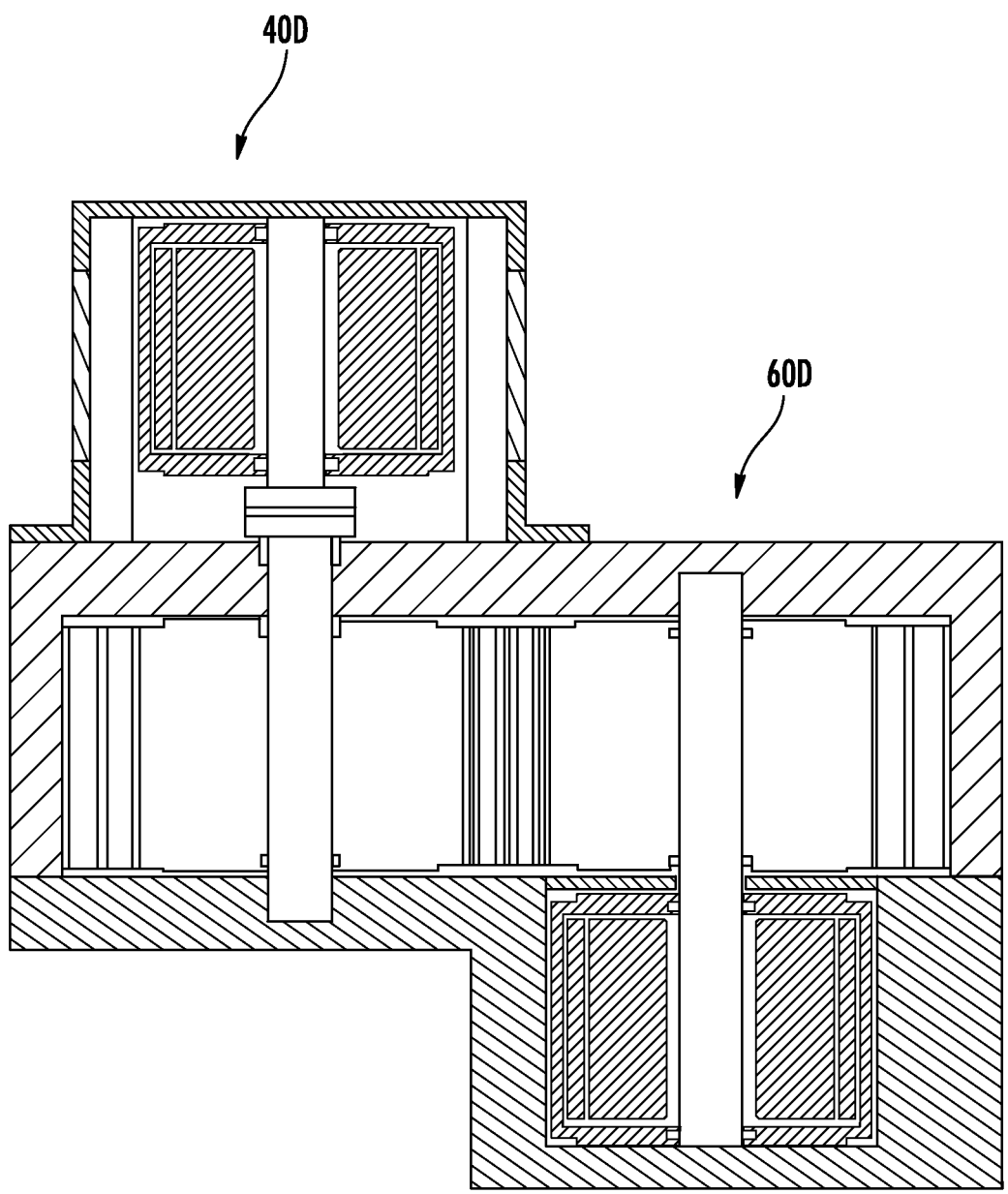
Figure 8E:
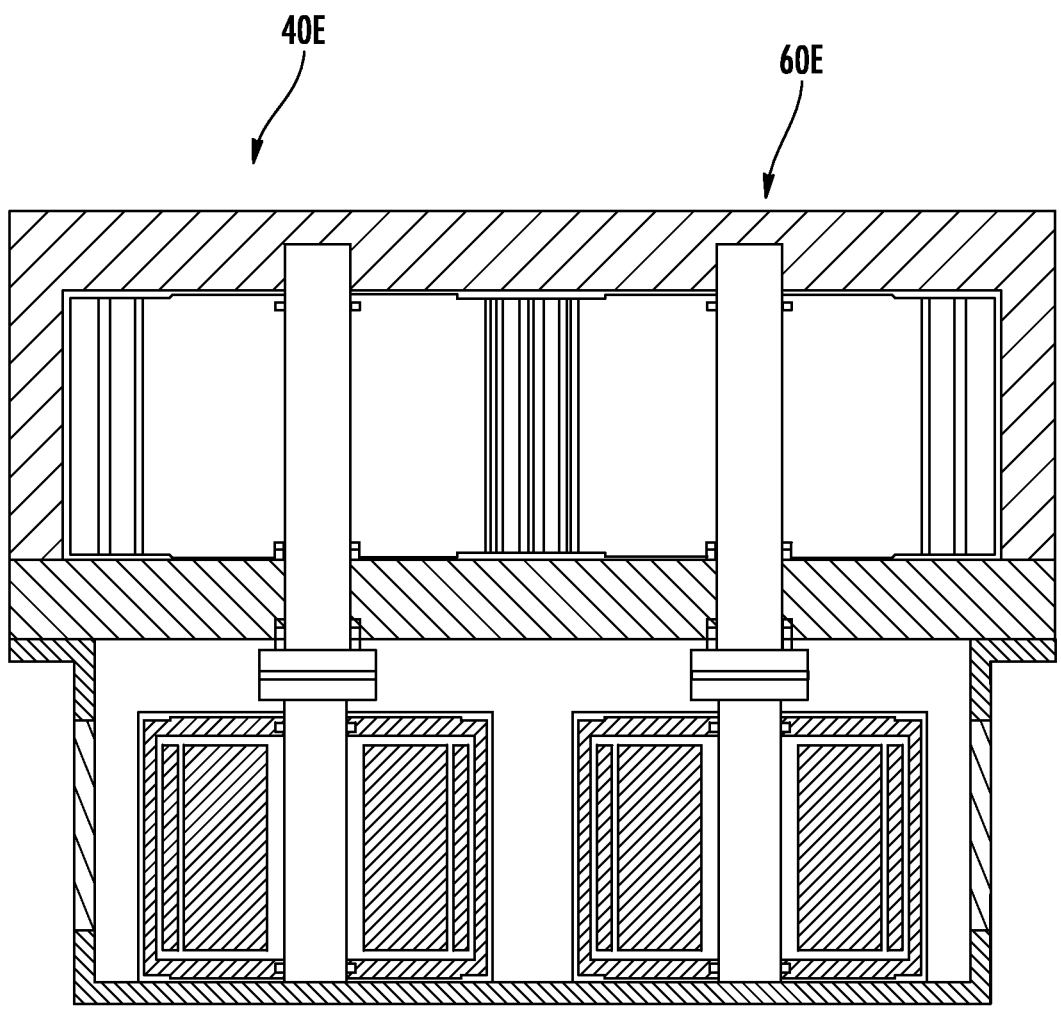

In some exemplary embodiments, the pump 10 does not include fluid drivers that have flow-through shafts. For example, FIG. 8-8E respectively illustrate various exemplary configurations of fluid drivers 40-40E/60-60E in which both shafts of the fluid drivers do not have a flow-through configuration, e.g., the shafts are solid in FIGS. 8-8E. The exemplary embodiments in FIGS. 8-8E illustrate configurations in which one or both motors are disposed within the gear, one or both motors are disposed in the internal volume of the pump but not within the gear and where one or both motors are disposed outside the pump casing. Further details of the exemplary pumps discussed above and other drive-drive pump configurations can be found in International Application No. PCT/US15/018342 and U.S. patent application Ser. No. 14/637,064. Of course, in some exemplary embodiments, one or both of the shafts in the pump configurations shown in FIGS. 8-8E can include flow-through shafts.

Figure 9:
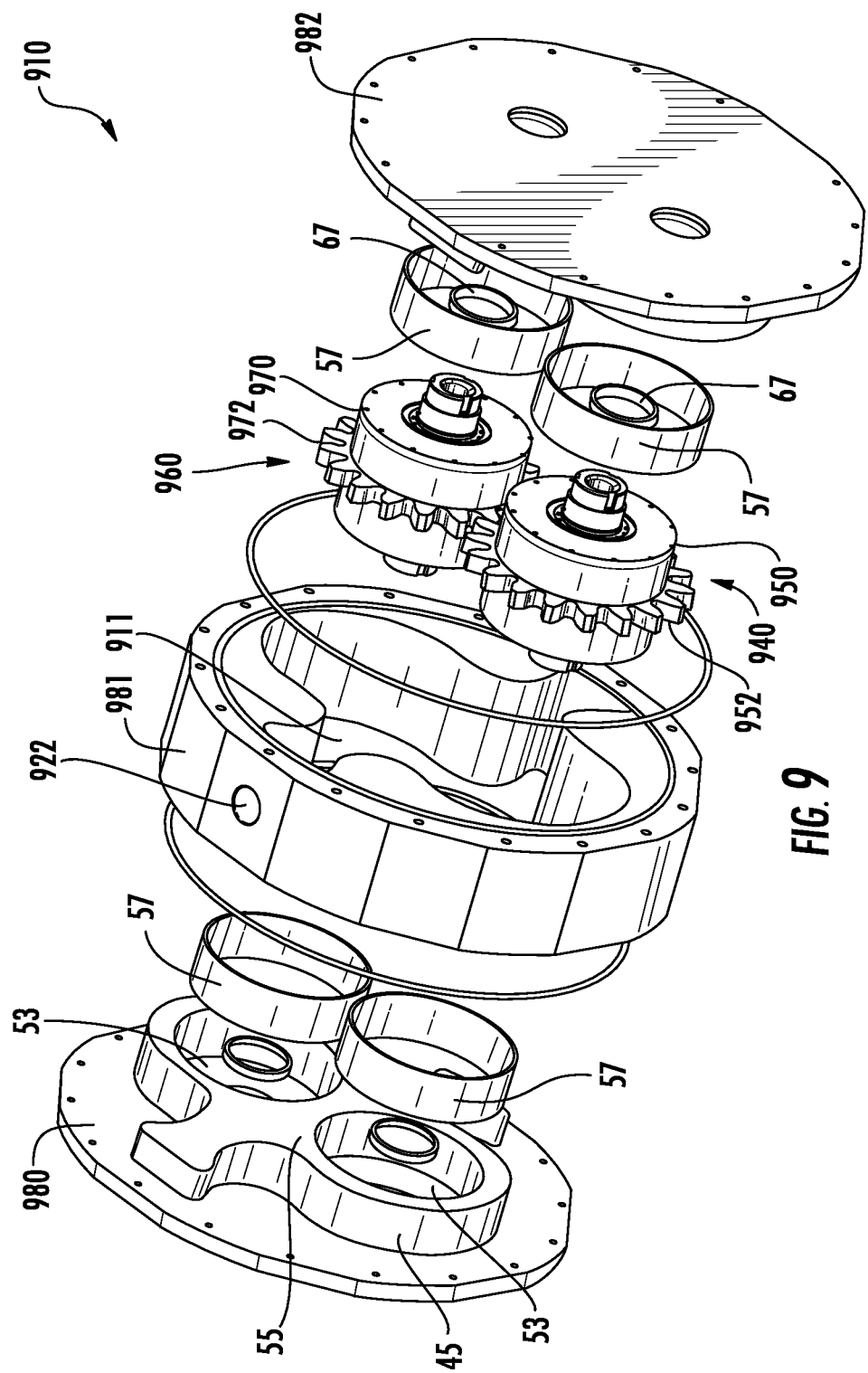
FIG. 9 shows an exploded view of an exemplary embodiment of a pump assembly having an external gear pump.

FIG. 9 shows an exploded view of another exemplary embodiment of a pump of the present disclosure. The pump 910 represents a positive-displacement (or fixed displacement) gear pump. The pump 910 is described in detail in co-pending International Application No. PCT/US15/041612 filed on Jul. 22, 2015, which is incorporated herein by reference in its entirety. The operation of pump 910 is similar to pump 10. Thus, for brevity, a detailed description of pump 910 is omitted except as necessary to describe the present exemplary embodiments.

Pump 910 includes balancing plates 980, 982 which form at least part of the pump casing. The balancing plates 980, 982 have protruded portions 45 disposed on the interior portion (i.e., internal volume 911 side) of the plates 980, 982. One feature of the protruded portions 45 is to ensure that the gears are properly aligned, a function performed by bearing blocks in conventional external gear pumps. However, unlike traditional bearing blocks, the protruded portions 45 of each plate 980, 982 provide additional mass and structure to the casing 920 so that the pump 910 can withstand the pressure of the fluid being pumped. In conventional pumps, the mass of the bearing blocks is in addition to the mass of the casing, which is designed to hold the pump pressure. Thus, because the protruded portions 45 of the present disclosure serve to both align the gears and provide the mass required by the pump casing, the overall mass of the structure of pump 910 can be reduced in comparison to conventional pumps of a similar capacity.

Figure 9A:
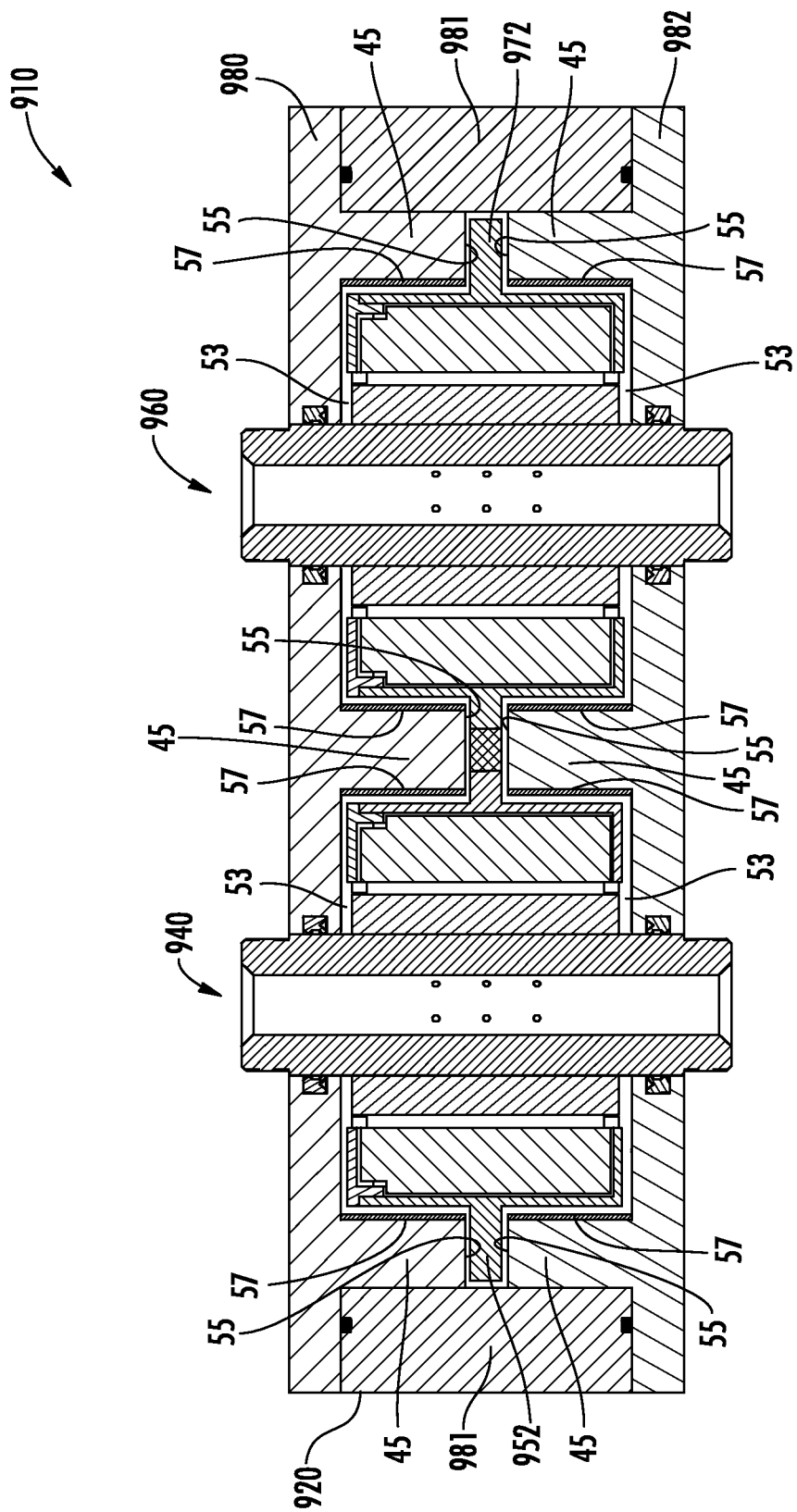
FIG. 9A shows an assembled side cross-sectional view of the external gear pump in FIG. 9.

As seen in FIG. 9A, the fluid drivers 940, 960 include gears 950, 970 which have a plurality of gear teeth 952, 972 extending radially outward from the respective gear bodies. When the pump 910 is assembled, the gear teeth 952, 972 fit in a gap between land 55 of the protruded portion of balancing plate 980 and the land 55 of the protruded portion of balancing plate 982. Thus, the protruded portions 45 are sized to accommodate the thicknesses of gear teeth 952, 972, which can depend on various factors such as, e.g., the type of fluid being pumped and the design flow and pressure capacity of the pump. The gap between the opposing lands 55 of the protruded portions 45 is set such that there is sufficient clearance between the lands 55 and the gear teeth 952, 972 for the fluid drivers 940, 960 to rotate freely but still pump the fluid efficiently.

Figure 9B:
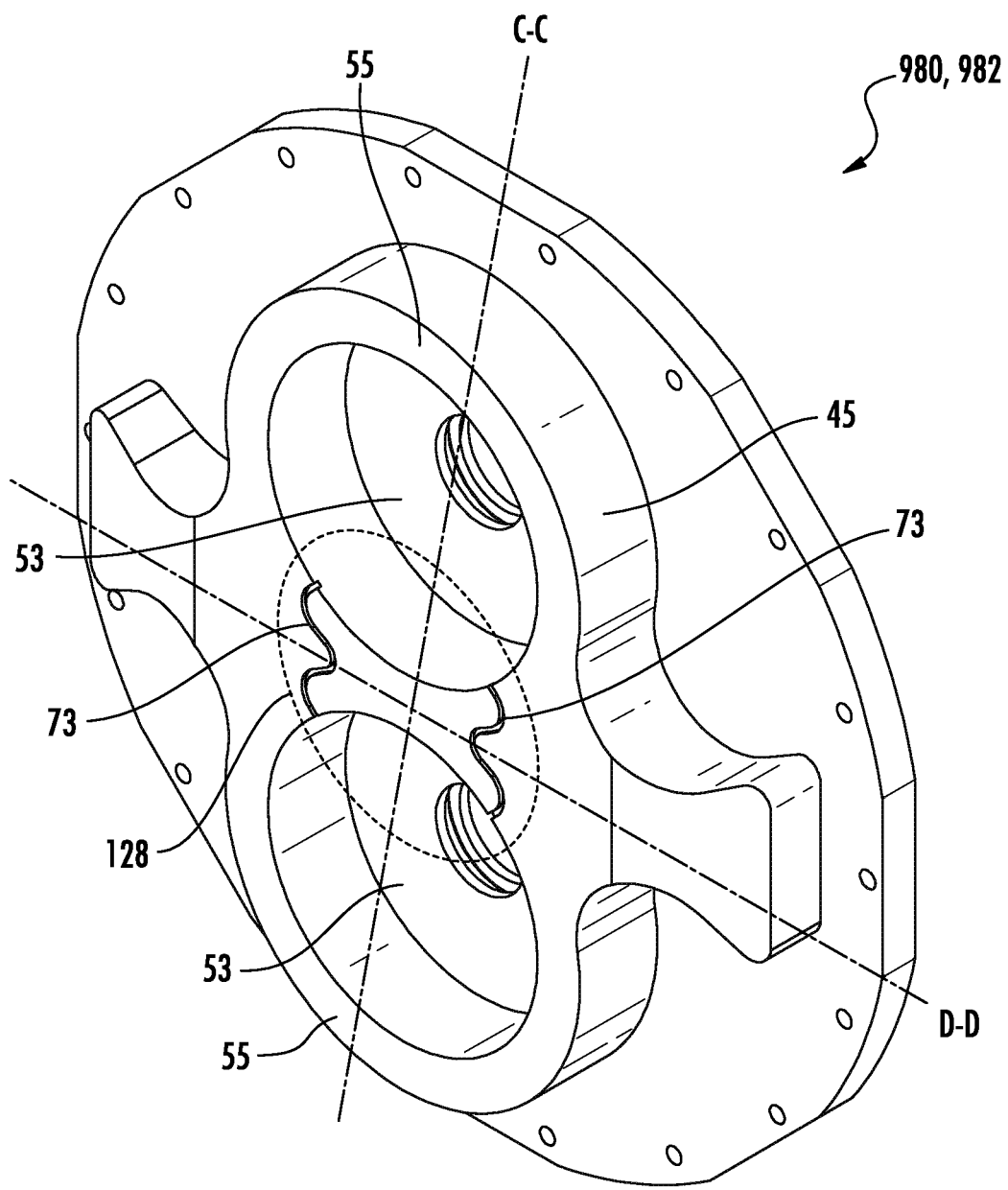
FIG. 9B shows an isometric view of a balancing plate of the pump in FIG. 9.

In some embodiments, one or more cooling grooves may be provided in each protruded portion 45 to transfer a portion of the fluid in the internal volume 911 to the recesses 53 to lubricate bearings 57. For example, as shown in FIG. 9B, cooling grooves 73 can be disposed on the surface of the land 55 of each protruded portions 45. For example, on each side of centerline C-C and along the pump flow axis D-D. At least one end of each cooling groove 73 extends to a recess 53 and opens into the recess 53 such that fluid in the cooling groove 73 will be forced to flow to the recess 53. In some embodiments, both ends of the cooling grooves extend to and open into recesses 53. For example, in FIG. 9B, the cooling grooves 73 are disposed between the recesses 53 in a gear merging area 128 such that the cooling grooves 73 extend from one recess 53 to the other recess 53. Alternatively, or in addition to the cooling grooves 73 disposed in the gear merging area 128, other portions of the land 55, i.e., portions outside of the gear merging area 128, can include cooling grooves. Although two cooling grooves are illustrated, the number of cooling grooves in each balancing plate 980, 982 can vary and still be within the scope of the present disclosure. In some exemplary embodiments (not shown), only one end of the cooling groove opens into a recess 53, with the other end terminating in the land 55 portion or against an interior wall of the pump 910 when assembled. In some embodiments, the cooling grooves can be generally "U-shaped" and both ends can open into the same recess 53. In some embodiments, only one of the two protruded portions 45 includes the cooling groove(s). For example, depending on the orientation of the pump or for some other reason, one set of bearings may not require the lubrication and/or cooling. For pump configurations that have only one protruded portion 45, in some embodiments, the end cover plate (or cover vessel) can include cooling grooves either alternatively or in addition to the cooling grooves in the protruded portion 45, to lubricate and/or cool the motor portion of the fluid drivers that is adjacent the casing cover. In the exemplary embodiments discussed above, the cooling grooves 73 have a profile that is curved and in the form of a wave shape. However, in other embodiments, the cooling grooves 73 can have other groove profiles, e.g. a zig-zag profile, an arc, a straight line, or some other profile that can transfer the fluid to recesses 53. The dimension (e.g., depth, width), groove shape and number of grooves in each balancing plate 980, 982 can vary depending on the cooling needs and/or lubrication needs of the bearings 57.

Figure 9C:
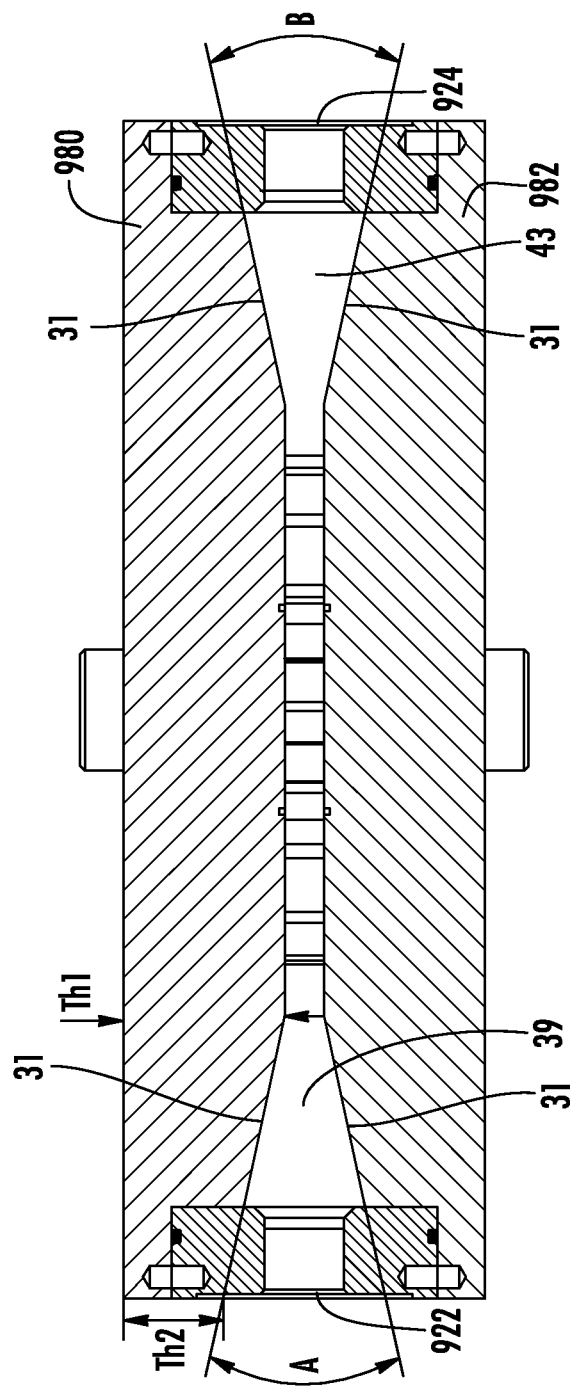
FIG. 9C shows another assembled side cross-sectional view taken of the pump in FIG. 9.

As best seen in FIG. 9C, which shows a cross-sectional view of pump 910, in some embodiments, the balancing plates 980, 982 include sloped (or slanted) segments 31 at each port 922, 924 side of the balancing plates 980, 982. In some exemplary embodiments, the sloped segments 31 are part of the protruded portions 45. In other exemplary embodiments, the sloped segment 31 can be a separate modular component that is attached to protruded portion 45. Such a modular configuration allows for easy replacement and the ability to easily change the flow characteristics of the fluid flow to the gear teeth 952, 972, if desired. The sloped segments 31 are configured such that, when the pump 10 is assembled, the inlet and outlet sides of the pump 910 will have a converging flow passage or a diverging flow passage, respectively, formed therein. Of course, either port 922 or 924 can be the inlet port and the other the outlet port depending on the direction of rotation of the gears 950, 970. The flow passages are defined by the sloped segments 31 and the pump body 981, i.e., the thickness Th2 of the sloped segments 31 at an outer end next to the port is less than the thickness Th1 at an inner end next to the gears 950, 970. As seen in FIG. 9C, the difference in thicknesses forms a converging/diverging flow passage 39 at port 922 that has an angle A and a converging/diverging flow passage 43 at port 924 that has an angle B. In some exemplary embodiments, the angles A and B can be in a range from about 9 degrees to about 15 degrees, as measured to within manufacturing tolerances. The angles A and B can be the same or different depending on the system configuration. Preferably, for pumps that are bi-directional, the angles A and B are the same, as measured to within manufacturing tolerances. However, the angles can be different if different fluid flow characteristics are required or desired based on the direction of flow. For example, in a hydraulic motor-type application, the flow characteristics may be different depending on whether the motor is being one direction or the other. The profile of the surface of the sloped section can be flat as shown in FIG. 9C, curved (not shown) or some other profile depending on the desired fluid flow characteristics of the fluid as it enters and/or exits the gears 950, 970.

Figure 9D:
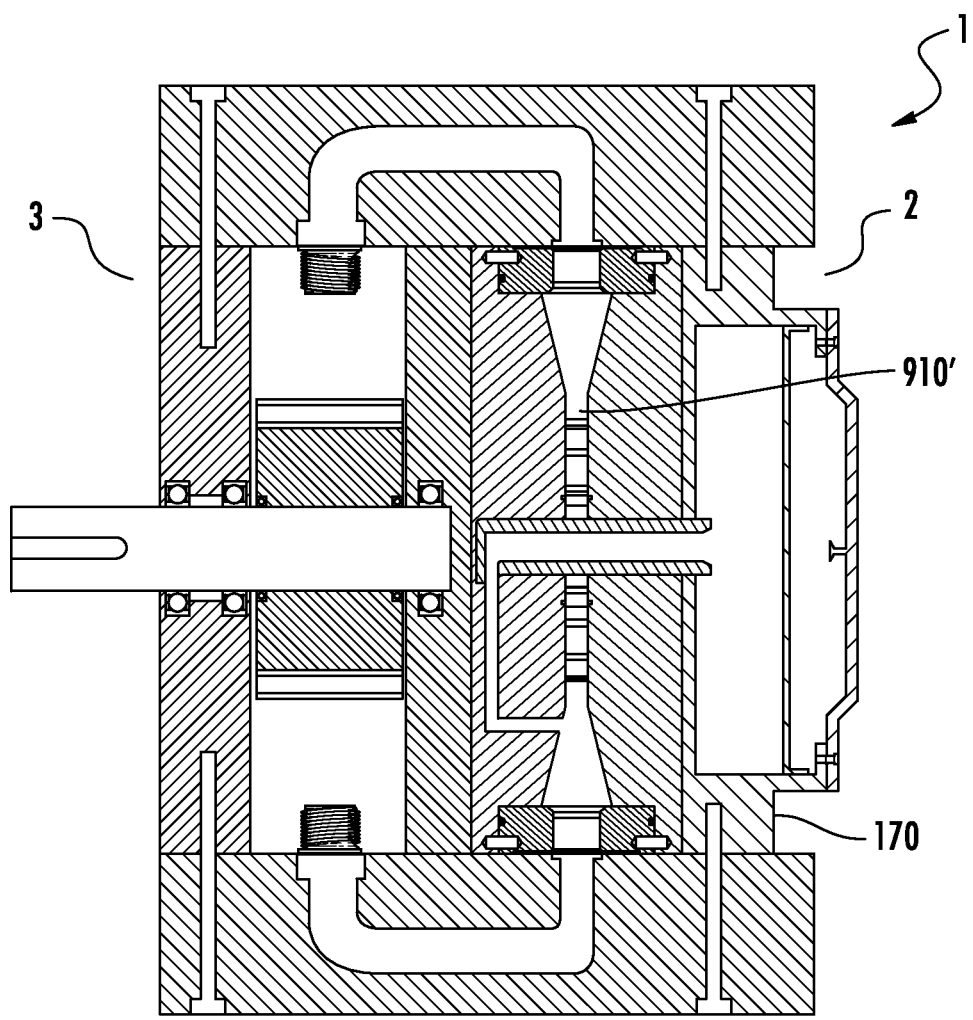
FIG. 9D shows a cross-sectional view of an exemplary embodiment of a hydrostatic transmission with a storage device.
Figure 9E:
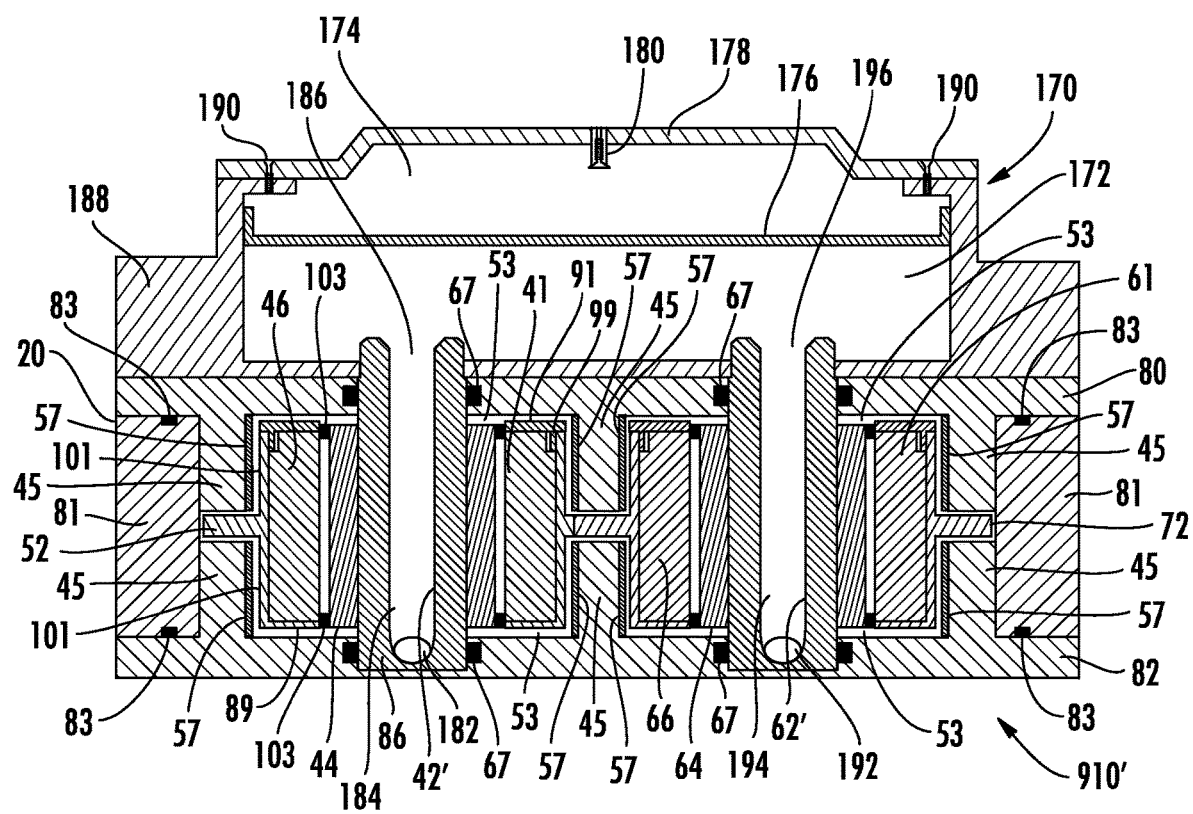
FIG. 9E shows an assembled side cross-sectional view of the external gear pump in FIG. 9 with flow-through shafts and one storage devices.
Figure 9F:
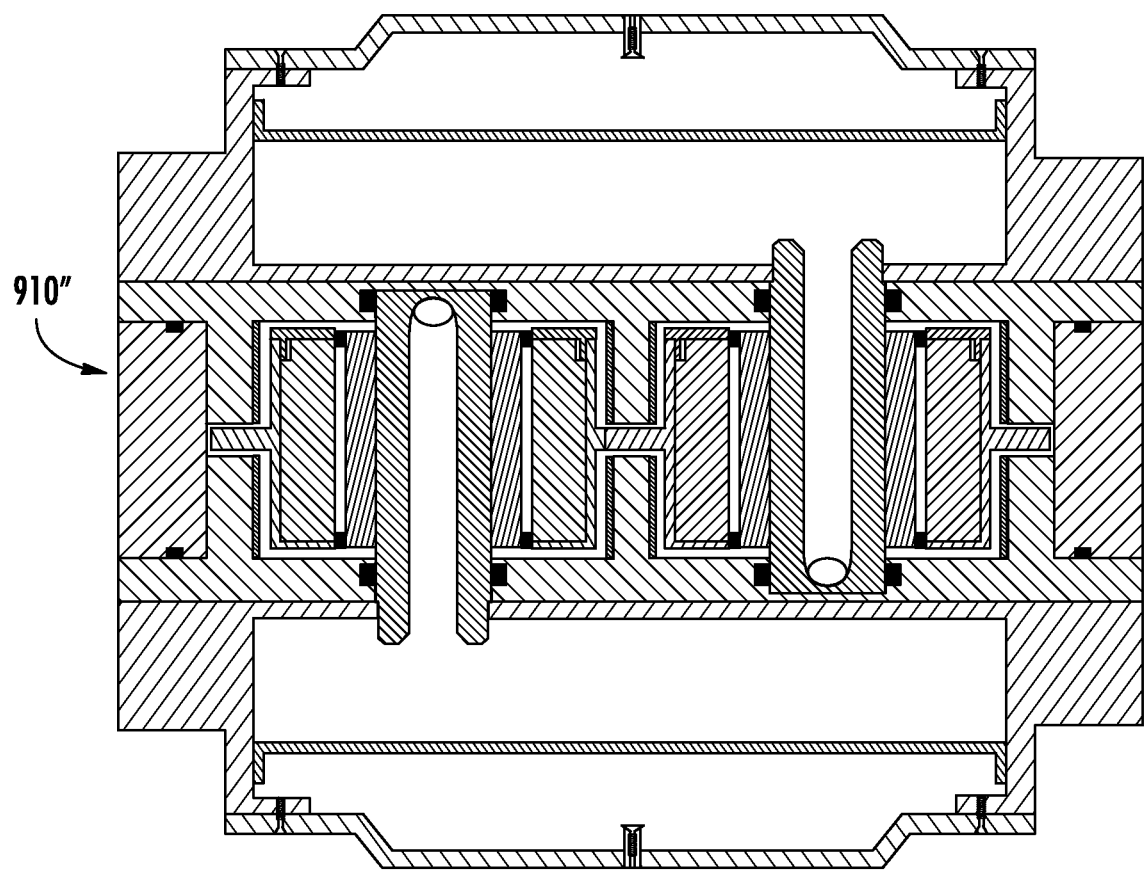
FIG. 9F shows an assembled side cross-sectional view of the external gear pump in FIG. 9 with flow-through shafts and two storage devices.

During operation, as the fluid enters the inlet of the pump 910, e.g., port 922 for explanation purposes, the fluid encounters the converging flow passage 39 where the cross-sectional area of at least a portion of the passage 39 is gradually reduced as the fluid flows to the gears 950, 970. The converging flow passage 39 minimizes abrupt changes in speed and pressure of the fluid and facilitates a gradual transition of the fluid into the gears 950, 970 of pump 910. The gradual transition of the fluid into the pump 910 can reduce bubble formation or turbulent flow that may occur in or outside the pump 910, and thus can prevent or minimize cavitation. Similarly, as the fluid exits the gears 950, 970, the fluid encounters a diverging flow passage 43 in which the cross-sectional areas of at least a portion of the passage is gradually expanded as the fluid flows to the outlet port, e.g., port 924. Thus, the diverging flow passage 43 facilitates a gradual transition of the fluid from the outlet of gears 950, 970 to stabilize the fluid. In some embodiments, pump 910 can include an integrated storage device and flow-through shafts as discussed above with respect to pump 10. FIG. 9D shows a cross-sectional view of an exemplary embodiment of a hydrostatic transmission system 1 in which the pump 910' is attached to a storage device 170. Those skilled in the art understand that the 910' is similar to the pump 910 discussed above. Thus, a detailed description is omitted except as necessary to explain the present embodiment. As seen in the cross-sectional view in FIG. 9E, the pump 910' has flow-through shafts 42', 62' that include through-passages 184, 194 that extend through the interior of respective shaft 42', 62'. The through-passages 184, 194 have ports 186, 196 such that the through-passages 184, 194 are each in fluid communication with the fluid chamber 172. The through-passages 184, 194 collect to channels 182, 192 that extend through the pump casing to provide fluid communication with at least one port of the pump 910'. In addition, similar to pump 710, exemplary embodiments of the pump 910 discussed above can have two storage devices as seen in FIG. 9F with pump 910". The function an operation of the flow-through shafts and storage device(s) in the one and two storage device configuration of pump 910 (i.e., pumps 910' and 910") are the same as that discussed above with respect to pump 10 and pump 710. Accordingly, for brevity, description of the storage device(s) and the flow-through shaft configurations of pump 910' and 910" is omitted.

Figure 10:
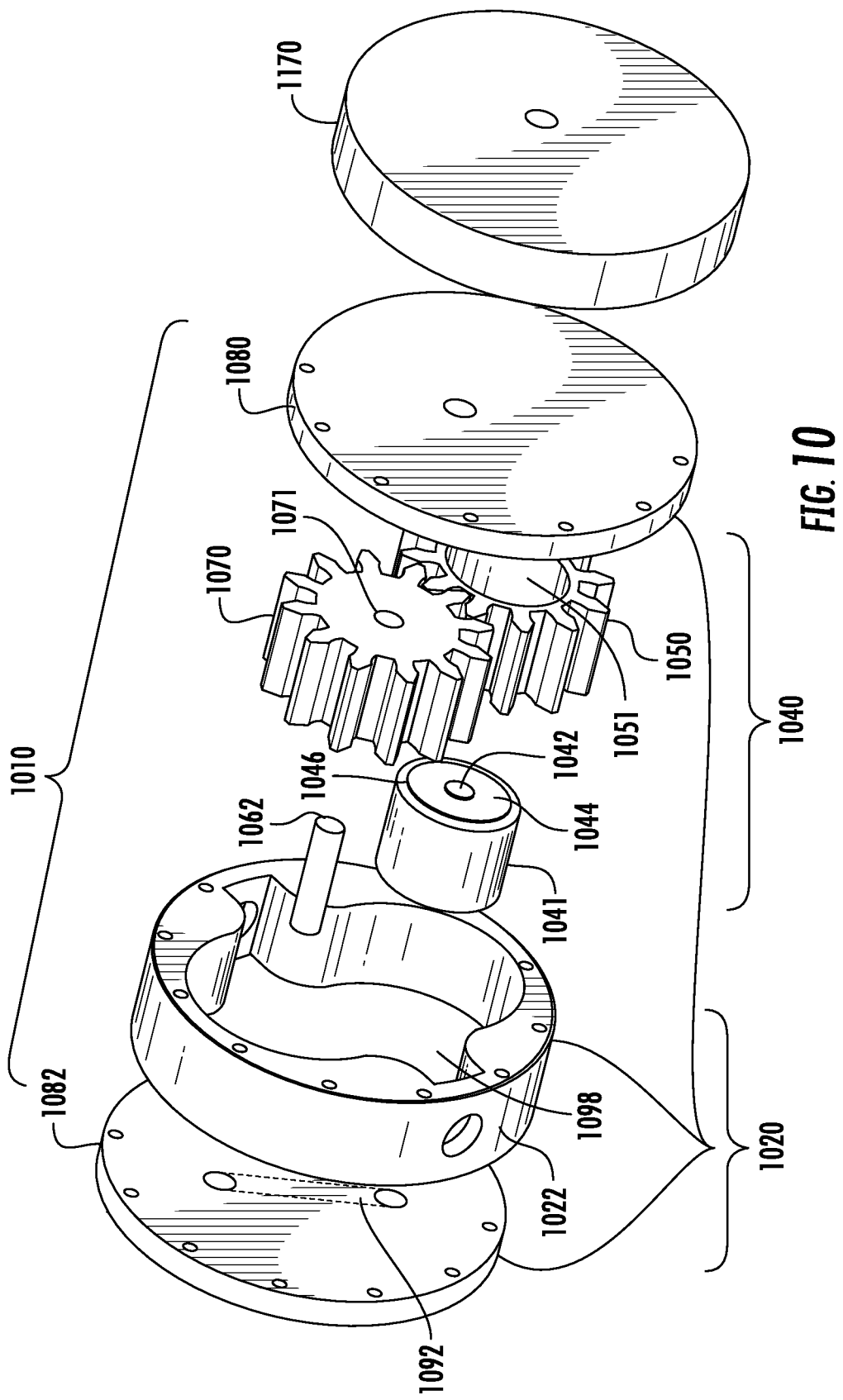
FIG. 10 shows an exploded view of an exemplary embodiment of a pump assembly having an external gear pump with a driver-driven configuration and a storage device.

FIG. 10 shows an exploded view of an exemplary embodiment of a pump assembly with a pump 1010 and a storage device 1170. Unlike the exemplary embodiments discussed above, pump 1010 includes one fluid driver, i.e., fluid driver 1040. The fluid driver 1040 includes motor 1041 (prime mover) and a gear displacement assembly that includes gears 1050, 1070 (fluid displacement members). In this embodiment, pump motor 1041 is disposed inside the pump gear 1050. As seen in FIG. 10, the pump 1010 represents a positive-displacement (or fixed displacement) gear pump. Attached to the pump 1010 is storage device 1170. The pump 1010 and storage device 1170 are described in detail in Applicant's co-pending International Application No. PCT/US15/22484 filed Mar. 25, 2015, which is incorporated herein by reference in its entirety. Thus, for brevity, a detailed description of the pump 1010 and storage device 1170 is omitted except as necessary to describe the present embodiment.

Figure 10A:
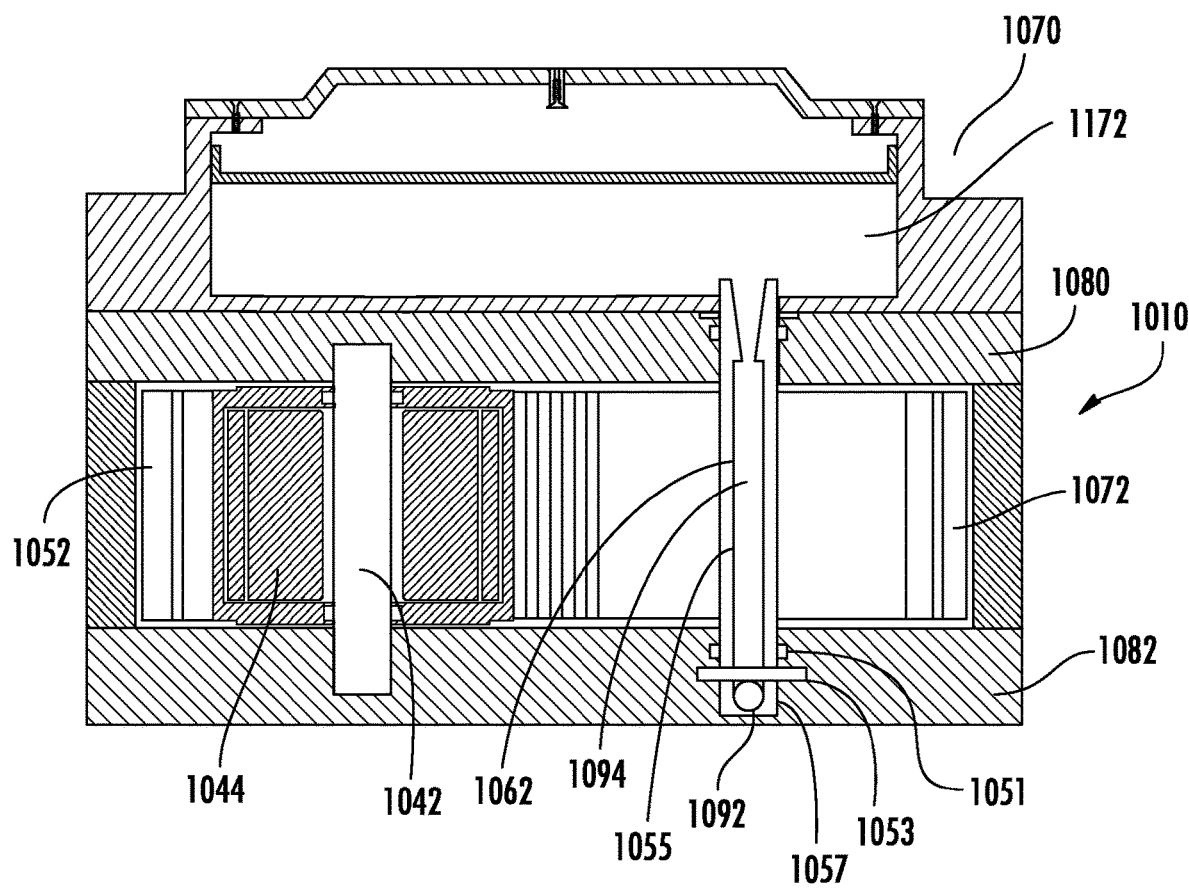
FIGS. 10A to 10C show cross-sectional views of exemplary embodiments of pumps with driver-driven configurations.

As seen in FIGS. 10 and 10A, a pair of gears 1050, 1070 are disposed in the internal volume 1098. Each of the gears 1050, 1070 has a plurality of gear teeth 1052, 1072 extending radially outward from the respective gear bodies. The gear teeth 1052, 1072, when rotated by, e.g., motor 1041, transfer fluid from the inlet to the outlet, i.e., motor 1041 rotates gear 1050 which then rotates gear 1070 (driver-driven configuration). The motor 1041 is a variable-speed and/or a variable-torque motor in which the speed/torque of the rotor and thus that of the attached gear can be varied to create various volume flows and pump pressures. In some embodiments, the pump 1010 is bi-directional. Thus, either port 1022, 1024 can be the inlet port, depending on the direction of rotation of gears 1050, 1070, and the other port will be the outlet port.

The shaft 1062 of the pump 1010 includes a through-passage 1094. The through-passage 1094 fluidly connects fluid chamber 1172 of storage device 1170 with a port of the pump 1010 via passage 1092. Those skilled in the art will know that the operation of the storage device 1170 and through passage 1094 in pump 1010 will be similar to the operation of the though-passage 194 of pump 10 discussed above. Of course, because shaft 1062 rotates, the structure of shaft 1062 with through passage 1094 will be similar that of shaft 662 with through passage 694 discussed above. Thus, for brevity, the structure and function of storage device 1170 and through passage 1094 of shaft 1062 will not be further discussed. The exemplary embodiment in FIGS. 10 and 10A illustrates a pump having one shaft with a through passage. However, instead of or in addition to through-passage 1094 of shaft 1062, the shaft 1042 of pump 1010 can have a through-passage therein. In this case, the through-passage configuration of the shaft 1042 can be similar to that of through-passage 184 of shaft 42 of pump 10 discussed above. In addition, in the above exemplary driver-driven configurations, a single storage device is illustrated in FIGS. 10 and 10A. However, those skilled in the art will understand that, similar to the drive-drive configurations discussed above, the driver-driven configurations can also include dual storage devices or no storage device. Because the configuration and function of the shafts on the dual storage driver-driven embodiments will be similar to the configuration and function of the shafts of the drive-drive embodiments discussed above, for brevity, a detailed discussion of the dual storage driver-driven embodiment is omitted.

Figure 10B:
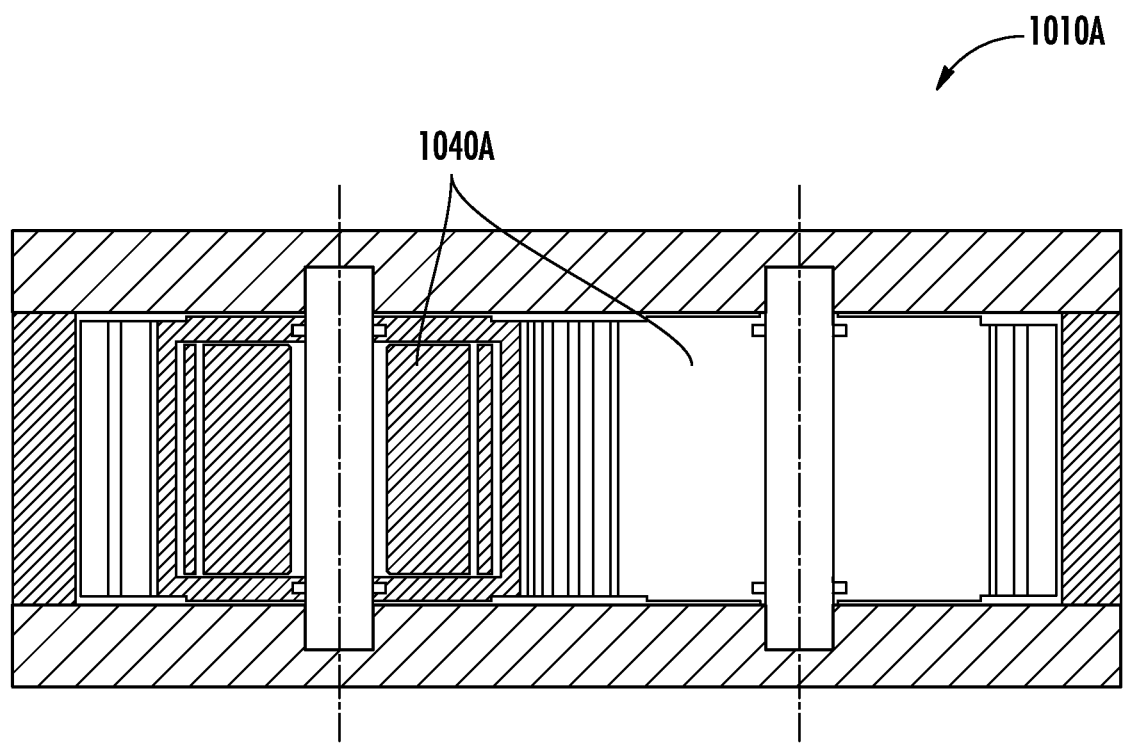
Figure 10C:
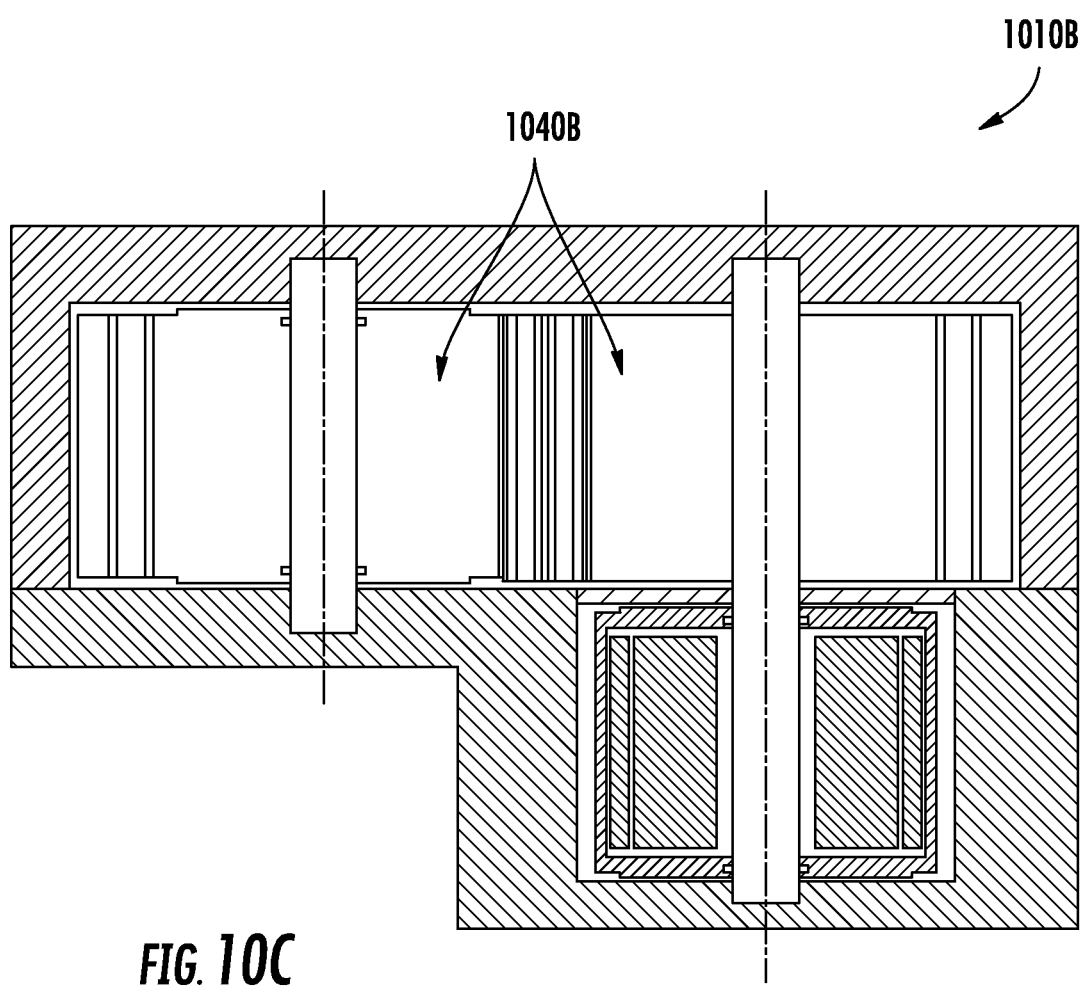

Of course, like the dual fluid driver (drive-drive) configurations discussed above, exemplary embodiments of the driver-driven pump configurations are not limited to those with shafts having a through-passage. As seen in FIG. 10B, exemplary embodiments of the driver-driven pump configuration, e.g., pump 1010A with fluid driver 1040A, can include shafts that do not have a through passage, e.g., solid shafts. In addition, like the dual fluid driver (drive-drive) configurations discussed above, exemplary embodiments of the driver-driven pump configurations are not limited to configurations in which the prime mover is disposed within the body of the fluid displacement member. Other configurations also fall within the scope of the present disclosure. For example, FIG. 10C discloses a driver-driven pump configuration, e.g., pump 1010B with fluid driver 1040B, in which the motor is disposed adjacent to the gear but still inside the pump casing. In addition, those skilled in the art would understand that one or both of the shafts in pump 1010B can be configured as a flow-through shaft. Further, the motor (prime mover) of pump 1010B can be located outside the pump casing and one or both gears can include a flow-through shaft such as the through-passage embodiments discussed above. Detailed description of the driver-driven pump operation is provided next.

FIG. 11 shows a top cross-sectional view of the external gear pump 1010 of FIG. 10. FIG. 11 illustrates an exemplary fluid flow path of an exemplary embodiment of the external gear pump 1010. The ports 1022, 1024, and a meshing area 1078 between the plurality of first gear teeth 1052 and the plurality of second gear teeth 1072 are substantially aligned along a single straight path. However, the alignment of the ports are not limited to this exemplary embodiment and other alignments are permissible. For explanatory purpose, the gear 1050 is rotatably driven clockwise 1074 by motor 1041 and the gear 1070 is rotatably driven counter-clockwise 1076 by the gear teeth 1052. With this rotational configuration, port 1022 is the inlet side of the gear pump 1010 and port 1024 is the outlet side of the gear pump 1010. The gear 1050 and the gear 1070 are disposed in the casing 1020 such that the gear 1050 engages (or meshes) with the gear 1070 when the rotor 1046 is rotatably driven. More specifically, the plurality of gear teeth 1052 mesh with the plurality of gear teeth 1072 in a meshing area 1078 such that the torque (or power) generated by the motor 1041 is transmitted to the gear 1050, which then drives gear 1070 via gear meshing to carry the fluid from the port 1022 to the port 1024 of the pump 1010.

As seen in FIG. 11, the fluid to be pumped is drawn into the casing 1020 at port 1022 as shown by an arrow 1192 and exits the pump 1010 via port 1024 as shown by arrow 1196. The pumping of the fluid is accomplished by the gear teeth 1052, 1072. As the gear teeth 1052, 1072 rotate, the gear teeth rotating out of the meshing area 1078 form expanding inter-tooth volumes between adjacent teeth on each gear. As these inter-tooth volumes expand, the spaces between adjacent teeth on each gear are filled with fluid from the inlet port, which is port 1022 in this exemplary embodiment. The fluid is then forced to move with each gear along the interior wall of the casing 1020 as shown by arrows 1194 and 1194'. That is, the teeth 1052 of gear 1050 force the fluid to flow along the path 1194 and the teeth 1072 of gear 1070 force the fluid to flow along the path 1194'. Very small clearances between the tips of the gear teeth 1052, 1072 on each gear and the corresponding interior wall of the casing 1020 keep the fluid in the inter-tooth volumes trapped, which prevents the fluid from leaking back towards the inlet port. As the gear teeth 1052, 1072 rotate around and back into the meshing area 1078, shrinking inter-tooth volumes form between adjacent teeth on each gear because a corresponding tooth of the other gear enters the space between adjacent teeth. The shrinking inter-tooth volumes force the fluid to exit the space between the adjacent teeth and flow out of the pump 1010 through port 1024 as shown by arrow 1196. In some embodiments, the motor 1041 is bi-directional and the rotation of motor 1041 can be reversed to reverse the direction fluid flow through the pump 1010, i.e., the fluid flows from the port 1024 to the port 1022.

To prevent backflow, i.e., fluid leakage from the outlet side to the inlet side through the meshing area 1078, the meshing between a tooth of the gear 1050 and a tooth of the gear 1070 in the meshing area 1078 provides sealing against the backflow. Thus, along with driving gear 1070, the meshing force from gear 1050 will seal (or substantially seal) the backflow path, i.e., as understood by those skilled in the art, the fluid leakage from the outlet port side to the inlet port side through the meshing area 1078 is substantially eliminated.

FIG. 11A schematically shows gear meshing between two gears 1050, 1070 in the gear meshing area 1078 in an exemplary embodiment. As discussed above, it is assumed that the rotor 1046 is rotatably driven clockwise 1074. The plurality of first gear teeth 1052 are rotatably driven clockwise 1074 along with the rotor 1046 and the plurality of second gear teeth 1072 are rotatably driven counter-clockwise 1076 via gear meshing. In particular, FIG. 11A exemplifies that the gear tooth profile of the first and second gears 1050, 1070 is configured such that the plurality of first gear teeth 1052 are in surface contact with the plurality of second gear teeth 1072 at three different contact surfaces CS1, CS2, CS3 at a point in time. However, the gear tooth profile in the present disclosure is not limited to the profile shown in FIG. 11A. For example, the gear tooth profile can be configured such that the surface contact occurs at two different contact surfaces instead of three contact surfaces, or the gear tooth profile can be configured such that a point, line or an area of contact is provided. In some exemplary embodiments, the gear teeth profile is such that a small clearance (or gap) is provided between the gear teeth 1052, 1072 to release pressurized fluid, i.e., only one face of a given gear tooth makes contact with the other tooth at any given time. Such a configuration retains the sealing effect while ensuring that excessive pressure is not built up. Thus, the gear tooth profile of the first and second gears 1050, 1070 can vary without departing from the scope of the present disclosure.

In addition, depending on the type of fluid displacement member, the meshing can be between any surface of at least one projection (e.g., bump, extension, bulge, protrusion, other similar structure or combinations thereof) on the first fluid displacement member and any surface of at least one projection (e.g., bump, extension, bulge, protrusion, other similar structure or combinations thereof) or an indent (e.g., cavity, depression, void or similar structure) on the second fluid displacement member. In some embodiments, at least one of the fluid displacement members can be made of or include a resilient material, e.g., rubber, an elastomeric material, or another resilient material, so that the contact force provides a more positive sealing area.

In the embodiments discussed above, the storage devices were described as pressurized vessels with a separating element (or piston) inside. However, in other embodiments, a different type of pressurized vessel may be used. For example, an accumulator, e.g. a hydraulic accumulator, may be used as a pressurized vessel. Accumulators are common components in fluid systems such as hydraulic operating and control systems. The accumulators store potential energy in the form of a compressed gas or spring, or by a raised weight to be used to exert a force against a relatively incompressible fluid. It is often used to store fluid under high pressure or to absorb excessive pressure increase. Thus, when a fluid system, e.g., a hydraulic system, demands a supply of fluid exceeding the supply capacity of a pump system, typically within a relatively short responsive time, pressurized fluid can be promptly provided according to a command of the system. In this way, operating pressure and/or flow of the fluid in the system do not drop below a required minimum value. However, storage devices other than an accumulator may be used as long as needed fluid can be provided from the storage device or storage devices to the pump and/or returned from the pump to the storage device or storage devices.

The accumulator may be a pressure accumulator. This type of accumulator may include a piston, diaphragm, bladder, or member. Typically, a contained volume of a suitable gas, a spring, or a weight is provided such that the pressure of fluid, e.g., hydraulic, fluid in the accumulator increases as the quantity of fluid stored in the accumulator increases. However, the type of accumulator in the present disclosure is not limited to the pressure accumulator. The type of accumulator can vary without departing from the scope of the present disclosure.

Figure 12:
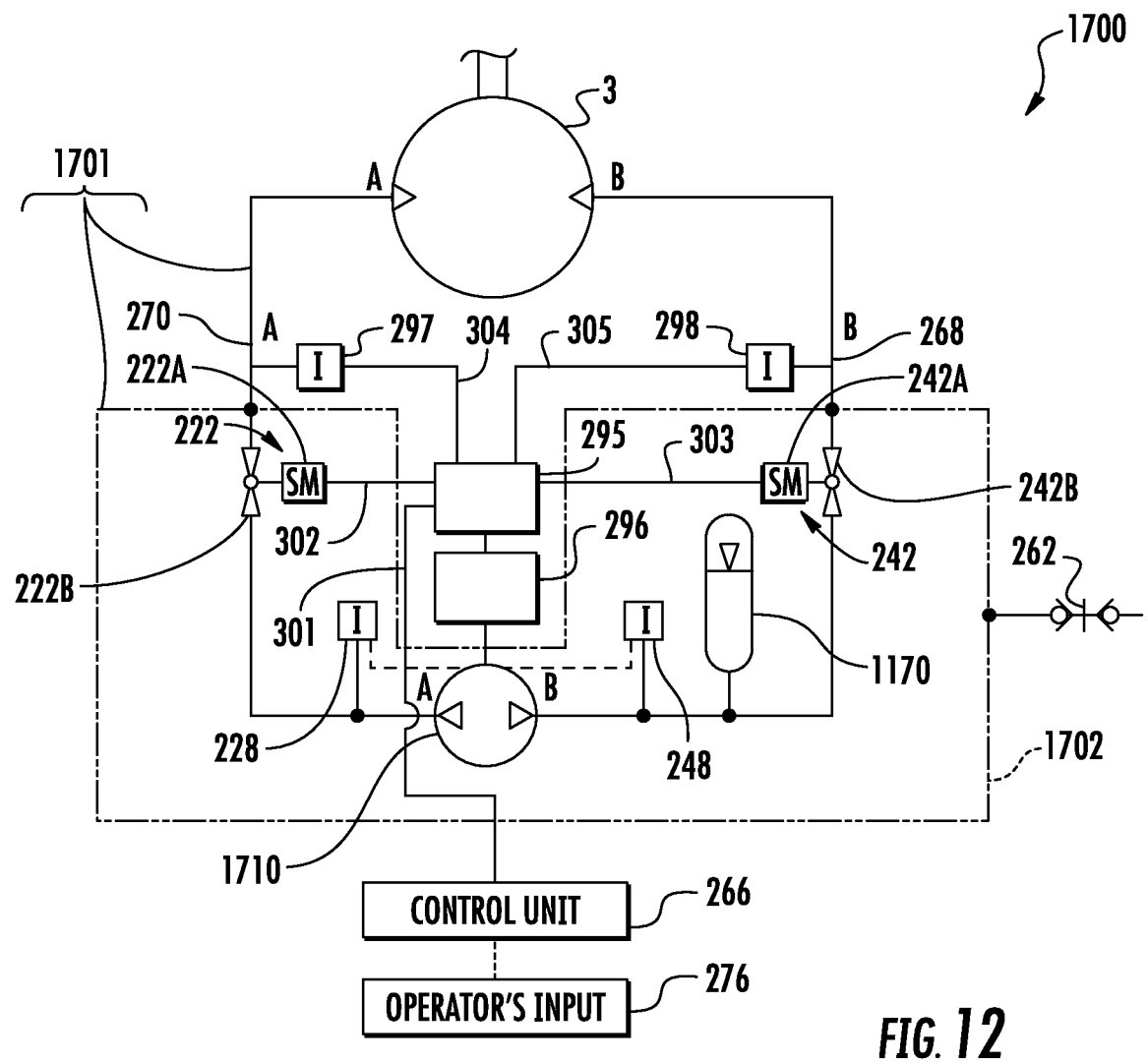
FIG. 12 is a schematic diagram illustrating an exemplary embodiment of a fluid system in a hydrostatic transmission application.

FIG. 12 illustrates an exemplary schematic of a hydrostatic transmission system 1700 that includes hydrostatic transmission assembly 1701 having a pump assembly 1702 and hydraulic motor 3. The pump assembly 1702 includes pump 1710, proportional control valve assemblies 222 and 242 and storage device 1770. The configuration of pump 1710 and storage device 1770 is not limited to any particular drive-drive or driver-driven configuration and can be any one of the exemplary embodiments discussed above. For purposes of brevity, the fluid system will be described in terms of an exemplary hydraulic system application with two fluid drivers, i.e., a drive-drive configuration. However, those skilled in the art will understand that the concepts and features described below are also applicable to systems that pump other (non-hydraulic) types of fluid systems and to driver-driven configurations. Although shown as part of pump assembly 1702, in some embodiments, the proportional control valve assemblies 222 and 242 can be separate external devices. In some embodiments, the hydrostatic transmission system 1700 can include only one proportional control valve, e.g., in a system where the pump is not bi-directional. In some embodiments, the system 1700 can include lock or isolation valves (not shown) for the pump assembly 1702 and/or the hydraulic motor 3. The hydrostatic transmission system 1700 can also include sensor assemblies 297, 298. Further, in addition to sensor assemblies 297, 298 or in the alternative, the pump assembly 1702 can include sensor assemblies 228 and 248, if desired. In the exemplary embodiment of FIG. 11, the hydraulic motor 3 and the pump assembly 1702 can be integrated into a hydrostatic transmission assembly 1701 as discussed above. However, the components that make up hydrostatic transmission assembly 1701, including the components that make up pump assembly 1702, can be disposed separately if desired, using hoses and pipes to provide the interconnections.

In an exemplary embodiment, the pump 1710 is a variable speed, variable torque pump. In some embodiments, the hydraulic pump 1710 is bi-directional. The proportional control valve assemblies 222, 242 each include an actuator 222A, 242A and a control valve 222B, 242B that are used in conjunction with the pump 1710 to control the flow or pressure during the operation. That is, during the hydraulic system operation, in some embodiments, the control unit 266 will control the speed and/or torque of the motor or motors in pump 1710 while concurrently controlling an opening of at least one of the proportional control valves 222B, 242B to adjust the flow and/or pressure in the hydraulic system. In some embodiments, the actuators 222A and 242A are servomotors that position the valves 222B and 242B to the required opening. The servomotors can include linear motors or rotational motors depending on the type of control valve 222B, 242B.

In the system of FIG. 12, the control valve assembly 242 is disposed between port B of the hydraulic pump 1710 and port B of the hydraulic motor 3 and the second control valve assembly 222 is disposed between port A of the hydraulic pump 1710 and port A of the hydraulic motor 3. The control valve assemblies are controlled by the control unit 266 via the drive unit 295. The control valves 222B, 242B can be commanded to go full open, full closed, or throttled between 0% and 100% by the control unit 266 via the drive unit 295 using the corresponding communication connection 302, 303. In some embodiments, the control unit 266 can communicate directly with each control valve assembly 222, 242 and the hydraulic pump 1710. The proportional control valve assemblies 222, 242 and hydraulic pump 1710 are powered by a common power supply 296. In some embodiments, the pump 1710 and the proportional control valve assemblies 222, 242 can be powered separately or each valve assembly 222, 242 and pump 1710 can have its own power supply.

The hydrostatic transmission system 1700 can include one or more process sensors therein. For example sensor assemblies 297 and 298 can include one or more sensors to monitor the system operational parameters. The sensor assemblies 297, 298 can communicate with the control unit 266 and/or drive unit 295. Each sensor assembly 297, 298 can include at least one of a pressure transducer, a temperature transducer, and a flow transducer (i.e., any combination of the transducers therein). Signals from the sensor assemblies 297, 298 can be used by the control unit 266 and/or drive unit 295 for monitoring and for control purposes. The status of each valve assembly 222, 242 (e.g., the operational status of the control valves such as open, closed, percent opening, the operational status of the actuator such as current/power draw, or some other valve/actuator status indication) and the process data measured by the sensors in sensor assemblies 297, 298 (e.g., measured pressure, temperature, flow rate or other system parameters) may be communicated to the drive unit 295 via the respective communication connections 302-305. Alternatively or in addition to sensor assemblies 297 and 298, the pump assembly 1702 can include integrated sensor assemblies to monitor system parameters (e.g., measured pressure, temperature, flow rate or other system parameters). For example, as shown in FIG. 12, sensor assemblies 228 and 248 can be disposed adjacent to the ports of pump 1710 to monitor, e.g., the pump's mechanical performance. The sensors can communicate directly with the pump 1710 as shown in FIG. 12 and/or with drive unit 295 and/or control unit 266 (not shown).

The motors of pump 1710 are controlled by the control unit 266 via the drive unit 295 using communication connection 301. In some embodiments, the functions of drive unit 295 can be incorporated into one or both motors (e.g., a controller module disposed on the motor) and/or the control unit 266 such that the control unit 266 communicates directly with one or both motors. In addition, the valve assemblies 222, 242 can also be controlled (e.g., open/close, percentage opening) by the control unit 266 via the drive unit 295 using communication connections 301, 302, and 303. In some embodiments, the functions of drive unit 295 can be incorporated into the valve assemblies 222, 242 (e.g., a controller module in the valve assembly) and/or control unit 266 such that the control unit 266 communicates directly with valve assemblies 222, 242. The drive unit 295 can also process the communications between the control unit 266 and the sensor assemblies 297, 298 using communication connections 304 and 305 and/or process the communications between the control unit 266 and the sensor assemblies 228, 248 using communication connections (not shown). In some embodiments, the control unit 266 can be set up to communicate directly with the sensor assemblies 228, 248, 297 and/or 298. The data from the sensors can be used by the control unit 266 and/or drive unit 295 to control the motors of pump 1710 and/or the valve assemblies 222, 242. For example, based on the process data measured by the sensors in sensor assemblies 228, 248, 297, 298, the control unit 266 can provide command signals to control a speed and/or torque of the motors in the pump 1710 and concurrently provide command signals to the valve actuators 222A, 242A to respectively control an opening of the control valves 222B, 242B in the valve assemblies 222, 242.

The drive unit 295 includes hardware and/or software that interprets the command signals from the control unit 266 and sends the appropriate demand signals to the motors and/or valve assemblies 222, 242. For example, the drive unit 295 can include pump and/or motor curves that are specific to the hydraulic pump 1710 such that command signals from the control unit 266 will be converted to appropriate speed/torque demand signals to the hydraulic pump 1710 based on the design of the hydraulic pump 1710. Similarly, the drive unit 295 can include valve curves that are specific to the valve assemblies 222, 242 and the command signals from the control unit 266 will be converted to the appropriate demand signals based on the type of valve. The pump/motor and/or the valve curves can be implemented in hardware and/or software, e.g., in the form of hardwire circuits, software algorithms and formulas, or some other hardware and/or software system that appropriately converts the demand signals to control the pump/motor and/or the valve. In some embodiments, the drive unit 295 can include application specific hardware circuits and/or software (e.g., algorithms or any other instruction or set of instructions executed by a micro-processor or other similar device to perform a desired operation) to control the motors and/or proportional control valve assemblies 222, 242. For example, in some applications, the hydraulic motor 3 can be installed on an excavator blade of an excavator. In such an exemplary system, the drive unit 295 can include circuits, algorithms, protocols (e.g., safety, operational or some other type of protocols), look-up tables, or some other application data that are specific to the operation of the blade. Thus, a command signal from the control unit 266 can be interpreted by the drive unit 295 to appropriately control the motors of pump 1710 and/or the openings of control valves 222B, 222B to position the blade at a required position or move the blade at a required speed.

The control unit 266 can receive feedback data from the motors. For example, the control unit 266 can receive speed or frequency values, torque values, current and voltage values, or other values related to the operation of the motors. In addition, the control unit 266 can receive feedback data from the valve assemblies 222, 242. For example, the control unit 266 can receive feedback data from the proportional control valves 222B, 242B and/or the valve actuators 222A, 242A. For example, the control unit 266 can receive the open and close status and/or the percent opening status of the control valves 222B, 242B. In addition, depending on the type of valve actuator, the control unit 266 can receive feedback such as speed and/or the position of the actuator and/or the current/power draw of the actuator. Further, the control unit 266 can receive feedback of process parameters such as pressure, temperature, flow, or some other process parameter. As discussed above, each sensor assembly 228, 248, 297, 298 can have one or more sensors to measure process parameters such as pressure, temperature, and flow rate of the hydraulic fluid. The illustrated sensor assemblies 228, 248, 297, 298 are shown disposed next to the hydraulic motor 3 and the pump 1710. However, the sensor assemblies 228, 248, 297 and 298 are not limited to these locations. Alternatively, or in addition to sensor assemblies 228, 248, 297, 298, the system 1700 can have other sensors throughout the system to measure process parameters such as, e.g., pressure, temperature, flow, or some other process parameter. While the range and accuracy of the sensors will be determined by the specific application, it is contemplated that hydraulic system application with have pressure transducers that range from 0 to 5000 psi with the accuracy of +/−0.5%. These transducers can convert the measured pressure to an electrical output, e.g., a voltage ranging from 1 to 5 DC voltages. Similarly, temperature transducers can range from −4 deg. F. to 300 deg. F., and flow transducers can range from 0 gallons per minute (gpm) to 160 gpm with an accuracy of +/−1% of reading. However, the type, range and accuracy of the transducers in the present disclosure are not limited to the transducers discussed above, and the type, range and/or the accuracy of the transducers can vary without departing from the scope of the present disclosure.

Although the drive unit 295 and control unit 266 are shown as separate controllers in FIG. 12, the functions of these units can be incorporated into a single controller or further separated into multiple controllers (e.g., the motors in pump 1710 and proportional control valve assemblies 222, 242 can have a common controller or each component can have its own controller). The controllers (e.g., control unit 266, drive unit 295 and/or other controllers) can communicate with each other to coordinate the operation of the proportional control valve assemblies 222, 242 and the hydraulic pump 1710. For example, as illustrated in FIG. 11, the control unit 266 communicates with the drive unit 295 via a communication connection 301. The communications can be digital based or analog based (or a combination thereof) and can be wired or wireless (or a combination thereof). In some embodiments, the control system can be a "fly-by-wire" operation in that the control and sensor signals between the control unit 266, the drive unit 295, the valve assemblies 222, 242, hydraulic pump 1710, sensor assemblies 297, 298 are entirely electronic or nearly all electronic. That is, the control system does not use hydraulic signal lines or hydraulic feedback lines for control, e.g., the actuators in valve assemblies 222, 242 do not have hydraulic connections for pilot valves. In some exemplary embodiments, a combination of electronic and hydraulic controls can be used.

In the exemplary system of FIG. 12, when the control unit 266 receives a command to move the load, for example in response to an operator's command, the control unit 266 controls the speed and/or torque of the pump 1710 to transfer pressurized fluid to a port of the hydraulic motor 3. For example, pump 1710 can transfer pumps fluid from its inlet port B to it outlet port A and then to port A of the hydraulic motor 3. In this way, the fluid from port B of the hydraulic motor 3 is drawn, via the hydraulic line 268, into port B of the pump 1710 and carried to the port A and further to port A of the hydraulic motor 3 via the hydraulic line 270. During this operation of the pump 1710, the pressure in the port B side of the pump 1710 can become lower than that of the storage device (i.e. pressurized vessel) 1770. When this happens, the pressurized fluid stored in the storage device 1770 is released to the port B side of the system so that the pump does not experience cavitation. The storage device 1770 can also serve to absorb shocks and other fluid disturbances.

The control unit 266 may receive inputs from an operator's input unit 276. The structure of the input unit 276 is not limiting and can be a control panel with pushbuttons, dials, knobs, levers or other similar input devices; a computer terminal or console with a keyboard, keypad, mouse, trackball, touchscreen or other similar input devices; a portable computing device such as a laptop, personal digital assistant (PDA), cell phone, digital tablet or some other portable device; or a combination thereof. Using the input unit 276, the operator can manually control the system or select pre-programmed routines. For example, the operator can select a mode of operation for the system such as flow (or speed) mode, pressure (or torque) mode, or a balanced mode. Flow or speed mode can be utilized for an operation where relatively fast response of the hydraulic motor 3 with a relatively low torque requirement is required. Conversely, a pressure or torque mode can be utilized for an operation where a relatively slow response of the hydraulic motor 3 with a relatively high torque requirement is required. Preferably, the motors of pump 1710 are variable speed/variable torque and bi-directional. Based on the mode of operation selected, the control scheme for controlling the motors of pump 1710 and the control valves 222B, 242B of proportional control valve assemblies 222, 242 can be different. That is, depending on the desired mode of operation, e.g., as set by the operator or as determined by the system based on the application for the hydrostatic transmission, the flow and/or pressure to the hydraulic motor 3 can be controlled to an operational set-point value by controlling either the speed or torque of the motors of pump 1710 and/or the opening of control valves 222B, 242B. The operation of the control valves 222B, 242B and pump 1710 are coordinated such that both the opening of the control valves 222B, 242B and the speed/torque of the motors of the pump 10 are appropriately controlled to maintain a desired flow/pressure in the system. For example, in a flow (or speed) mode operation, the control unit 266/drive unit 295 controls the flow in the system by controlling the speed of the motors of the pump 10 in combination with the opening of the control valves 222B, 242B, as described below. When the system is in a pressure (or torque) mode operation, the control unit 266/drive unit 295 controls the pressure at a desired point in the system, e.g., at port A or B of the hydraulic motor 3, by adjusting the torque of the motors of the pump 1710 in combination with the opening of the control valves 222B, 242B, as described below. When the system is in a balanced mode of operation, the control unit 266/drive unit 295 takes both the system's pressure and hydraulic flow rate into account when controlling the motors of the pump 1710 and the control valves 222B, 242B. Thus, based on the mode of operation selected, the control scheme for controlling the motors can be different.

Because the pump 1710 is not run continuously at a high rpm as in conventional systems, the temperature of the fluid remains relatively low thereby eliminating the need for a large fluid reservoir such as those found in conventional systems. In addition, the use of proportional control valve assemblies 222, 242 in combination with controlling the pump 1710 provides for greater flexibility in control of the system. For example, concurrently controlling the combination of control valves 222B, 242B and the motors of the pump 1710 provides for faster and more precise control of the hydraulic system flow and pressure than with the use of a hydraulic pump alone. When the system requires an increase or decrease in the flow, the control unit 266/drive unit 295 will change the speeds of the motors of the pump 1710 accordingly. However, due to the inertia of the hydraulic pump 1710 and the hydrostatic transmission system 1700, there can be a time delay between when the new flow demand signal is received by the motors of the pump 1710 and when there is an actual change in the fluid flow. Similarly, in pressure/torque mode, there can also be a time delay between when the new pressure demand signal is sent and when there is an actual change in the system pressure. When fast response times are required, the control valves 222B, 242B allow for the hydrostatic transmission system 1700 to provide a near instantaneous response to changes in the flow/pressure demand signal. In some systems, the control unit 266 and/or the drive unit 295 can determine and set the proper mode of operation (e.g., flow mode, pressure mode, balanced mode) based on the application and the type of operation being performed. In some embodiments, the operator initially sets the mode of operation but the control unit 266/drive unit 295 can override the operator setting based on, e.g., predetermined operational and safety protocols.

As indicated above, the control of hydraulic pump 1710 and proportional control valve assemblies 222, 242 will vary depending on the mode of operation. Exemplary embodiments of controlling the pump and control valves in the various modes of operation are discussed below.

In pressure/torque mode operation, the power output the motors of the pump 1710 is determined based on the system application requirements using criteria such as maximizing the torque of the motors of the pump 1710. If the hydraulic pressure is less than a predetermined set-point at, for example, port A of the hydraulic motor 3, the control unit 266/drive unit 295 will increase the torque of the motors of the pump 1710 to increase the hydraulic pressure, e.g., by increasing the motor's current (and thus the torque). Of course, the method of increasing the torque will vary depending on the type of prime mover. If the pressure at port A of the hydraulic motor 3 is higher than the desired pressure, the control unit 266/drive unit 295 will decrease the torque from the motors of the pump 1710, e.g., by decreasing the motor's current (and thus the torque), to reduce the hydraulic pressure. While the pressure at port A of the hydraulic motor 3 is used in the above-discussed exemplary embodiment, pressure mode operation is not limited to measuring the pressure at that location or even a single location. Instead, the control unit 266/drive unit 295 can receive pressure feedback signals from any other location or from multiple locations in the system for control. Pressure/torque mode operation can be used in a variety of applications. For example, if there is a command to move the hydraulic motor 3, the control unit 266/drive unit 295 will determine that an increase in pressure at one of the ports (e.g., port A) is needed and will then send a signal to the motors of the pump 1710 and to the control valve assemblies 222, 242 that results in a pressure increase at the inlet to port A of the hydraulic motor 3.

In pressure/torque mode operation, the demand signal to the hydraulic pump 1710 will increase the current to the motors driving the gears of the hydraulic pump 1710, which increases the torque. However, as discussed above, there can be a time delay between when the demand signal is sent and when the pressure actually increases at, e.g., port A of the hydraulic motor 3. To reduce or eliminate this time delay, the control unit 266/drive unit 295 will also concurrently send (e.g., simultaneously or near simultaneously) a signal to one or both of the control valve assemblies 222, 242 to further open (i.e. increase valve opening). Because the reaction time of the control valves 222B, 242B is faster than that of the pump 1710 due to the control valves 222B, 242B having less inertia, the pressure at the hydraulic motor 3 will immediately increase as one or both of the control valves 222B, 242B starts to open further. For example, if port A of the hydraulic pump 10 is the discharge of the pump 1710, the control valve 222B can be operated to immediately control the pressure at port A of the hydraulic motor 3 to a desired value. During the time the control valve 222B is being controlled, the motors of the pump 1710 will be increasing the pressure at the discharge of the pump 1710. As the pressure increases, the control unit 266/drive unit 295 will make appropriate corrections to the control valve 222B to maintain the desired pressure at port A of the hydraulic motor 3.

In some embodiments, the control valve on the downstream side of the hydraulic pump 10, i.e., the valve on the discharge side, will be controlled while the valve on the upstream side remains at a constant predetermined valve opening, e.g., the upstream valve can be set to 100% open (or near 100% or considerably high percent of opening) to minimize fluid resistance in the hydraulic lines. In the above example, the control unit 266/drive unit 295 can throttle (or control) the control valve 222B (i.e. downstream valve) while maintaining the control valve 242B (i.e. upstream valve) at a constant valve opening, e.g., 100% open.

In some embodiments, the upstream valve of the control valves 222B, 242B can also be controlled, e.g., in order to eliminate or reduce instabilities in the hydrostatic transmission system 1700 or for some other reason. For example, as the hydraulic motor 3 is used to operate a load, the load could cause flow or pressure instabilities in the system 1700 (e.g., due to mechanical problems in the load, a shift in the weight of the load, or for some other reason). The control unit 266/drive unit 295 can be configured to control the control valves 222B, 242B to eliminate or reduce the instability. For example, if, as the pressure is being increased to the hydraulic motor 3, the motor 3 starts to act erratically (e.g., the hydraulic motor 3 starts moving too fast or some other erratic behavior) due to an instability in the load, the control unit 266/drive unit 295 can be configured to sense the instability based on the pressure and flow sensors and to close one or both of the control valves 222B, 242B appropriately to stabilize the hydrostatic transmission system 1700. Of course, the control unit 266/drive unit 295 can be configured with safeguards so that the upstream valve does not close so far as to starve the hydraulic pump 1710.

In some situations, the pressure at the hydraulic motor 3 is higher than desired, which can mean that the motor 3 will move too fast or move when it should be stationary. Of course, in other types of applications and/or situations a higher than desired pressure could lead to other undesired operating conditions. In such cases, the control unit 266/drive unit 295 can determine that there is too much pressure at the appropriate port of the hydraulic motor 3. If so, the control unit 266/drive unit 295 will determine that a decrease in pressure at the appropriate port of the hydraulic motor 3 is needed and will then send a signal to the pump 1710 and to the proportional control valve assemblies 222, 242 that results in a pressure decrease. The pump demand signals to the hydraulic pump 1710 will decrease, and thus will reduce the current to the motors, which decreases the torque. However, as discussed above, there can be a time delay between when the demand signal is sent and when the pressure at the hydraulic motor 3 actually decreases. To reduce or eliminate this time delay, the control unit 266/drive unit 295 will also concurrently send (e.g., simultaneously or near simultaneously) a signal to one or both of the control valve assemblies 222, 242 to further close (i.e. decrease valve opening). The valve position demand signal to at least the downstream servomotor controller will decrease, and thus reducing the opening of the downstream control valve and the pressure to the hydraulic motor 3. Because the reaction time of the control valves 222B, 242B will be faster than that of the motors 1741, 1761 of the pump 1710 due to the control valves 222B, 242B having less inertia, the pressure at the appropriate port of the hydraulic motor 3 will immediately decrease as one or both of the control valves 222B, 242B starts to close. As the pressure starts to decrease due to the speed of the pump 1710 decreasing, one or both of the control valves 222B, 242B will start to open to maintain the pressure setpoint at the appropriate port of the hydraulic motor 3.

In flow/speed mode operation, the power to the motors of the pump 1710 is determined based on the system application requirements using criteria such as how fast the motors of the pump 1710 ramp to the desired speed and how precisely the motor speed can be controlled. Because the fluid flow rate is proportional to the speed of motors/gears of the pump 1710 and the fluid flow rate determines an operation of the hydraulic motor 3 (e.g., the rotational speed of the motor 3 or another appropriate parameter depending on the type of system and type of load), the control unit 266/drive unit 295 can be configured to control the operation of the hydraulic motor 3 based on a control scheme that uses the speed of motors of the pump 1710, the flow rate, or some combination of the two. That is, when, e.g., a specific response time of hydraulic motor 3 is required, e.g., a specific rotational speed for the hydraulic motor 3, the control unit 266/drive unit 295 can control the motors of the pump 1710 to achieve a predetermined speed and/or a predetermined hydraulic flow rate that corresponds to the desired specific response of hydraulic motor 3. For example, the control unit 266/drive unit 295 can be set up with algorithms, look-up tables, datasets, or another software or hardware component to correlate the operation of the hydraulic motor 3 (e.g., rotational speed of a hydraulic motor 3) to the speed of the hydraulic pump 1710 and/or the flow rate of the hydraulic fluid in the system 1700. Thus, if the system requires that the hydraulic motor 3 move a given amount in a predetermined time period, i.e., at a desired rotational speed, the control unit 266/drive unit 295 can be set up to control either the speed of the motors of the pump 1710 or the hydraulic flow rate in the system to achieve the desired operation of the hydraulic motor 3.

If the control scheme uses the flow rate, the control unit 266/drive unit 295 can receive a feedback signal from a flow sensor, e.g., a flow sensor in one or more of sensor assemblies 228, 248, 297, 298, to determine the actual flow in the system. The flow in the system can be determined by measuring, e.g., the differential pressure across two points in the system, the signals from an ultrasonic flow meter, the frequency signal from a turbine flow meter, or some other flow sensor/instrument. Thus, in systems where the control scheme uses the flow rate, the control unit 266/drive unit 295 can control the flow output of the hydraulic pump 1710 to a predetermined flow set-point value that corresponds to the desired operation of the hydraulic motor 3 (e.g., the rotational speed of the hydraulic motor 3 or another appropriate parameter depending on the type of system and type of load).

Similarly, if the control scheme uses the motor speed, the control unit 266/drive unit 295 can receive speed feedback signal(s) from the motors of the pump 1710 or the gears of pump 1710. For example, the actual speeds of the motors of the pump 1710 can be measured by sensing the rotation of the fluid displacement member. For the gears, the hydraulic pump 10 can include a magnetic sensor (not shown) that senses the gear teeth as they rotate. Alternatively, or in addition to the magnetic sensor (not shown), one or more teeth can include magnets that are sensed by a pickup located either internal or external to the hydraulic pump casing. Of course the magnets and magnetic sensors can be incorporated into other types of fluid displacement members and other types of speed sensors can be used. Thus, in systems where the control scheme uses the flow rate, the control unit 266/drive unit 295 can control the actual speed of the hydraulic pump 1710 to a predetermined speed set-point that corresponds to the desired operation of the hydraulic motor 3. Alternatively, or in addition to the controls described above, the speed of the hydraulic motor 3 can be measured directly and compared to a desired rotational speed set-point to control the speeds of pump motors.

If the system is in flow mode operation and the application requires a predetermined flow to hydraulic motor 3 (e.g., to move the motor at a predetermined rotational speed or some other appropriate operation of the motor 3 depending on the type of system and the type of load), the control unit 266/drive unit 295 will determine the required flow that corresponds to the desired hydraulic flow rate. If the control unit 266/drive unit 295 determines that an increase in the hydraulic flow is needed, the control unit 266/drive unit 295 and will then send a signal to the hydraulic pump 1710 and to the control valve assemblies 222, 242 that results in a flow increase. The demand signal to the hydraulic pump 1710 will increase the speed of the motors of the pump 1710 to match a speed corresponding to the required higher flow rate. However, as discussed above, there can be a time delay between when the demand signal is sent and when the flow actually increases. To reduce or eliminate this time delay, the control unit 266/drive unit 295 will also concurrently send (e.g., simultaneously or near simultaneously) a signal to one or both of the control valve assemblies 222, 242 to further open (i.e. increase valve opening). Because the reaction time of the control valves 222B, 242B will be faster than that of the motors of the pump 1710 due to the control valves 222B, 242B having less inertia, the hydraulic fluid flow in the system will immediately increase as one or both of the control valves 222B, 242B starts to open. The control unit 266/drive unit 295 will then control the control valves 222B, 242B to maintain the required flow rate. During the time the control valves 222B, 242B are being controlled, the motors of the pump 1710 will be increasing their speed to match the higher speed demand from the control unit 266/drive unit 295. As the speeds of the motors of the pump 1710 increase, the flow will also increase. However, as the flow increases, the control unit 266/drive unit 295 will make appropriate corrections to the control valves 222B, 242B to maintain the required flow rate, e.g., in this case, the control unit 266/drive unit 295 will start to close one or both of the control valves 222B, 242B to maintain the required flow rate.

In some embodiments, the control valve downstream of the hydraulic pump 1710, i.e., the valve on the discharge side, will be controlled while the valve on the upstream side remains at a constant predetermined valve opening, e.g., the upstream valve can be set to 100% open (or near 100% or considerably high percent of opening) to minimize fluid resistance in the hydraulic lines.

In the above example, the control unit 266/drive unit 295 throttles (or controls) the downstream valve while maintaining the upstream valve at a constant valve opening, e.g., 100% open (or near 100% or considerably high percent of opening). Similar to the pressure mode operation discussed above, in some embodiments, the upstream control valve can also be controlled to eliminate or reduce instabilities in the hydrostatic transmission system 1700 as discussed above.

In some situations, the flow to the hydraulic motor 3 is higher than desired, which can mean that the motor 3 will move too fast or move when it should be stationary. Of course, in other types of applications and/or situations a higher than desired flow could lead to other undesired operating conditions. In such cases, the control unit 266/drive unit 295 can determine that the flow to the corresponding port of hydraulic motor 3 is too high. If so, the control unit 266/drive unit 295 will determine that a decrease in flow to the hydraulic motor 3 is needed and will then send a signal to the hydraulic pump 1710 and to the control valve assemblies 222, 242 to decrease flow. The pump demand signals to the hydraulic pump 1710 will decrease, and thus will reduce the speed of the respective motors of the pump 1710 to match a speed corresponding to the required lower flow rate. However, as discussed above, there can be a time delay between when the demand signal is sent and when the flow actually decreases. To reduce or eliminate this time delay, the control unit 266/drive unit 295 will also concurrently send (e.g., simultaneously or near simultaneously) a signal to at least one of the control valve assemblies 222, 242 to further close (i.e. decrease valve opening). The valve position demand signal to at least the downstream servomotor controller will decrease, and thus reducing the opening of the downstream control valve and the flow to the hydraulic motor 3. Because the reaction time of the control valves 222B, 242B will be faster than that of the motors of the pump 1710 due to the control valves 222B, 242B having less inertia, the system flow will immediately decrease as one or both of the control valves 222B, 242B starts to close. As the speeds of the motors of the pump 1710 start to decrease, the flow will also start to decrease. However, the control unit 266/drive unit 295 will appropriately control the control valves 222B, 242B to maintain the required flow (i.e., the control unit 266/drive unit 295 will start to open one or both of the control valves 222B, 242B as the motor speed decreases). For example, the downstream valve with respect to the hydraulic pump 1710 can be throttled to control the flow to a desired value while the upstream valve is maintained at a constant value opening, e.g., 100% open to reduce flow resistance. If, however, an even faster response is needed (or a command signal to promptly decrease the flow is received), the control unit 266/drive unit 295 can also be configured to considerably close the upstream valve. Considerably closing the upstream valve can serve to act as a "hydraulic brake" to quickly slow down the flow in the hydrostatic transmission system 1700 by increasing the back pressure on the hydraulic motor 3. Of course, the control unit 266/drive unit 295 can be configured with safeguards so as not to close the upstream valve so far as to starve the hydraulic pump 1710. Additionally, as discussed above, the control valves 222B, 242B can also be controlled to eliminate or reduce instabilities in the system 1700.

In balanced mode operation, the control unit 266/drive unit 295 can be configured to take into account both the flow and pressure of the system. For example, the control unit 266/drive unit 295 can primarily control to a flow setpoint during normal operation, but the control unit 266/drive unit 295 will also ensure that the pressure in the system stays within certain upper and/or lower limits Conversely, the control unit 266/drive unit 295 can primarily control to a pressure setpoint, but the control unit 266/drive unit 295 will also ensure that the flow stays within certain upper and/or lower limits.

In some embodiments of a balanced mode operation, the hydraulic pump 1710 and control valve assemblies 222, 242 can have dedicated functions. For example, the pressure in the system can be controlled by the hydraulic pump 1710 and the flow in the system can be controlled by the control valve assemblies 222, 242, or vice versa as desired. For example, the pump control circuit 210 can be set up to control a pressure between the outlet of pump 1710 and the downstream control valve and the valve control circuit 220 can be configured to control the flow in the fluid system.

In the above exemplary embodiments, in order to ensure that there is sufficient reserve capacity to provide a fast flow response when desired, the control valves 222B, 242B can be operated in a range that allows for travel in either direction in order to allow for a rapid increase or decrease in the flow or the pressure at the hydraulic motor 3. For example, the downstream control valve with respect to the hydraulic pump 1710 can be operated at a percent opening that is less than 100%, i.e., at a throttled position. That is, the downstream control valve can be set to operate at, e.g., 85% of full valve opening. This throttled position allows for 15% valve travel in the open direction to rapidly increase flow to or pressure at the appropriate port of the hydraulic motor 3 when needed. Of course, the control valve setting is not limited to 85% and the control valves 222B, 242B can be operated at any desired percentage. In some embodiments, the control can be set to operate at a percent opening that corresponds to a percent of maximum flow or pressure, e.g., 85% of maximum flow/pressure or some other desired value. While the travel in the closed direction can go down to 0% valve opening to decrease the flow and pressure at the hydraulic motor 3, to maintain system stability, the valve travel in the closed direction can be limited to, e.g., a percent of valve opening and/or a percent of maximum flow/pressure. For example, the control unit 266/drive unit 295 can be configured to prevent further closing of the control valves 222B, 242B if the lower limit with respect to valve opening or percent of maximum flow/pressure is reached. In some embodiments, the control unit 266/drive unit 295 can limit the control valves 222B, 242B from opening further if an upper limit of the control valve opening and/or a percent of maximum flow/pressure has been reached.

Figure 13:
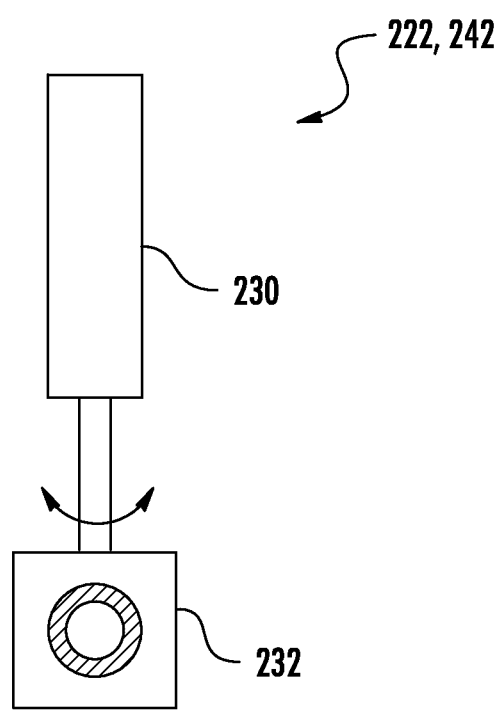
FIG. 13 illustrates an exemplary embodiment of a proportional control valve.

As discussed above, the control valve assemblies 222, 242 include the control valves 222B, 242B that can be throttled between 0% to 100% of valve opening. FIG. 13 shows an exemplary embodiment of the control valves 222B, 242B. As illustrated in FIG. 13, each of the control valves 222B, 242B can include a ball valve 232 and a valve actuator 230. The valve actuator 230 can be an all-electric actuator, i.e., no hydraulics, that opens and closes the ball valve 232 based on signals from the control unit 266/drive unit 295 via communication connection 302, 303. For example, as discussed above, in some embodiments, the actuator 230 can be a servomotor that is a rotatory motor or a hydrostatic transmission motor. Embodiments of the present invention, however, are not limited to all-electric actuators and other type of actuators such as electro-hydraulic actuators can be used. The control unit 266/drive unit 295 can include characteristic curves for the ball valve 232 that correlate the percent rotation of the ball valve 232 to the actual or percent cross-sectional opening of the ball valve 232. The characteristic curves can be predetermined and specific to each type and size of the ball valve 232 and stored in the control unit 266 and/or drive unit 295. In addition, the hydraulic motor 3 can also have characteristic curves that describe the operational characteristics of the motor, e.g., curves that correlate pressure/flow with rotational speed/position.

Figure 14:
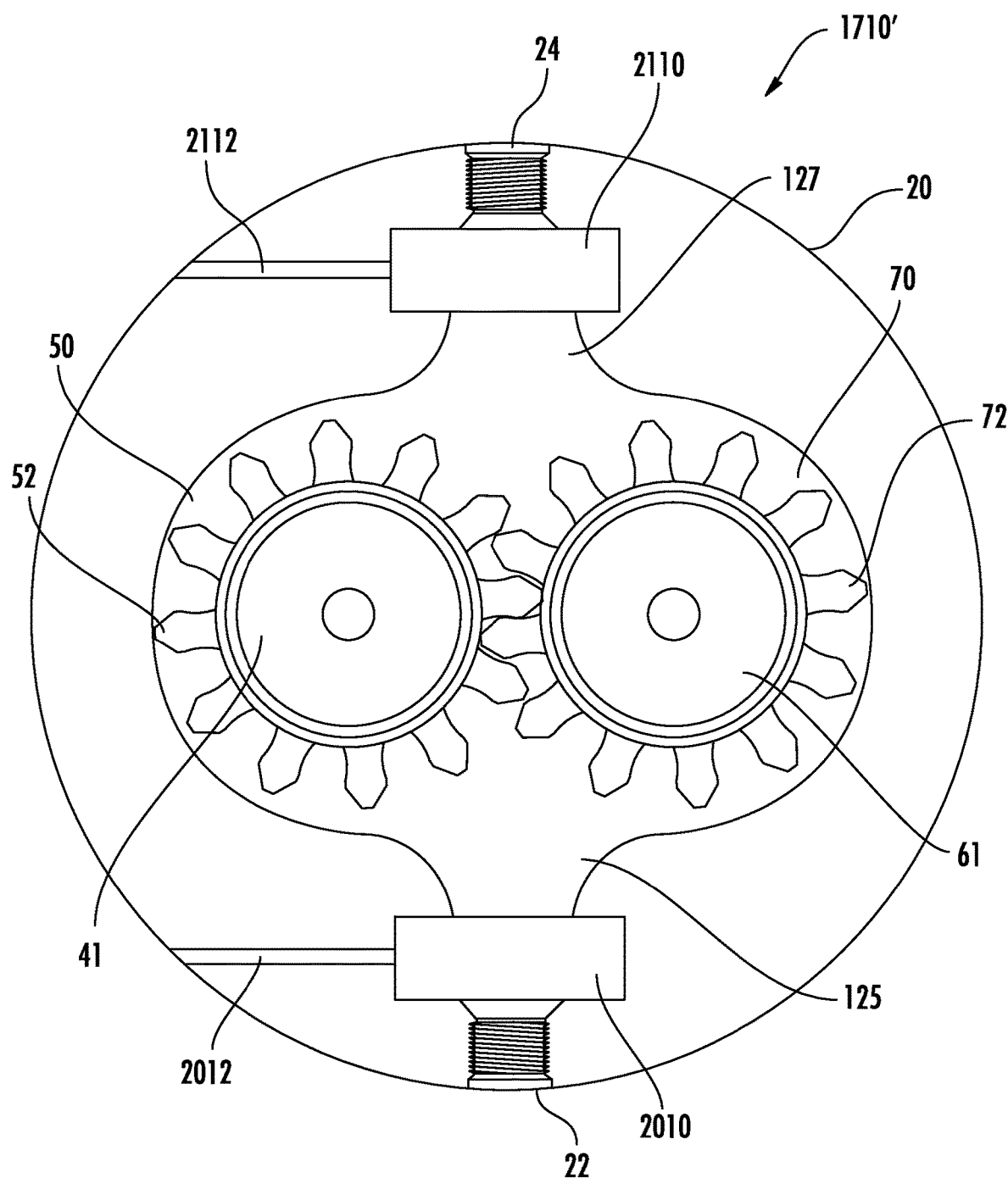
FIG. 14 shows a preferred internal configuration of an external gear pump.

In some embodiments, the control valve assemblies 222, 242 can be disposed on the inside of the pump 1710. For example, FIG. 14 shows an exemplary internal configuration of the external gear pump 1710'. The pump 1710' includes a valve assembly 2010 and a valve assembly 2110 disposed inside the casing 20. The valve assembly 2010 is disposed, e.g., in the vicinity of the inlet 22 of the pump 1710' and the valve assembly 2110 is disposed, e.g., in the vicinity of the outlet 24 of the pump 1710'. As seen in FIG. 14, the valve assembly 2010 is disposed in the fluid path between the interior volume portion 125 of the pump 1710' and the port 22 and the valve assembly 2110 is disposed in the fluid path between the interior volume portion 127 and the port 24.

Thus, because the valve assemblies 2010 and 2110 are disposed inside the pump casing 20 in this exemplary embodiment, the discharge port of the pump will be downstream of the downstream control valve assembly and the inlet port will be upstream of the upstream control valve assembly. For example, if the flow is from port 22 to port 24, the port 24 will be downstream of the "downstream" control valve assembly 2110 and the inlet port 22 will be upstream of the "upstream" control valve assembly 2010. The actuators of the control valve assemblies can be controlled via communication lines 2012 and 2112. Those skilled in the art will understand that the fluid displacement members (e.g., gears) of pump 1710', the control valve assemblies 2010 and 2110 and the controlling thereof can be the same as those in the exemplary embodiments discussed above. Thus, for brevity, the structural details and the operation of pump 1710' will not be further discussed. In some embodiments, the control valve assemblies can include a sensor array as discussed above. The sensor array can also communicate with the control unit via lines 2012 and 2112 or via separate communication lines.

The characteristic curves, whether for the control valves, e.g., control valves 222B, 242B (or any of the exemplary control valves discussed above), the prime movers, e.g., motors 41, 61 (or any of the exemplary motors discussed above), or the actuator, e.g., hydraulic motor 3, can be stored in memory, e.g. RAM, ROM, EPROM, etc. in the form of look-up tables, formulas, algorithms, datasets, or another software or hardware component that stores an appropriate relationship. For example, in the case of ball-type control valves, an exemplary relationship can be a correlation between the percent rotation of the ball valve to the actual or percent cross-sectional opening of the ball valve; in the case of electric motors, an exemplary relationship can be a correlation between the power input to the motors and an actual output speed, torque or some other motor output parameter; and in the case of the hydraulic motor, an exemplary relationship can be a correlation between the pressure and/or flow of the hydraulic fluid to the rotational speed of the hydraulic motor and/or the torque that can be exerted by the hydraulic motor on the load. As discussed above, the control unit 266/drive unit 295 uses the characteristic curves to precisely control the motors 41, 61, the control valves 222B, 242B, and/or the hydraulic motor 3. Alternatively, or in addition to the characteristic curves stored in control unit 266/drive unit 295, the control valve assemblies 222, 242, the pump 1710 (or any of the exemplary pumps discussed above), and/or the hydraulic motor can also include memory, e.g. RAM, ROM, EPROM, etc. to store the characteristic curves in the form of, e.g., look-up tables, formulas, algorithms, datasets, or another software or hardware component that stores an appropriate relationship.

The control unit 266 can be provided to exclusively control the hydrostatic transmission system 1. Alternatively, the control unit 266 can be part of and/or in cooperation with another control system for a machine or an industrial application in which the hydrostatic transmission system operates. The control unit 266 can include a central processing unit (CPU) which performs various processes such as commanded operations or pre-programmed routines. The process data and/or routines can be stored in a memory. The routines can also be stored on a storage medium disk such as a hard drive (HDD) or portable storage medium or can be stored remotely. However, the storage media is not limited by the media listed above. For example, the routines can be stored on CDs, DVDs, in FLASH memory, RAM, ROM, PROM, EPROM, EEPROM, hard disk or any other information processing device with which the computer aided design station communicates, such as a server or computer.

The CPU can be a Xenon or Core processor from Intel of America or an Opteron processor from AMD of America, or can be other processor types that would be recognized by one of ordinary skill in the art. Alternatively, the CPU can be implemented on an FPGA, ASIC, PLD or using discrete logic circuits, as one of ordinary skill in the art would recognize. Further, the CPU can be implemented as multiple processors cooperatively working in parallel to perform commanded operations or pre-programmed routines.

The control unit 266 can include a network controller, such as an Intel Ethernet PRO network interface card from Intel Corporation of America, for interfacing with a network. As can be appreciated, the network can be a public network, such as the Internet, or a private network such as a LAN or WAN network, or any combination thereof and can also include PSTN or ISDN sub-networks. The network can also be wired, such as an Ethernet network, or can be wireless, such as a cellular network including EDGE, 3G, and 4G wireless cellular systems. The wireless network can also be WiFi, Bluetooth, or any other wireless form of communication that is known. The control unit 266 can receive a command from an operator via a user input device such as a keyboard and/or mouse via either a wired or wireless communication. In addition, the communications between control unit 266, drive unit 295, and valve controllers, e.g., servomotros 222A, 242A, can be analog or via digital bus and can use known protocols such as, e.g., controller area network (CAN), Ethernet, common industrial protocol (CIP), Modbus and other well-known protocols.

In the above exemplary embodiments of the system, the pump assembly has a drive-drive configuration. However, the pump can have a driver-driven configuration.

Referring back to FIG. 2, the exemplary embodiment of the hydrostatic transmission 1 shown in FIG. 2 has the hydraulic pump assembly 2 disposed on one side of the hydraulic motor 3 such that the hydraulic pump assembly 2 (i.e., the pump 10 and the storage device 170) is in-line (or aligned) with the hydraulic motor 3 along the axis 17 of the hydraulic motor 3. This allows for a compact design, which is desirable in many applications. However, the configuration of the hydrostatic transmission of the present disclosure is not limited to the in-line configuration. In some applications, an "in-line" design is not practical. For example, in some applications, the size of the hydraulic pump and/or storage device or the spatial requirements for the hydraulic motor may not allow for an "in-line" configuration. Various other configurations of the hydrostatic transmission will be described next.

Figure 15A:
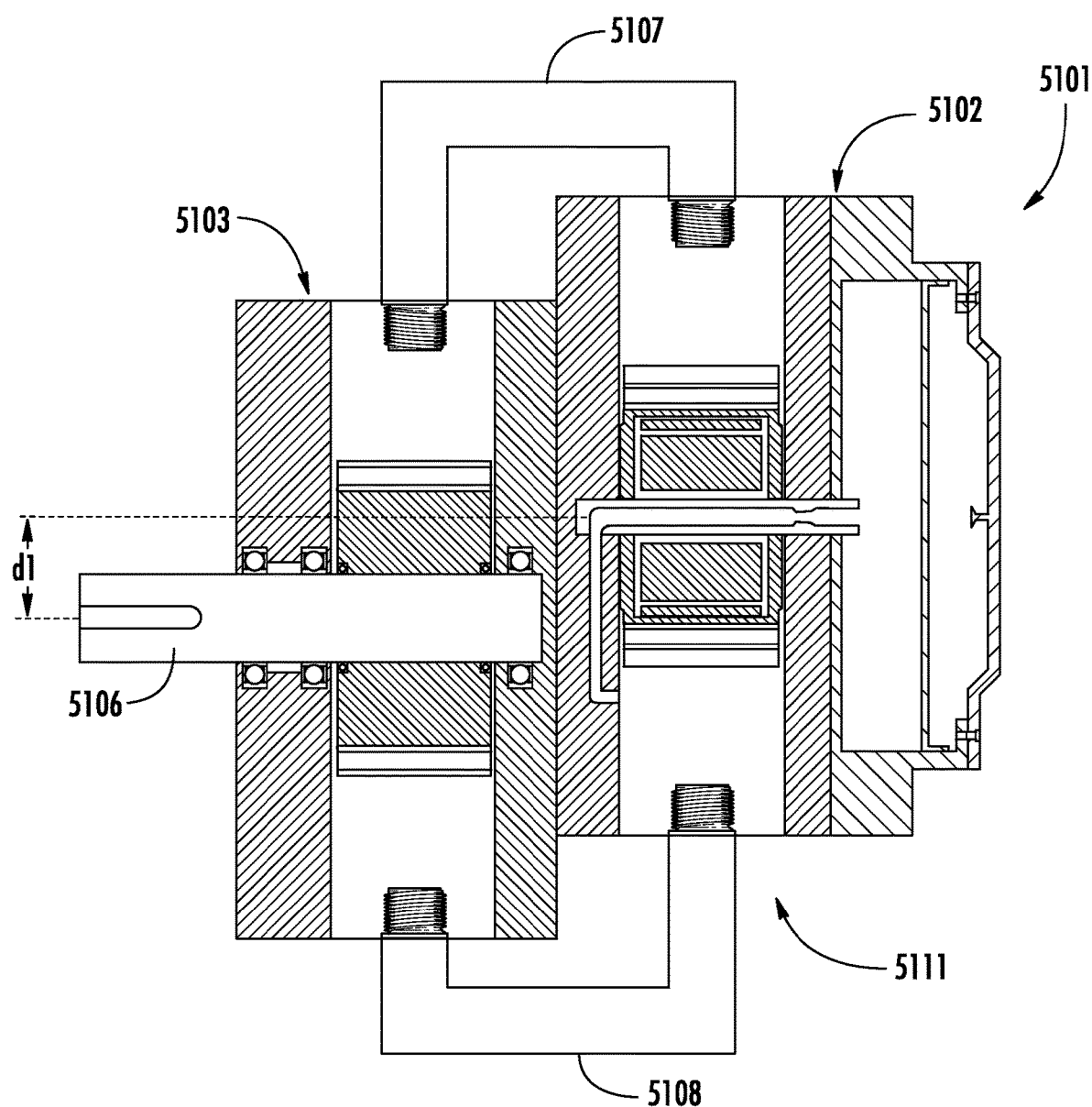
FIG. 15A shows another exemplary configuration of a hydrostatic transmission in which a pump assembly is disposed offset from an output shaft of a hydraulic motor.

FIG. 15A shows another exemplary configuration of a hydrostatic transmission. The configuration of the hydrostatic transmission 5101 shown in FIG. 15A is similar to that of the hydrostatic transmission 1 shown in FIG. 1. The pump assembly 5102 in the hydrostatic transmission 5101 is still disposed on the right side 5111 of the hydraulic motor 5103. However, the pump assembly 5102 is disposed offset (or spaced apart) from the output shaft 5106 of the hydraulic motor 5103 by an offset distance d1. This offset may be needed to provide space for other components (e.g., pipes, hoses) in the hydrostatic transmission 5101. The pump assembly 5102 and the hydraulic motor 5103 are in fluid communication with each other via fluid passages 5107, 5108.

Figure 15B:
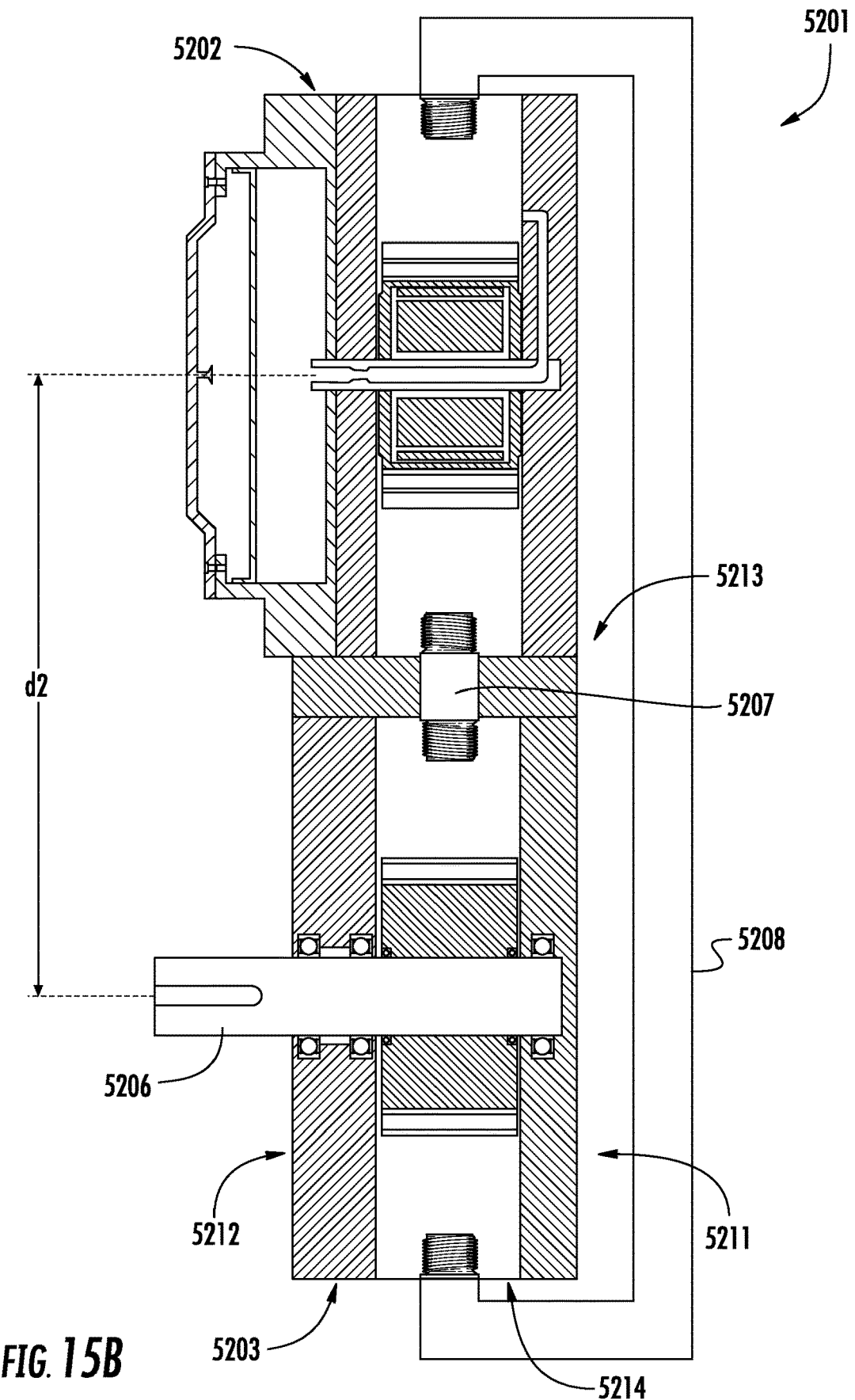
FIG. 15B shows another exemplary configuration of a hydrostatic transmission in which a pump assembly is disposed on the top side of a hydraulic motor and disposed offset from an output shaft of the hydraulic motor.

FIG. 15B shows further another exemplary configuration of a hydrostatic transmission. The configuration of the hydrostatic transmission 5201 shown in FIG. 15B does not have the pump assembly 5202 on the right side 5211 or on the left side 5212 of the hydraulic motor 5203. Instead, the pump assembly 5202 is disposed on the top side 5213 of the hydraulic motor 5203. The pump assembly 5202 is offset (or spaced apart) from the output shaft 5206 of the hydraulic motor 5203 by an offset distance d2. Alternatively, in other embodiments, the pump assembly 5202 may be disposed on the bottom side 5214 of the hydraulic motor 5203. Such configurations may be useful for a hydrostatic transmission (or a hydraulic system including the hydrostatic transmission) which does not allow installation of the pump assembly either on the right side or on the left side of the hydraulic motor. The pump assembly 5202 and the hydraulic motor 5203 are in fluid communication with each other via fluid passages 5207, 5208.

Figure 15C:
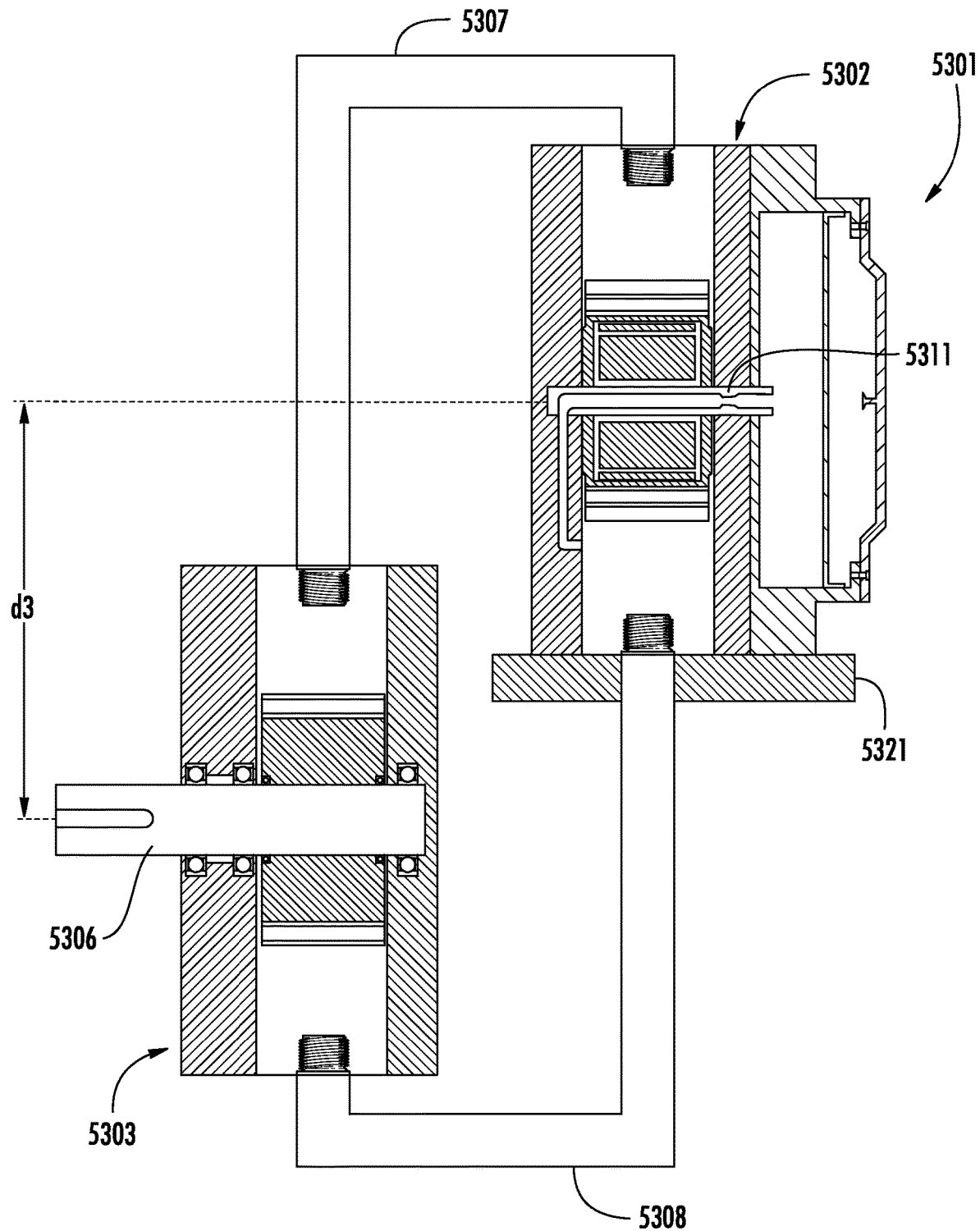
FIG. 15C shows another exemplary configuration of a hydrostatic transmission in which a pump assembly is disposed remotely from a hydraulic motor and disposed offset from an output shaft of the hydraulic motor.

FIG. 15C shows further another exemplary configuration of a hydrostatic transmission. The pump assembly 5302 in the hydrostatic transmission 5301 shown in FIG. 15C is not disposed on the hydraulic motor 5303. Instead, the pump assembly 5302 is disposed on a structure 5321 that is spaced apart from the hydraulic motor 5303 such that the pump assembly 5302 is disposed remotely from the hydraulic motor 5303, e.g., the pump assembly 5302 being offset (or spaced apart) from the output shaft 5306 of the hydraulic motor 5303 by an offset distance d3, as illustrated in FIG. 15C. The structure 5321 can be either a structure connected to the hydraulic motor 5303 or a structure completely separated from the hydraulic motor 5303. For example, for a wheel loader having a plurality of hydrostatic transmissions thereon, the hydraulic pump (or the pump assembly 5302) may be disposed at a central location such as a main body of the wheel loader, which is the case in many conventional systems. However, unlike the conventional system, the hydraulic pump (or the pump assembly 5302) and the hydraulic motor 5303 shown in FIG. 15C form a "closed-loop" hydraulic system, as discussed above, and provide the above-discussed benefits of the present disclosure. Such configurations may be useful for a hydrostatic transmission (or a hydraulic system including the hydrostatic transmission) which does not allow installation of the pump assembly on anywhere of the hydraulic motor 5303. The pump assembly 5302 and the hydraulic motor 5303 are in fluid communication with each other via fluid passages 5307, 5308.

Figure 15D:
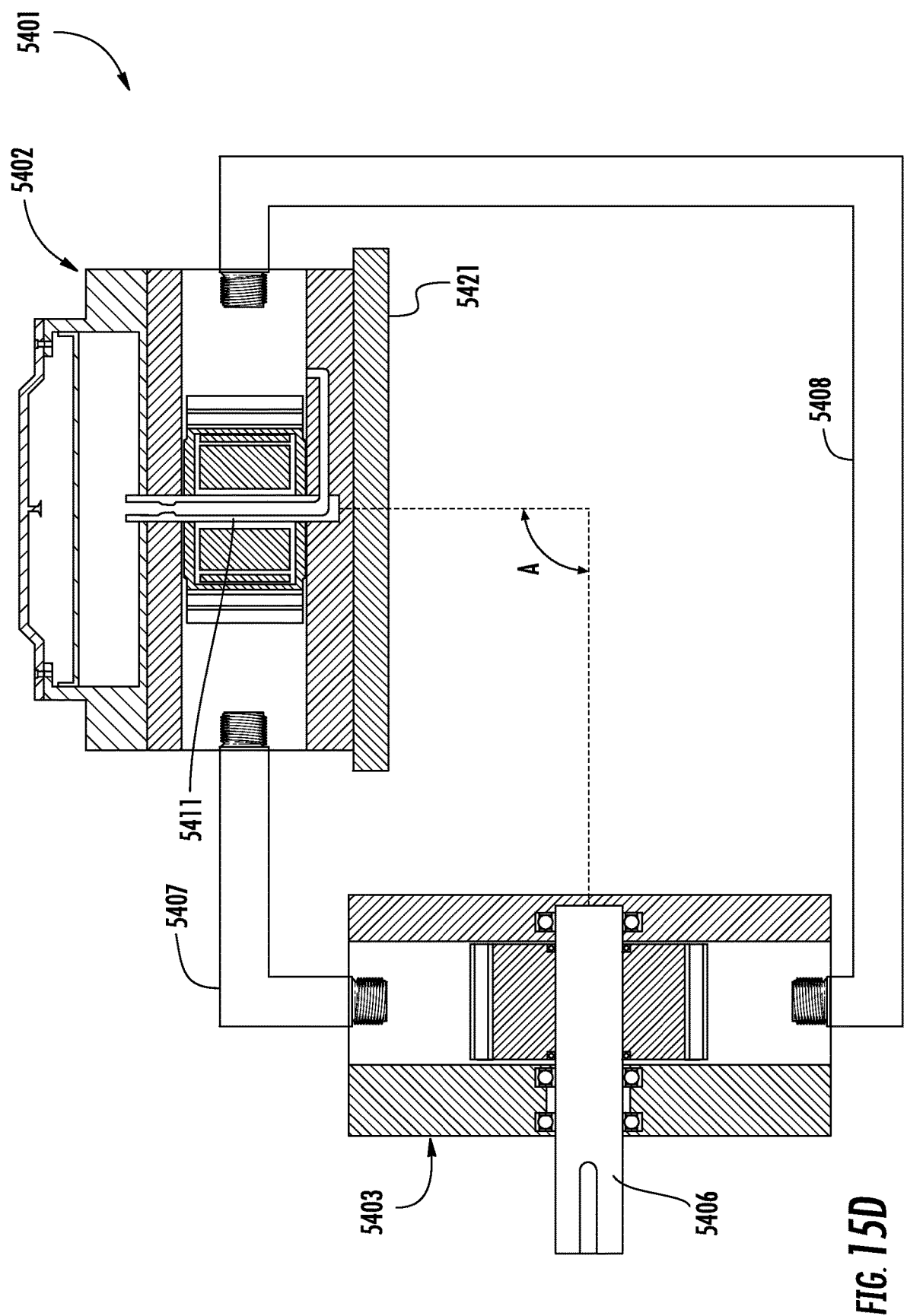
FIG. 15D illustrates an offset in which a pump's shaft and a hydraulic motor's shaft are at an angle.

Although FIGS. 15A-15C show that the axis of the hydraulic pump's shaft and the axis of the hydraulic motor's shaft (or output shaft) are parallel to each other, the offset between the hydraulic pump and the hydraulic motor can be at any angle. For example, FIG. 15D illustrates an offset in which the pump's shaft and the hydraulic motor's shaft are at an angle "A." Specifically, in the hydrostatic transmission 5401 shown in FIG. 15D, the pump shaft 5411 of the pump assembly 5402 and the output shaft 5406 of the hydraulic motor 5403 are at an angle "A." The angle "A" can vary depending on installation requirements of the hydrostatic transmission 5401 (or a hydraulic system in which the hydrostatic transmission 5401 operates). The pump assembly 5402 may be disposed on a structure 5421 remotely from the hydraulic motor 5403. The pump assembly 5402 and the hydraulic motor 5403 are in fluid communication with each other via fluid passages 5407, 5408.

The fluid passages 5107, 5108, 5207, 5208, 5307, 5308, 5407, 5408 shown in FIGS. 15A-15D each can be either an internal or external hydraulic passage or a combination of both. While not shown, the hydraulic motor 5103, 5203, 5303, 5403 and the hydraulic pump assembly 5102, 5202, 5302, 5402 in FIGS. 15A-15D may be disposed in a common transmission casing.

While the pump assemblies 5102, 5202, 5302, 5402 in the hydrostatic transmissions 5101, 5201, 5301, 5401 shown in FIGS. 15A-15D are offset (or spaced apart) from the respective hydraulic motor (or output shaft of the hydraulic motor), operation of each hydrostatic transmission 5101, 5201, 5301, 5401 can be similar to the embodiments discussed earlier, thus detailed description is omitted herein. In addition, all embodiments of the pumps discussed above can be disposed in the offset or spaced apart configuration in FIGS. 15A-15D. Further, one or more support shaft of each motor in each pump assembly 5102, 5202, 5302, 5402 may have a fluid passage therethrough, similar to the embodiments discussed earlier. During operation of hydrostatic transmission, a portion of pressurized fluid may be either released from or replenished back to the one or more storage devices in a similar manner as discussed above.

Embodiments of the controllers in the present disclosure can be provided as a hardwire circuit and/or as a computer program product. As a computer program product, the product may include a machine-readable medium having stored thereon instructions, which may be used to program a computer (or other electronic devices) to perform a process. The machine-readable medium may include, but is not limited to, floppy diskettes, optical disks, compact disc read-only memories (CD-ROMs), and magneto-optical disks, ROMs, random access memories (RAMs), erasable programmable read-only memories (EPROMs), electrically erasable programmable read-only memories (EEPROMs), field programmable gate arrays (FPGAs), application-specific integrated circuits (ASICs), vehicle identity modules (VIMs), magnetic or optical cards, flash memory, or other type of media/machine-readable medium suitable for storing electronic instructions.

Although the above drive-drive and driver-driven embodiments were described with respect to an external gear pump arrangement with spur gears having gear teeth, it should be understood that those skilled in the art will readily recognize that the concepts, functions, and features described below can be readily adapted to external gear pumps with other gear configurations (helical gears, herringbone gears, or other gear teeth configurations that can be adapted to drive fluid), internal gear pumps with various gear configurations, to pumps having more than two prime movers, to prime movers other than electric motors, e.g., hydraulic motors or other fluid-driven motors, inter-combustion, gas or other type of engines or other similar devices that can drive a fluid displacement member, and to fluid displacement members other than an external gear with gear teeth, e.g., internal gear with gear teeth, a hub (e.g. a disk, motor, other similar component) with projections (e.g. bumps, extensions, bulges, protrusions, other similar structures or combinations thereof), a hub (e.g. a disk, motor, or other similar component) with indents (e.g., cavities, depressions, voids or other similar structures), a gear body with lobes, or other similar structures that can displace fluid when driven. Accordingly, for brevity, detailed description of the various pump configurations are omitted. In addition, those skilled in the art will recognize that, depending on the type of pump, the synchronizing contact (drive-drive) or meshing (driver-driven) can aid in the pumping of the fluid instead of or in addition to sealing a reverse flow path. For example, in certain internal-gear georotor configurations, the synchronized contact or meshing between the two fluid displacement members also aids in pumping the fluid, which is trapped between teeth of opposing gears. Further, while the above embodiments have fluid displacement members with an external gear configuration, those skilled in the art will recognize that, depending on the type of fluid displacement member, the synchronized contact or meshing is not limited to a side-face to side-face contact and can be between any surface of at least one projection (e.g. bump, extension, bulge, protrusion, other similar structure, or combinations thereof) on one fluid displacement member and any surface of at least one projection (e.g. bump, extension, bulge, protrusion, other similar structure, or combinations thereof) or indent (e.g., cavity, depression, void or other similar structure) on another fluid displacement member.

The fluid displacement members, e.g., gears in the above embodiments, can be made entirely of any one of a metallic material or a non-metallic material. Metallic material can include, but is not limited to, steel, stainless steel, anodized aluminum, aluminum, titanium, magnesium, brass, and their respective alloys. Non-metallic material can include, but is not limited to, ceramic, plastic, composite, carbon fiber, and nano-composite material. Metallic material can be used for a pump that requires robustness to endure high pressure, for example. However, for a pump to be used in a low pressure application, non-metallic material can be used. In some embodiments, the fluid displacement members can be made of a resilient material, e.g., rubber, elastomeric material, to, for example, further enhance the sealing area.

Alternatively, the fluid displacement member, e.g., gears in the above embodiments, can be made of a combination of different materials. For example, the body can be made of aluminum and the portion that makes contact with another fluid displacement member, e.g., gear teeth in the above exemplary embodiments, can be made of steel for a pump that requires robustness to endure high pressure, a plastic for a pump for a low pressure application, a elastomeric material, or another appropriate material based on the type of application.

Exemplary embodiments of the fluid delivery system can displace a variety of fluids. For example, the pumps can be configured to pump hydraulic fluid, engine oil, crude oil, blood, liquid medicine (syrup), paints, inks, resins, adhesives, molten thermoplastics, bitumen, pitch, molasses, molten chocolate, water, acetone, benzene, methanol, or another fluid. As seen by the type of fluid that can be pumped, exemplary embodiments of the pump can be used in a variety of applications such as heavy and industrial machines, chemical industry, food industry, medical industry, commercial applications, residential applications, or another industry that uses pumps. Factors such as viscosity of the fluid, desired pressures and flow for the application, the configuration of the fluid displacement member, the size and power of the motors, physical space considerations, weight of the pump, or other factors that affect pump configuration will play a role in the pump arrangement. It is contemplated that, depending on the type of application, the exemplary embodiments of the fluid delivery system discussed above can have operating ranges that fall with a general range of, e.g., 1 to 5000 rpm. Of course, this range is not limiting and other ranges are possible.

The pump operating speed can be determined by taking into account factors such as viscosity of the fluid, the prime mover capacity (e.g., capacity of electric motor, hydraulic motor or other fluid-driven motor, internal-combustion, gas or other type of engine or other similar device that can drive a fluid displacement member), fluid displacement member dimensions (e.g., dimensions of the gear, hub with projections, hub with indents, or other similar structures that can displace fluid when driven), desired flow rate, desired operating pressure, and pump bearing load. In exemplary embodiments, for example, applications directed to typical industrial hydraulic system applications, the operating speed of the pump can be, e.g., in a range of 300 rpm to 900 rpm. In addition, the operating range can also be selected depending on the intended purpose of the pump. For example, in the above hydraulic pump example, a pump configured to operate within a range of 1-300 rpm can be selected as a stand-by pump that provides supplemental flow as needed in the hydraulic system. A pump configured to operate in a range of 300-600 rpm can be selected for continuous operation in the hydraulic system, while a pump configured to operate in a range of 600-900 rpm can be selected for peak flow operation. Of course, a single, general pump can be configured to provide all three types of operation.

The applications of the exemplary embodiments can include, but are not limited to, reach stackers, wheel loaders, forklifts, mining, aerial work platforms, waste handling, agriculture, truck crane, construction, forestry, and machine shop industry. For applications that are categorized as light size industries, exemplary embodiments of the pump discussed above can displace from 2 $cm^3$/rev (cubic centimeters per revolution) to 150 $cm^3$/rev with pressures in a range of 1500 psi to 3000 psi, for example. The fluid gap, i.e., tolerance between the gear teeth and the gear housing which defines the efficiency and slip coefficient, in these pumps can be in a range of +0.00-0.05 mm, for example. For applications that are categorized as medium size industries, exemplary embodiments of the pump discussed above can displace from 150 $cm^3$/rev to 300 $cm^3$/rev with pressures in a range of 3000 psi to 5000 psi and a fluid gap in a range of +0.00-0.07 mm, for example. For applications that are categorized as heavy size industries, exemplary embodiments of the pump discussed above can displace from 300 $cm^3$/rev to 600 $cm^3$/rev with pressures in a range of 3000 psi to 12,000 psi and a fluid gap in a range of +0.00-0.0125 mm, for example.

In addition, the dimensions of the fluid displacement members can vary depending on the application of the pump. For example, when gears are used as the fluid displacement members, the circular pitch of the gears can range from less than 1 mm (e.g., a nano-composite material of nylon) to a few meters wide in industrial applications. The thickness of the gears will depend on the desired pressures and flows for the application.

In some embodiments, hydrostatic transmission assemblies can have two or more pumps that are arranged in parallel to provide more flow or in series to provide more pressure to the system.

While the present invention has been disclosed with reference to certain embodiments, numerous modifications, alterations, and changes to the described embodiments are possible without departing from the sphere and scope of the present invention, as defined in the appended claims. Accordingly, it is intended that the present invention not be limited to the described embodiments, but that it has the full scope defined by the language of the following claims, and equivalents thereof.

What is claimed is:

1. A hydraulic system comprising:
a hydraulic motor;
a hydraulic pump assembly connected to the hydraulic motor, the hydraulic pump assembly including a hydraulic pump having a first fluid driver with a first variable torque motor and a first gear having a plurality of first gear teeth, and a second fluid driver with a second variable torque motor and a second gear having a plurality of second gear teeth; and
a controller that is configured to:
receive feedback data from each variable torque motor,
control a torque of each variable torque motor to transfer the hydraulic fluid to the hydraulic motor, and
synchronize rotation rates to generate a contact force between the first and second gears of the hydraulic pump,
wherein the controller includes a plurality of operational modes including at least one of a flow mode, a pressure mode, or a balanced mode.

2. The hydraulic system of claim 1, wherein the synchronization rate is in a range of 99.0% to 100%.

3. The hydraulic system of claim 1, wherein the synchronization rate is in a range of 99.5% to 100%.

4. The hydraulic system of claim 1, wherein the first variable torque motor and the second variable torque motor are controlled so as to synchronize contact between a face of at least one tooth of the plurality of second gear teeth and a face of at least one tooth of the plurality of first gear teeth, and
wherein a demand signal to one of the first and second variable motors is set higher than a demand signal to the other of the first and second variable motors to attain the synchronized contact.

5. The hydraulic system of claim 4, wherein the synchronized contact is such that a slip coefficient is 5% or less.

6. The hydraulic system of claim 5, wherein the slip coefficient is 5% or less for a pump pressure in a range of 3000 psi to 5000 psi, 3% or less for a pump pressure in a range of 2000 psi to 3000 psi, 2% or less for a pump pressure in a range of 1000 psi to 2000 psi and 1% or less for a pump pressure in a range up to 1000 psi.

7. The hydraulic system of claim 1, further comprising a load that is attached to and rotated by the hydraulic motor.

8. The hydraulic system of claim 1, wherein the hydraulic pump assembly is conjoined with the hydraulic motor.

9. The hydraulic system of claim 8, wherein the hydraulic pump assembly is conjoined to the hydraulic motor along a longitudinal axis of the hydraulic motor.

10. The hydraulic system of claim 8, wherein the hydraulic pump assembly is conjoined to the hydraulic motor along an axis that is offset from a longitudinal axis of the hydraulic motor.

11. The hydraulic system of claim 1, wherein the hydraulic system is a closed-loop system.

12. The hydraulic system of claim 1, wherein the hydraulic pump assembly further includes at least one storage device, which is in fluid communications with the hydraulic pump, to store hydraulic fluid.

13. The hydraulic system of claim 12, wherein at least one of the first variable torque motor or the second variable torque motor includes a flow-through shaft that provides fluid communication between the at least one storage device and at least one of an inlet port or an outlet port of the hydraulic pump.

14. A hydraulic system comprising:
a hydraulic motor;
a hydraulic pump assembly connected to the hydraulic motor, the hydraulic pump assembly including a hydraulic pump having a first fluid driver with a first variable torque motor and a first gear having a plurality of first gear teeth, and a second fluid driver with a second variable torque motor and a second gear having a plurality of second gear teeth; and a controller that is configured to:
receive feedback data from each variable torque motor,
control a torque of each variable torque motor to transfer the hydraulic fluid to the hydraulic motor, and
synchronize rotation rates to generate a contact force between the first and second gears of the hydraulic pump,
wherein the controller includes one or more curves for the hydraulic pump that convert command signals to appropriate torque demand signals to the hydraulic pump based on the design of the hydraulic pump.

15. The hydraulic system of claim 14, wherein the first variable torque motor and the second variable torque motor are controlled so as to synchronize contact between a face of at least one tooth of the plurality of second gear teeth and a face of at least one tooth of the plurality of first gear teeth,
wherein a demand signal to one of the first and second variable motors is set higher than a demand signal to the other of the first and second variable motors to attain the synchronized contact, and
wherein the synchronized contact is such that a slip coefficient is 5% or less.

16. A hydraulic system comprising:
a hydraulic motor;
a hydraulic pump assembly connected to the hydraulic motor, the hydraulic pump assembly including a hydraulic pump having a first fluid driver with a first variable torque motor and a first gear having a plurality of first gear teeth, and a second fluid driver with a second variable torque motor and a second gear having a plurality of second gear teeth; and
a controller that is configured to:
receive feedback data from each variable torque motor,
control a torque of each variable torque motor to transfer the hydraulic fluid to the hydraulic motor, and
synchronize rotation rates to generate a contact force between the first and second gears of the hydraulic pump,
wherein the first motor is disposed inside the first gear and the second motor is disposed inside the second gear, and
wherein the first motor and the second motor are outer-rotor motors.

17. The hydraulic system of claim 16, wherein the first variable torque motor and the second variable torque motor are controlled so as to synchronize contact between a face of at least one tooth of the plurality of second gear teeth and a face of at least one tooth of the plurality of first gear teeth,
wherein a demand signal to one of the first and second variable motors is set higher than a demand signal to the other of the first and second variable motors to attain the synchronized contact, and
wherein the synchronized contact is such that a slip coefficient is 5% or less.

* * * * *